(12) United States Patent
Nakayama et al.

(10) Patent No.: US 6,285,509 B1
(45) Date of Patent: Sep. 4, 2001

(54) ZOOM LENS AND DISPLAY APPARATUS HAVING THE SAME

(75) Inventors: Hiroki Nakayama, Sagamihara; Akihiro Nishio, Yokohama; Saburo Sugawara, Kawasaki, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/407,077

(22) Filed: Sep. 28, 1999

Related U.S. Application Data

(63) Continuation-in-part of application No. 09/217,939, filed on Dec. 22, 1998, now abandoned.

(30) Foreign Application Priority Data

Dec. 25, 1997 (JP) .................................................. 9-367119
Oct. 2, 1998 (JP) ................................................ 10-296052
Jan. 8, 1999 (JP) ................................................ 11-002732

(51) Int. Cl.⁷ .................................................. G02B 15/14
(52) U.S. Cl. .......................................... 359/676; 359/683
(58) Field of Search ..................................... 359/676, 683

(56) References Cited

U.S. PATENT DOCUMENTS

| | | | |
|---|---|---|---|
| 4,273,415 | * 6/1981 | Sonnet | 350/465 |
| 4,527,867 | * 7/1985 | Fujioka et al. | 350/427 |
| 4,776,679 | 10/1988 | Kitagishi et al. | 350/427 |
| 4,810,070 | 3/1989 | Suda et al. | 350/413 |
| 4,842,386 | 6/1989 | Kitagishi et al. | 350/427 |
| 4,907,866 | 3/1990 | Kitagishi et al. | 350/426 |
| 5,011,272 | 4/1991 | Nakayama et al. | 350/427 |
| 5,056,900 | 10/1991 | Mukaiya et al. | 359/676 |
| 5,078,481 | 1/1992 | Nakayama et al. | 359/680 |
| 5,087,988 | 2/1992 | Nakayama | 359/689 |
| 5,111,338 | 5/1992 | Nakayama | 359/686 |
| 5,113,287 | 5/1992 | Nakayama | 359/676 |
| 5,132,848 | 7/1992 | Nishio et al. | 359/686 |
| 5,134,524 | 7/1992 | Hamano et al. | 359/687 |
| 5,221,994 | 6/1993 | Nishio | 359/684 |
| 5,229,886 | * 7/1993 | Tanaka | 359/683 |
| 5,247,393 | 9/1993 | Sugawara | 359/690 |
| 5,253,113 | 10/1993 | Sekita et al. | 359/680 |
| 5,257,134 | 10/1993 | Sugawara | 359/679 |
| 5,303,088 | 4/1994 | Sugawara | 359/753 |
| 5,341,243 | 8/1994 | Okuyama et al. | 359/687 |
| 5,416,639 | * 5/1995 | Yamanashi | 359/683 |
| 5,523,888 | 6/1996 | Nishio | 359/686 |
| 5,526,186 | * 6/1996 | Sekine | 359/683 |
| 5,550,679 | 8/1996 | Sugawara | 359/689 |
| 5,552,938 | 9/1996 | Sugawara | 359/691 |
| 5,574,599 | 11/1996 | Hoshi et al. | 359/689 |
| 5,583,699 | 12/1996 | Nakayama | 357/687 |
| 5,600,490 | 2/1997 | Sugawara et al. | 359/690 |

(List continued on next page.)

FOREIGN PATENT DOCUMENTS

| | | |
|---|---|---|
| 49-23912 | 6/1974 | (JP) . |
| 53-34539 | 3/1978 | (JP) . |
| 57-163213 | 10/1982 | (JP) . |
| 58-4113 | 1/1983 | (JP) . |
| 63-241511 | 10/1988 | (JP) . |
| 2-201310 | 8/1990 | (JP) . |

*Primary Examiner*—Georgia Epps
*Assistant Examiner*—Tim Thompson
(74) *Attorney, Agent, or Firm*—Fitzpatrick, Cella, Harper & Scinto

(57) ABSTRACT

A zoom lens for projecting an original image onto a screen in an enlarged scale includes, in order from the screen side, a first lens unit of negative refractive power, a second lens unit of positive refractive power, a third lens unit of negative refractive power, a fourth lens unit of positive refractive power and a fifth lens unit of positive refractive power, wherein, during zooming from a wide-angle end to a telephoto end, the second lens unit and the fourth lens unit move toward the screen side.

47 Claims, 36 Drawing Sheets

U.S. PATENT DOCUMENTS

| | | | |
|---|---|---|---|
| 5,631,775 | * 5/1997 | Shibata | 359/749 |
| 5,638,216 | 6/1997 | Horiuchi et al. | 359/683 |
| 5,684,635 | 11/1997 | Sugawara | 359/643 |
| 5,691,851 | 11/1997 | Nishio et al. | 359/683 |
| 5,701,475 | 12/1997 | Sugawara | 359/644 |
| 5,739,960 | * 4/1998 | Tanaka | 359/683 |
| 5,739,961 | 4/1998 | Nakayama et al. | 359/687 |
| 5,745,297 | * 4/1998 | Kaneko et al. | 359/749 |
| 5,754,346 | 5/1998 | Nakayama et al. | 359/687 |
| 5,757,553 | 5/1998 | Sugawara | 359/643 |
| 5,781,349 | 7/1998 | Sugawara | 359/691 |
| 5,815,320 | 9/1998 | Hoshi et al. | 359/686 |
| 5,831,772 | 11/1998 | Nishio et al. | 359/689 |
| 5,847,882 | 12/1998 | Nakayama | 359/684 |
| 5,917,663 | * 6/1999 | Suzuki | 359/749 |
| 5,920,433 | 7/1999 | Sugawara | 359/663 |
| 5,926,316 | 7/1999 | Sugawara | 359/557 |
| 5,963,377 | * 10/1999 | Okada et al. | 359/686 |
| 5,969,873 | 10/1999 | Sugawara | 359/645 |
| 5,969,875 | 10/1999 | Sugawara | 359/651 |
| 5,973,847 | 10/1999 | Sugawara | 359/644 |
| 5,986,806 | 11/1999 | Sugawara | 359/557 |

\* cited by examiner

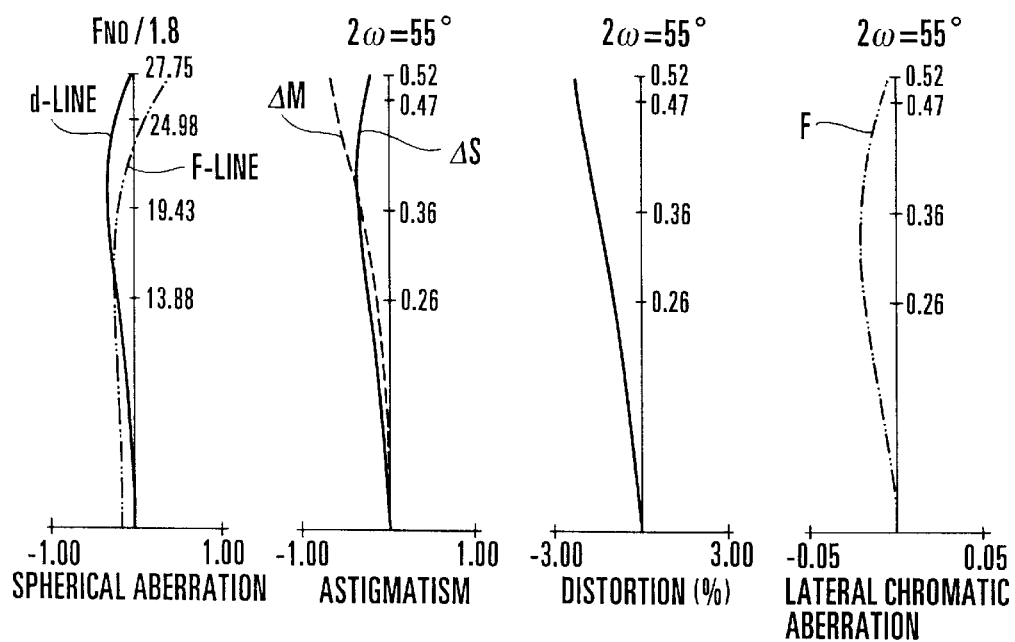
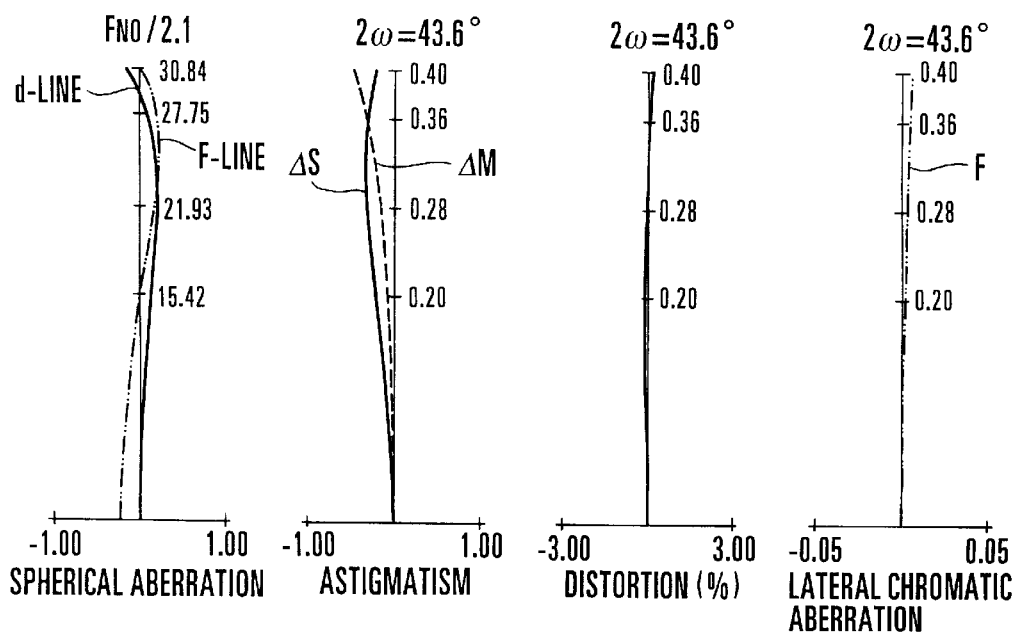

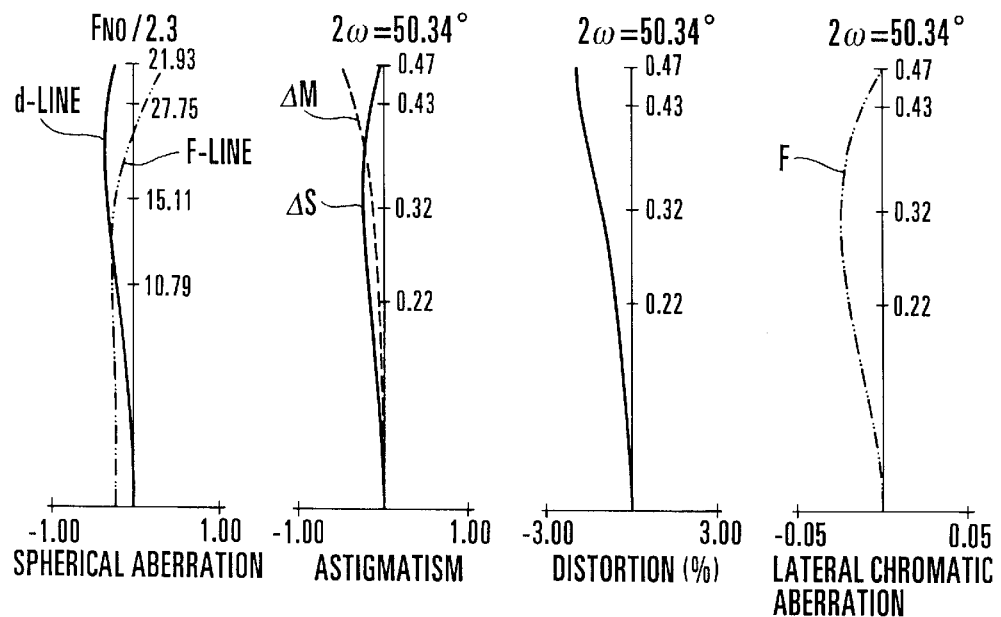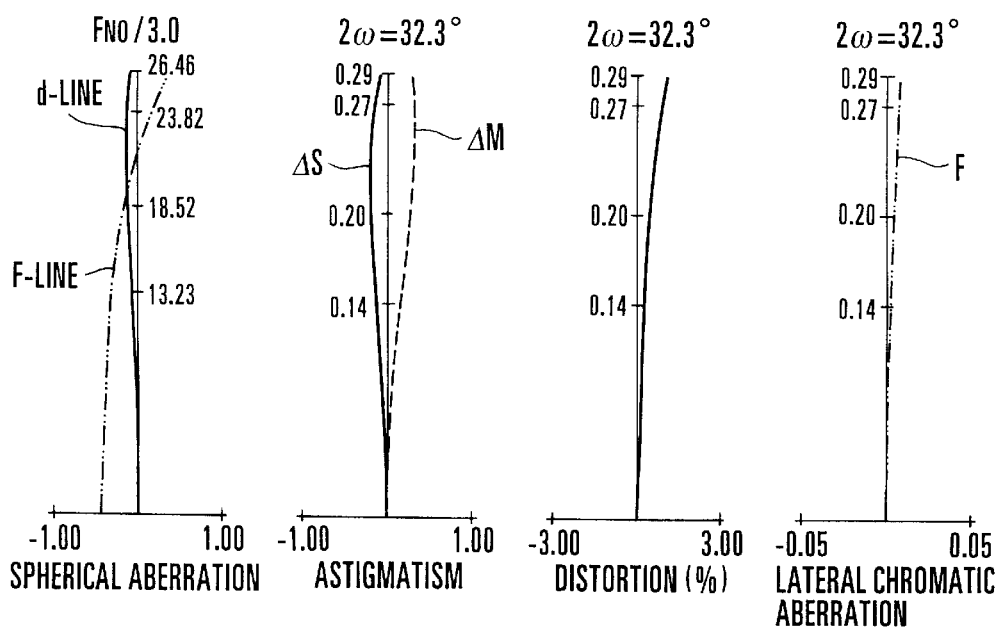

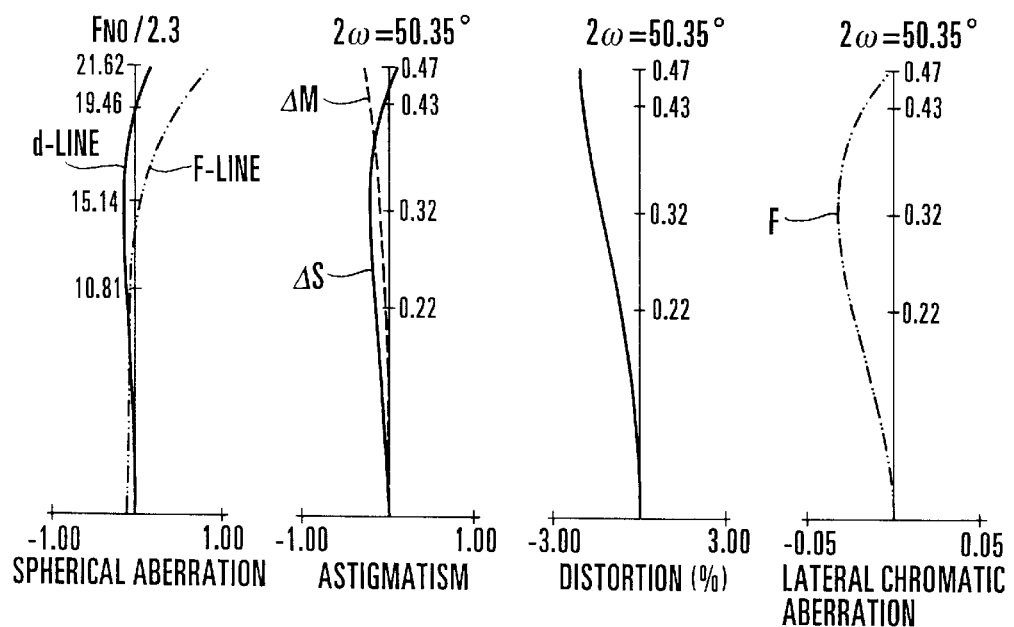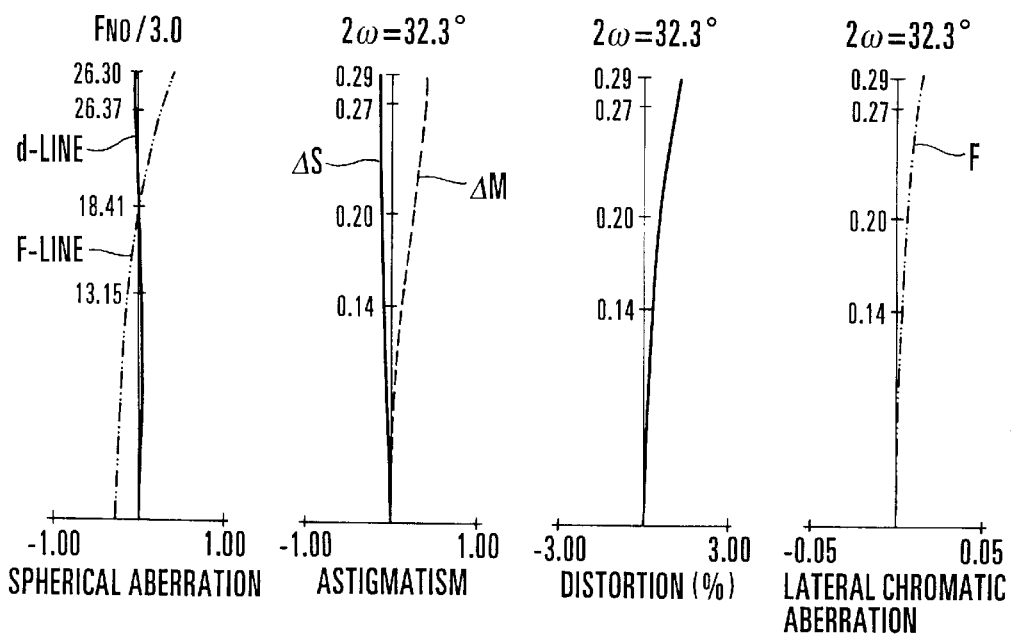

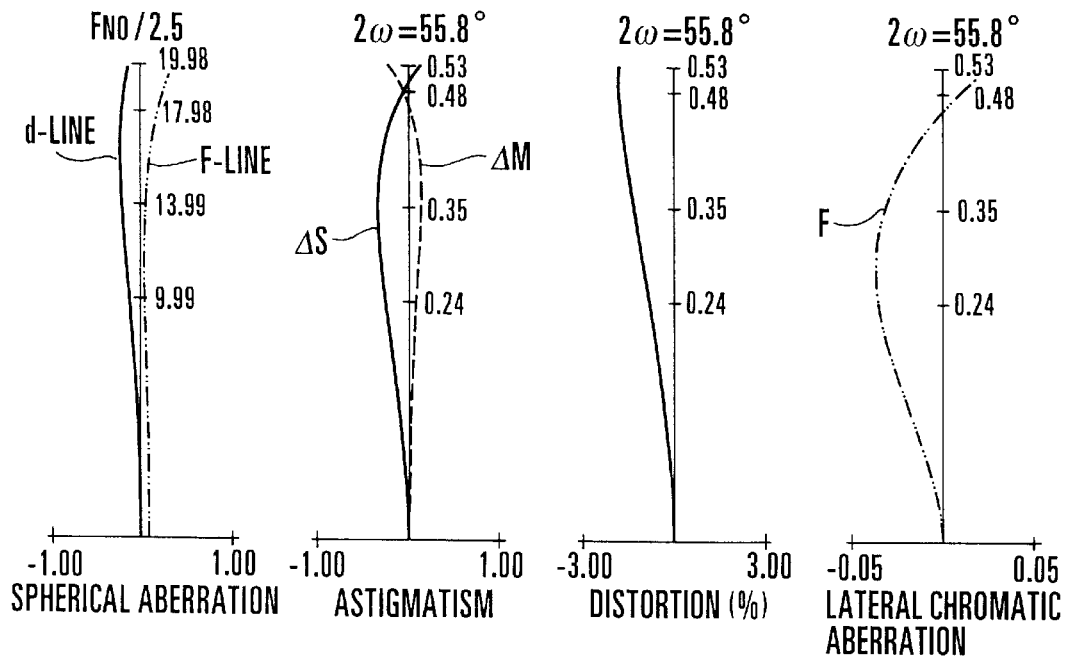
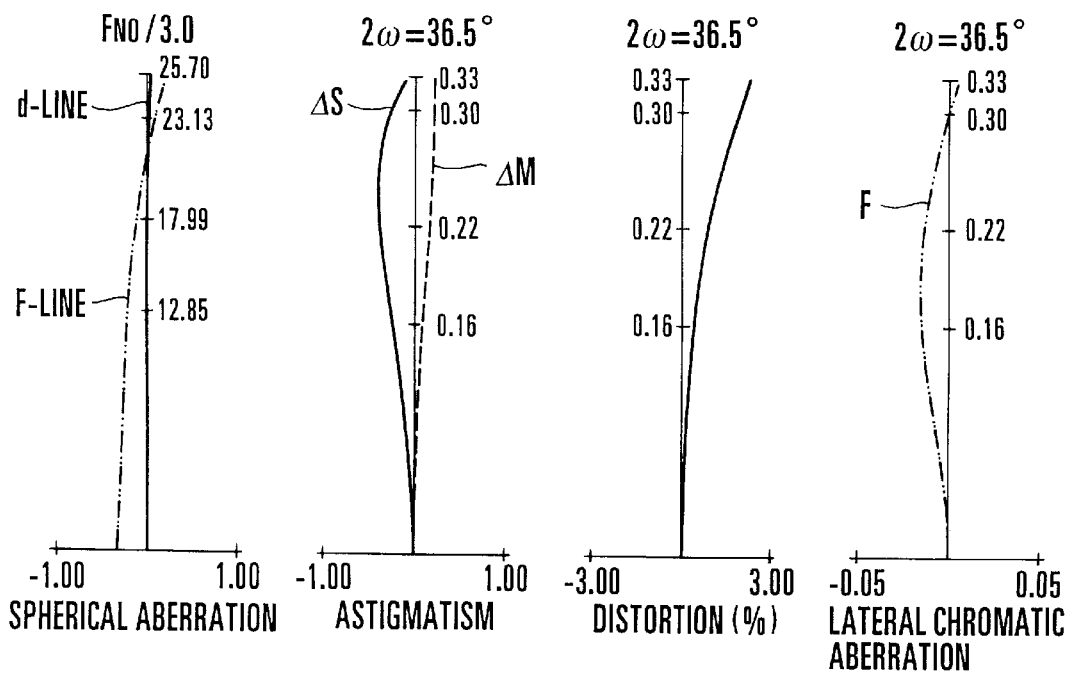

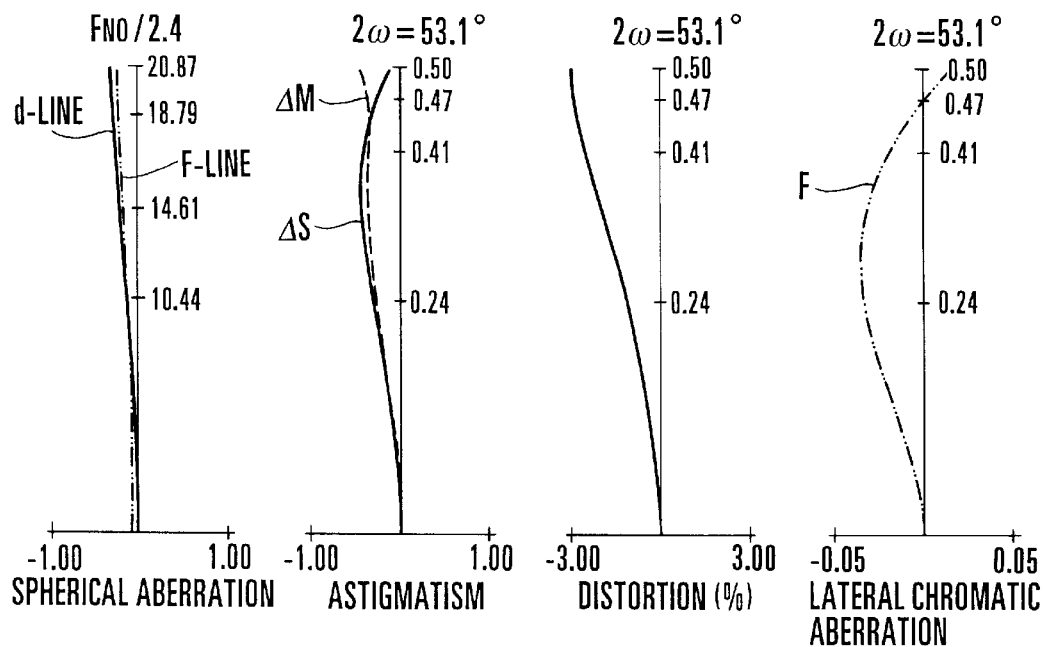
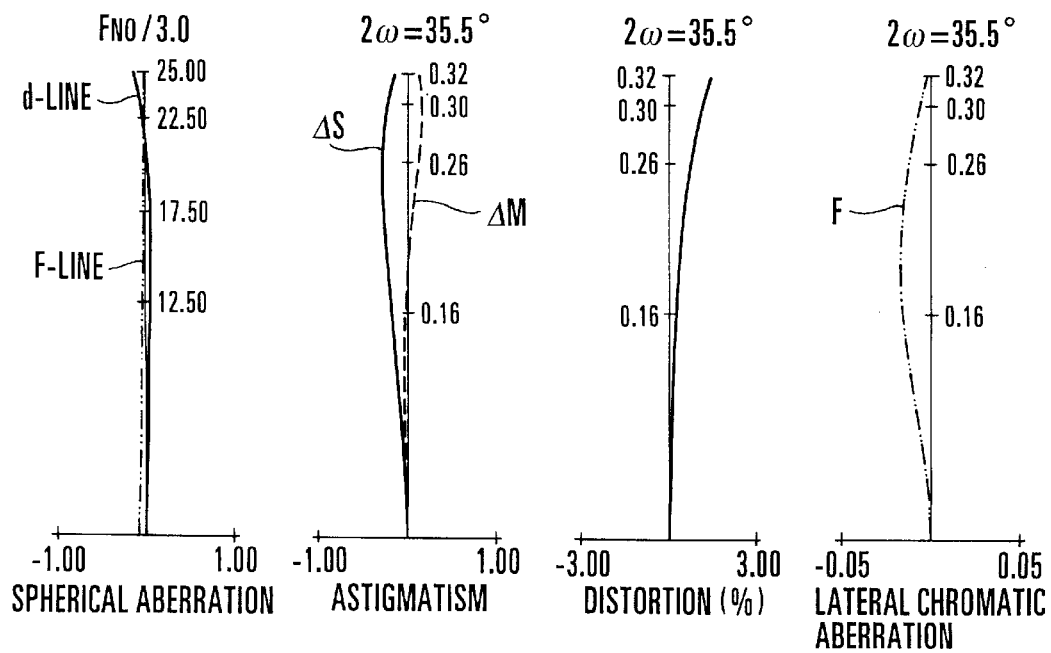

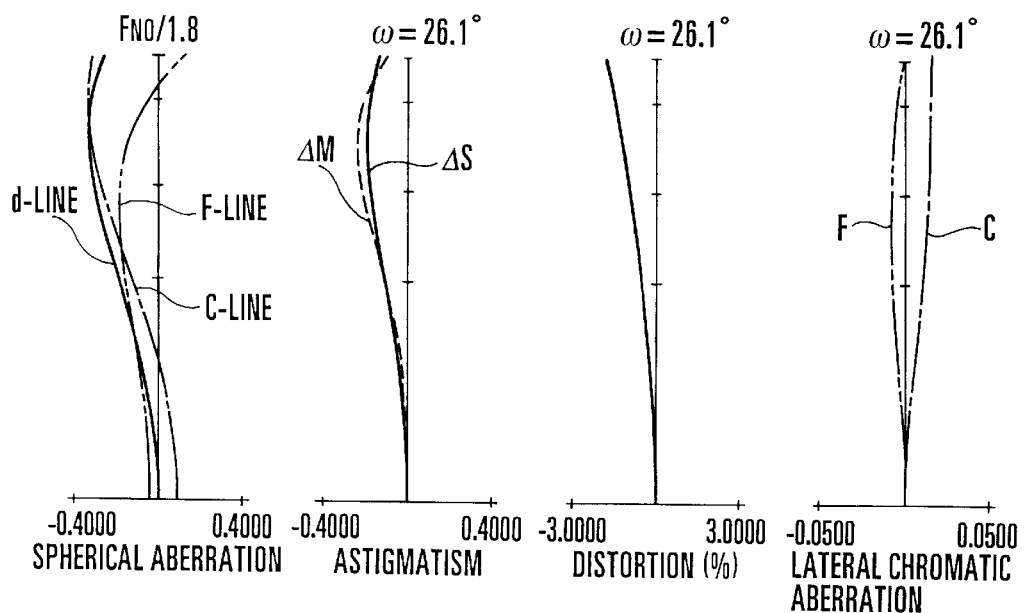
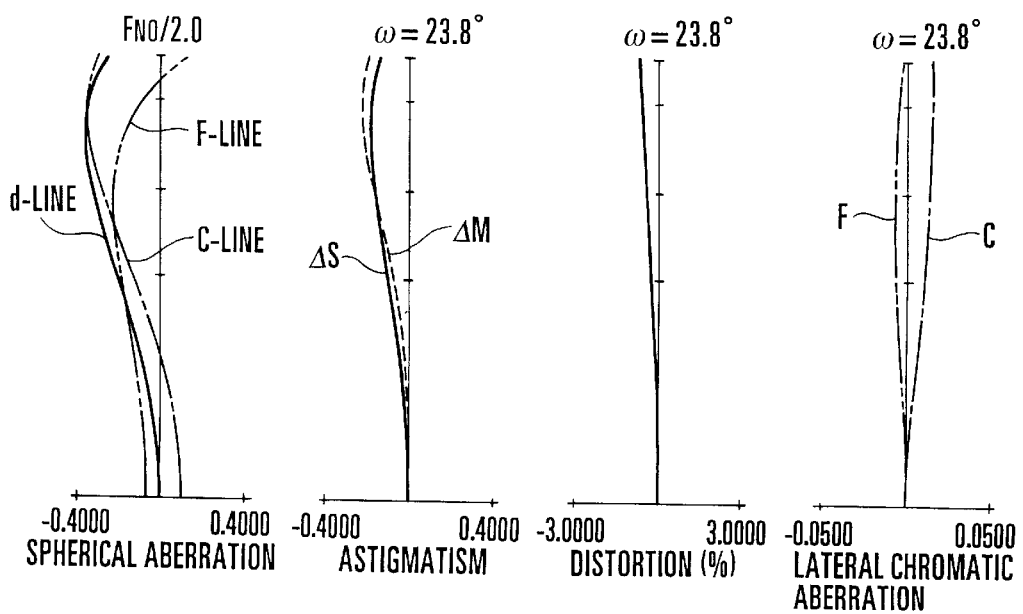

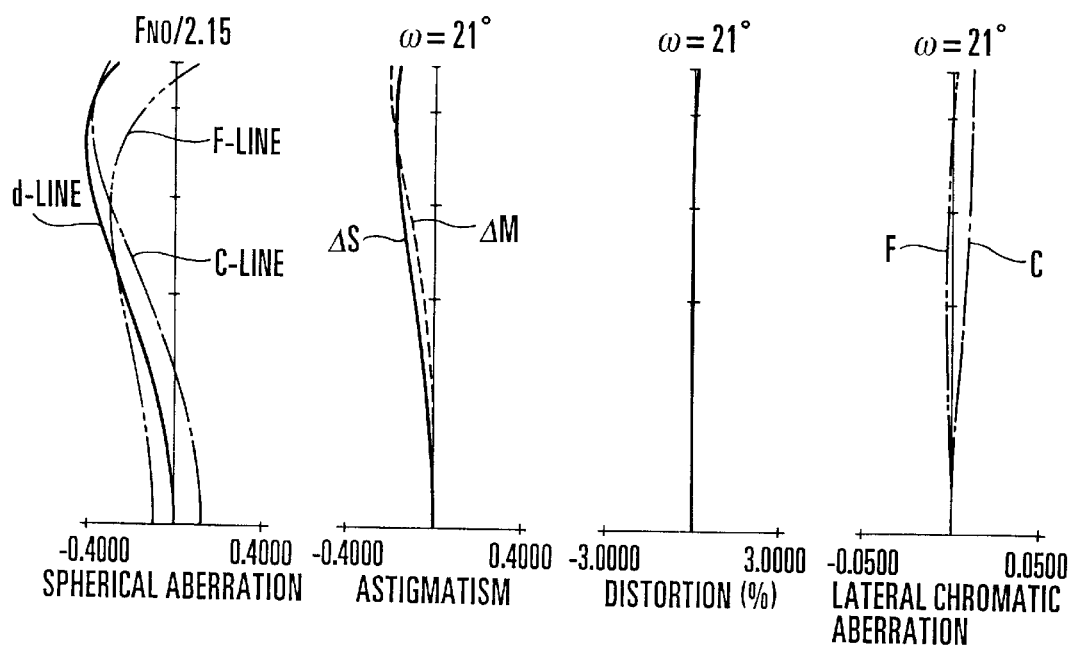

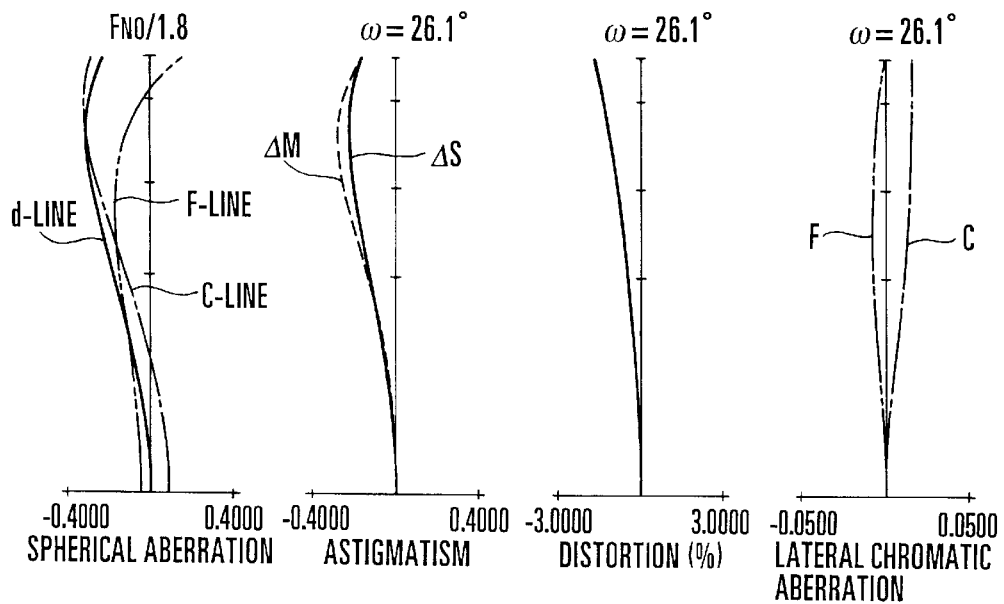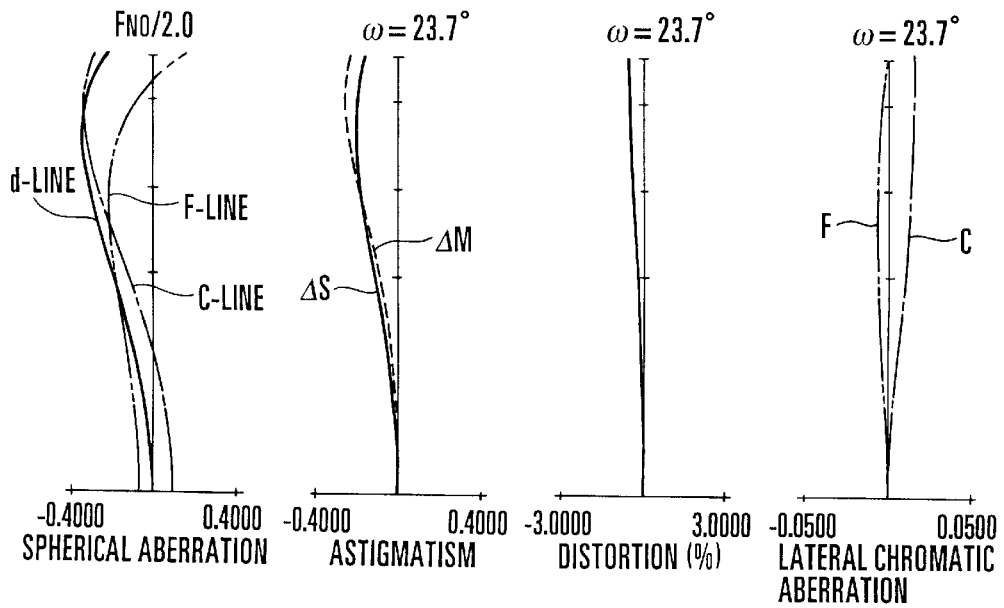

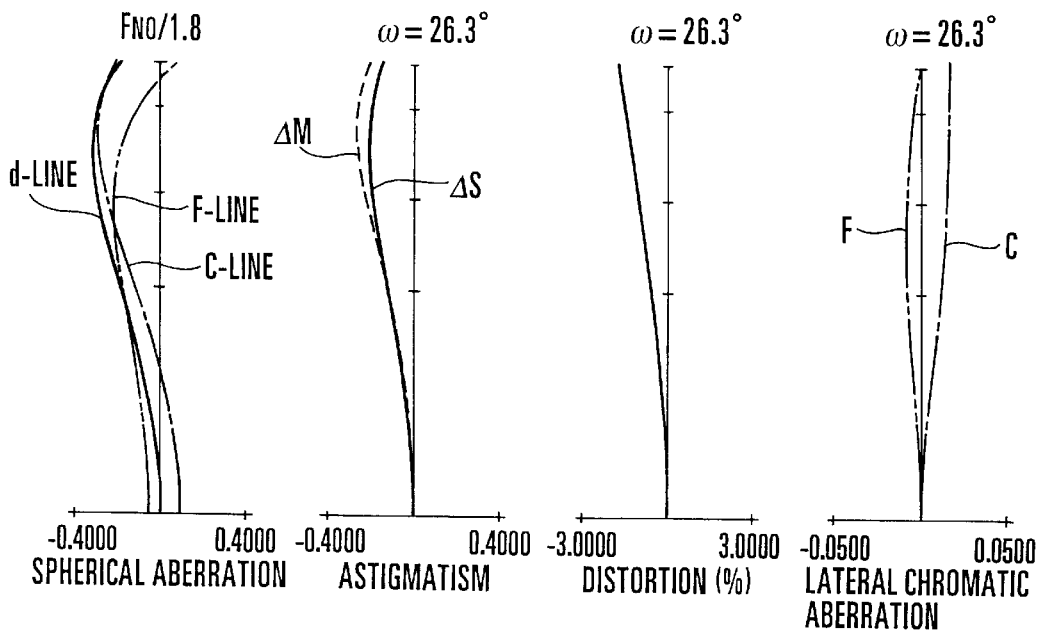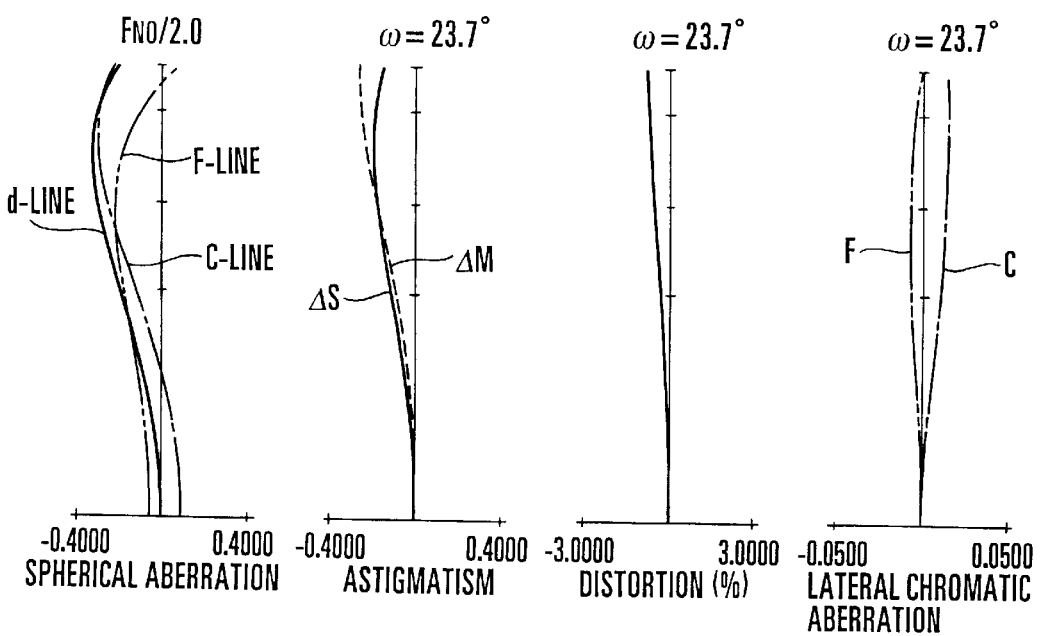

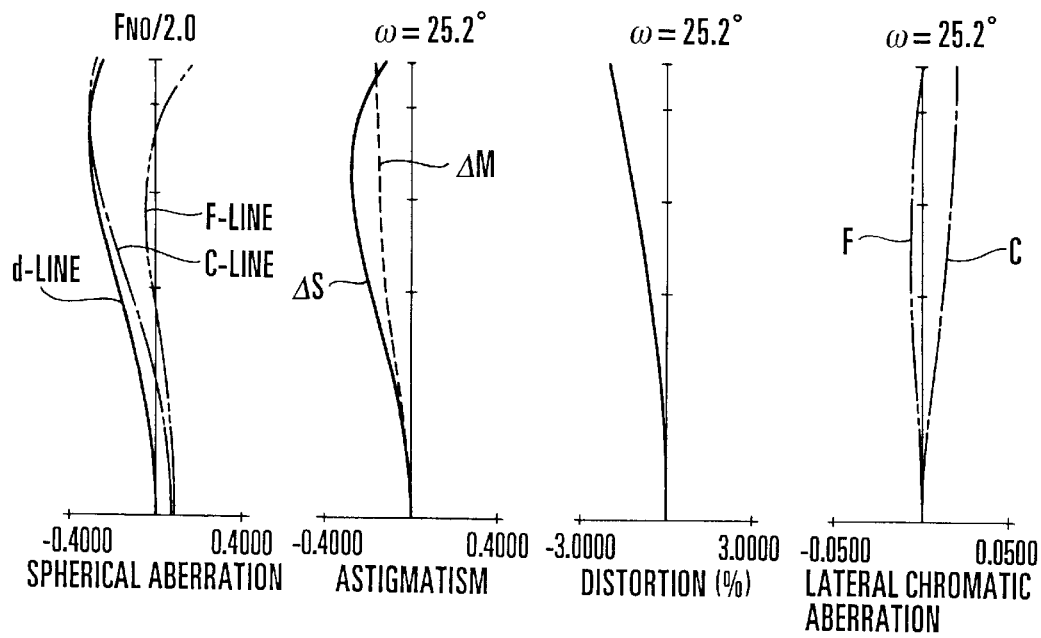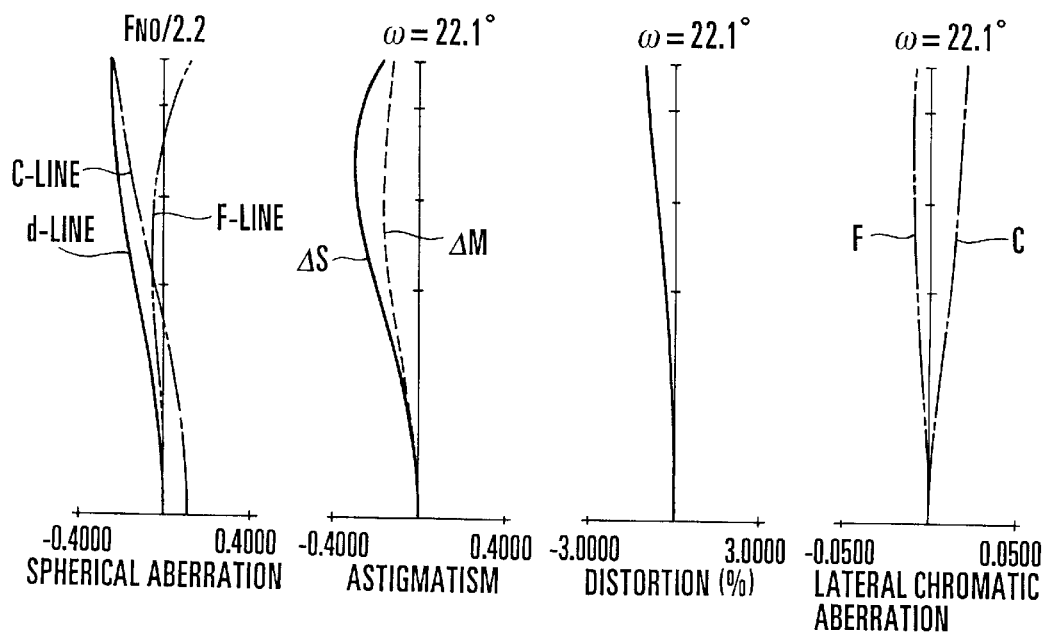

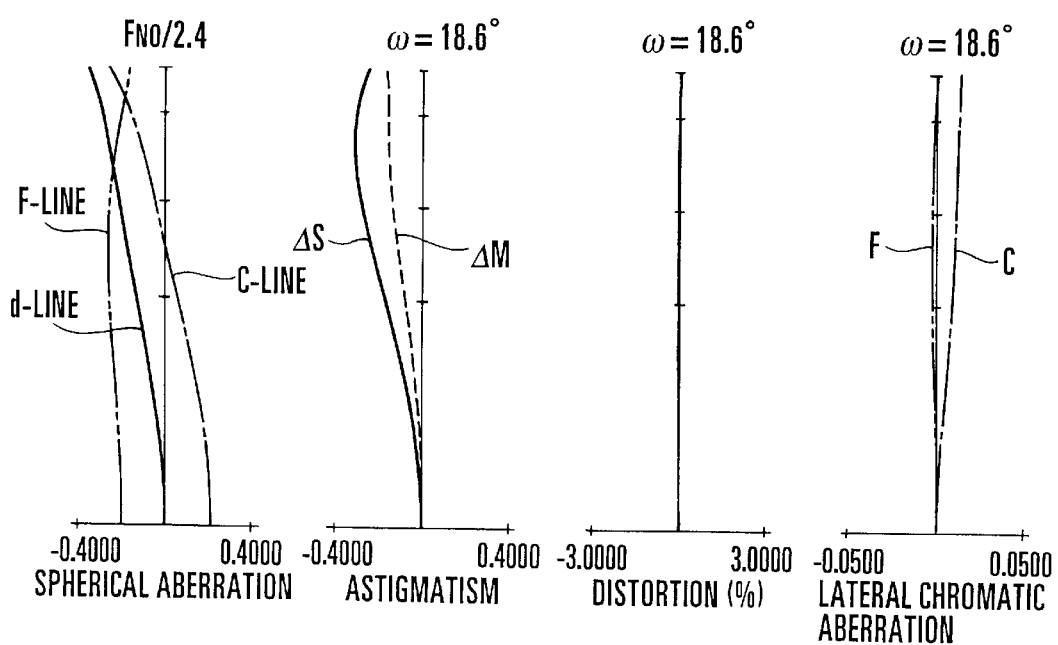

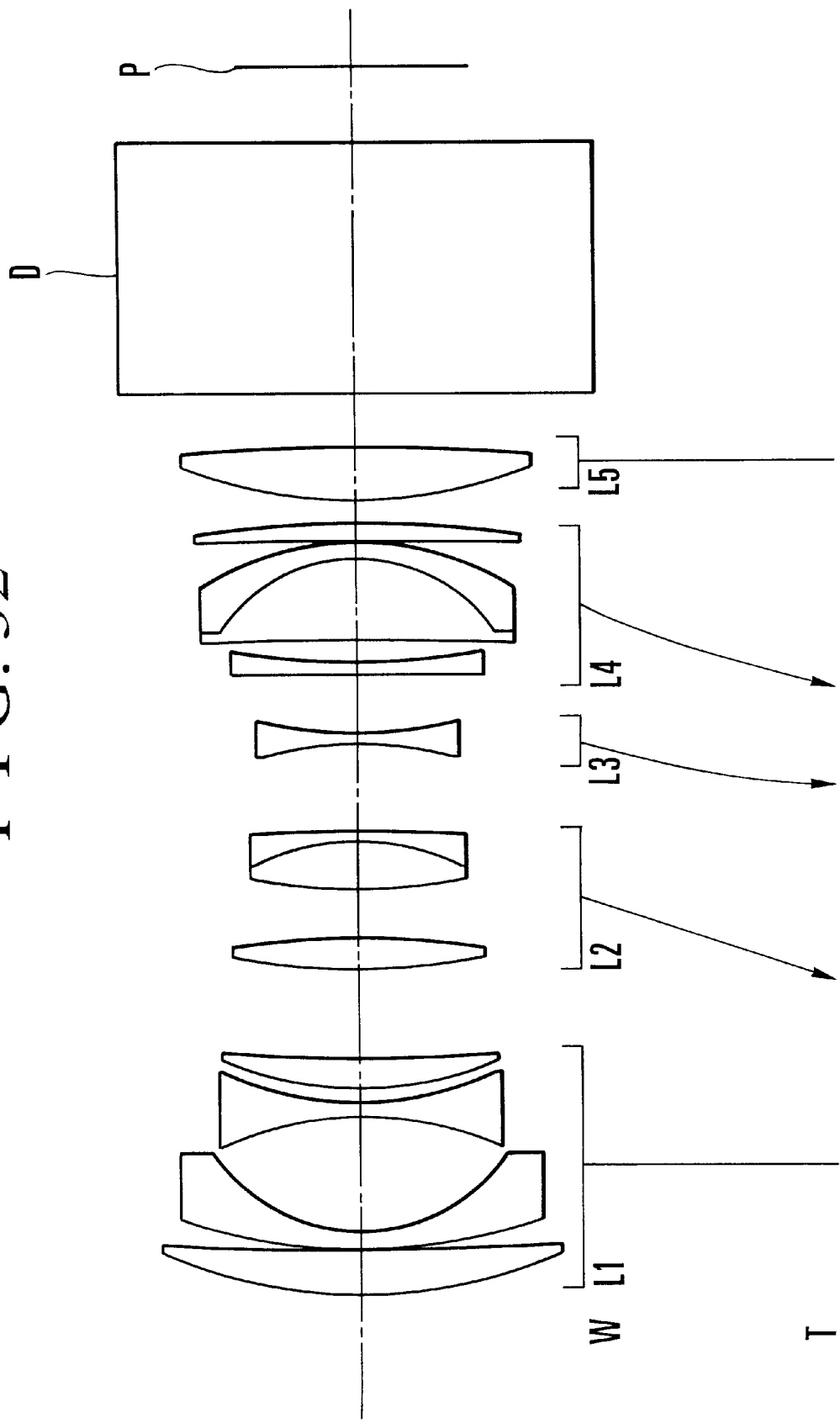

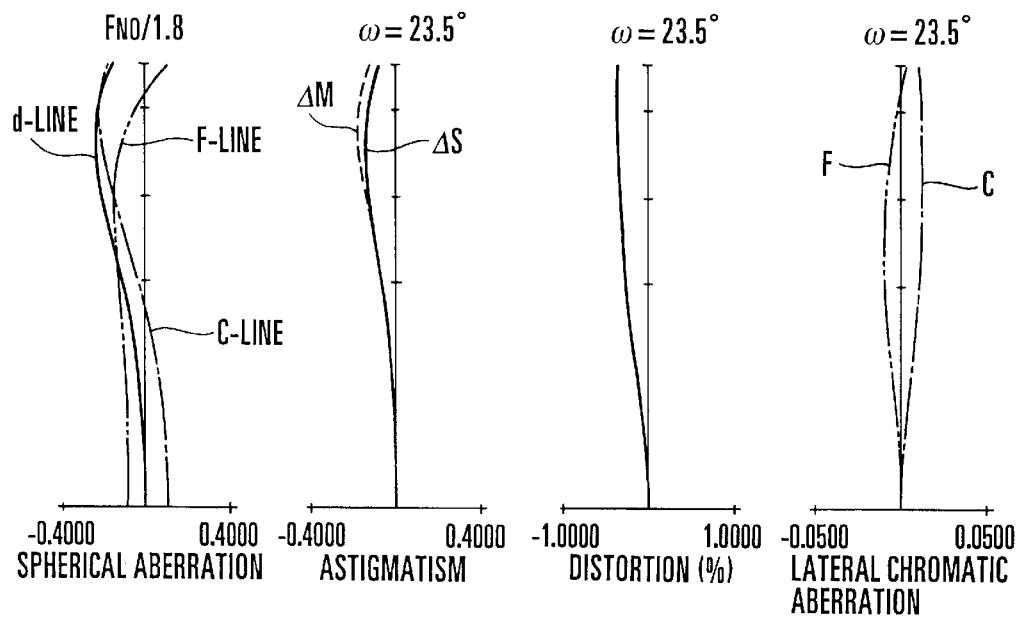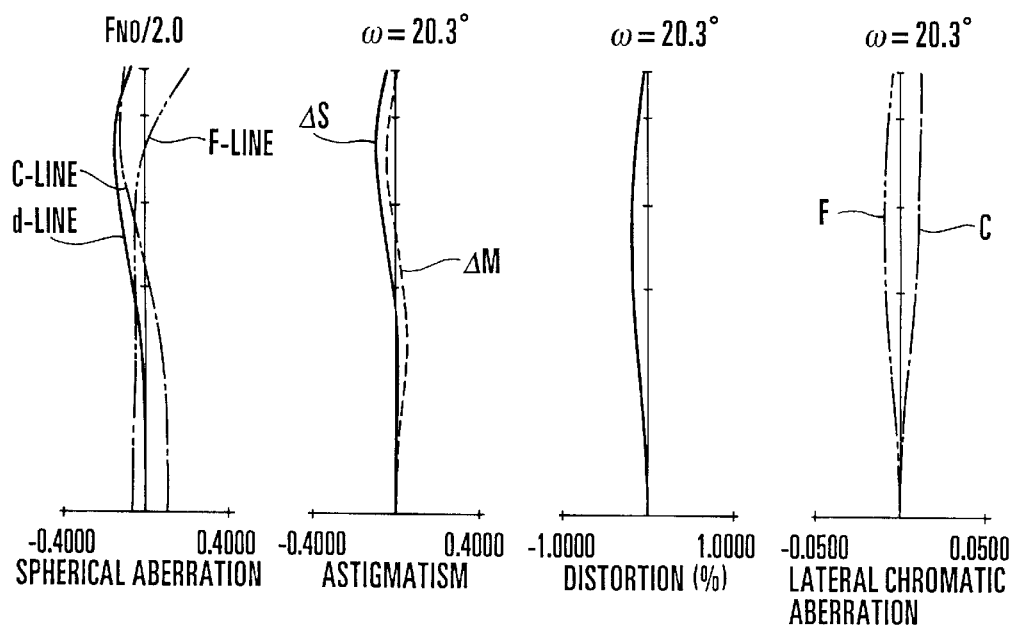

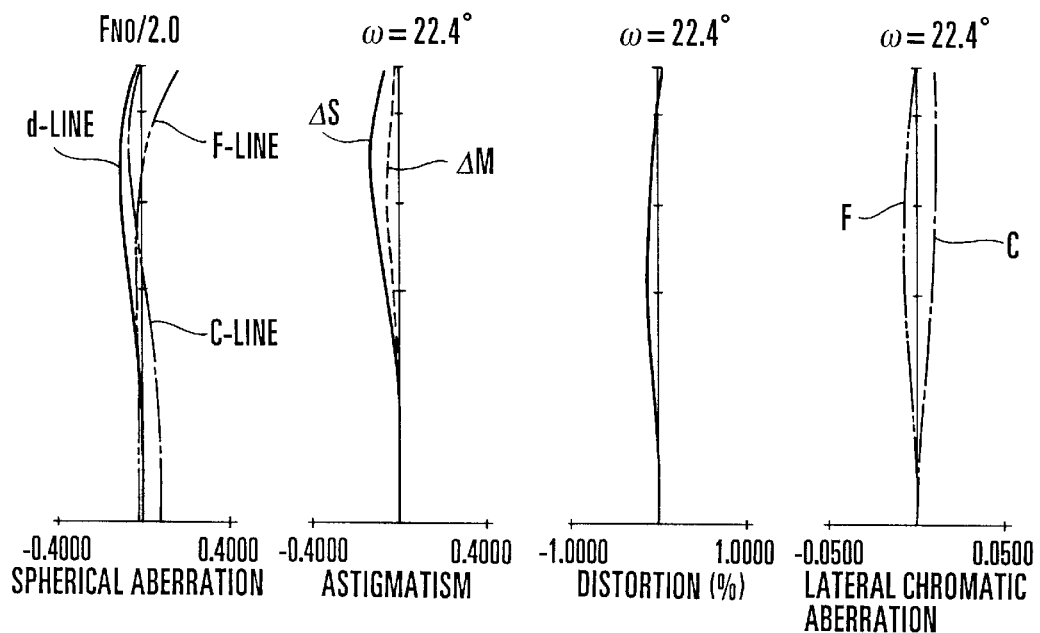
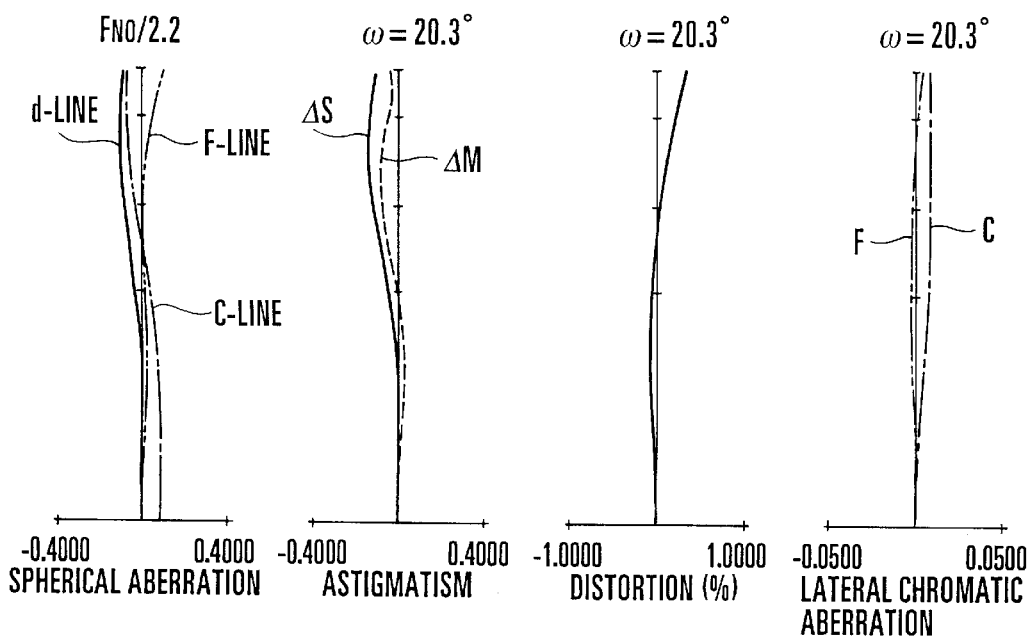

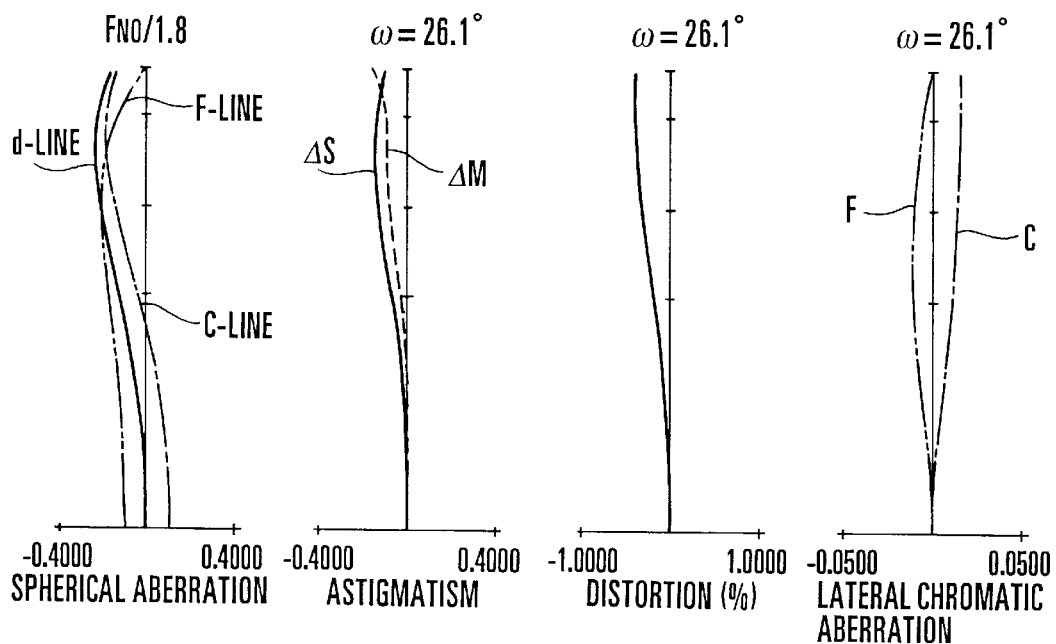
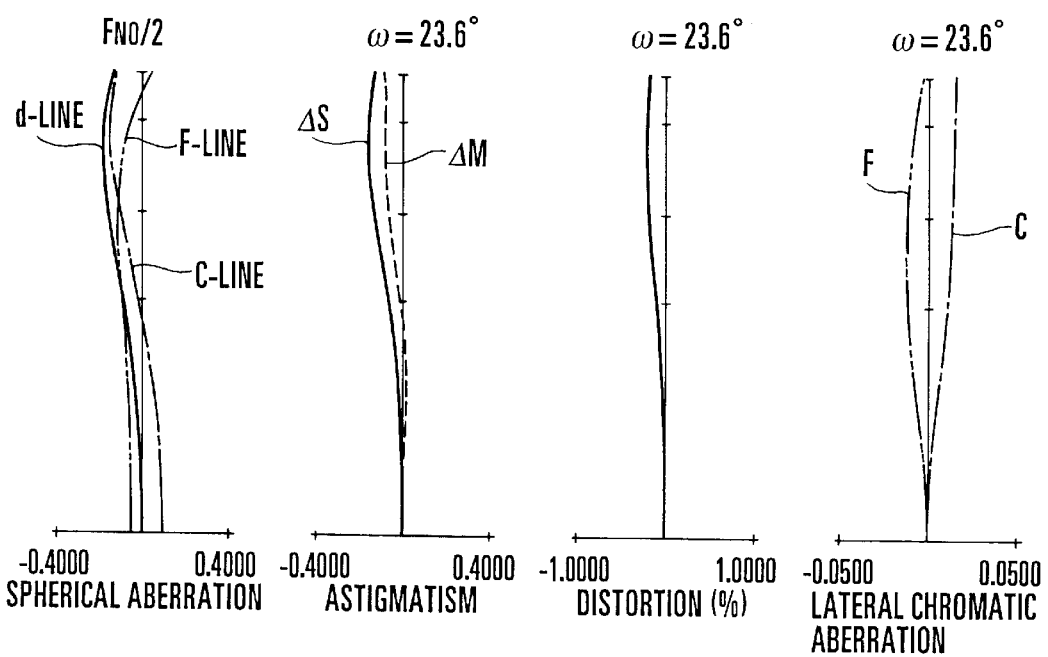

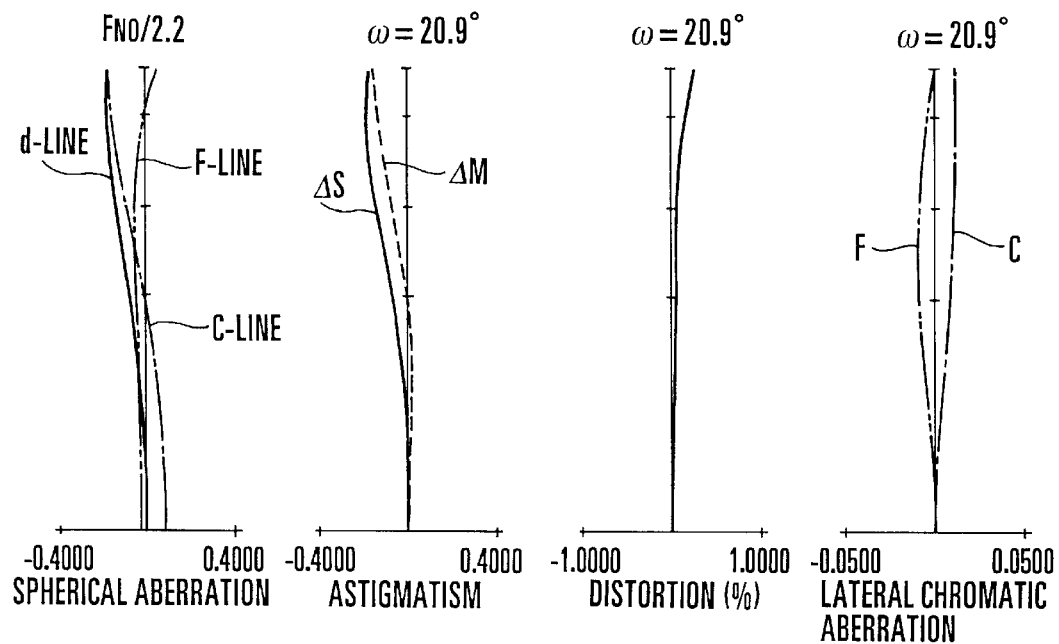
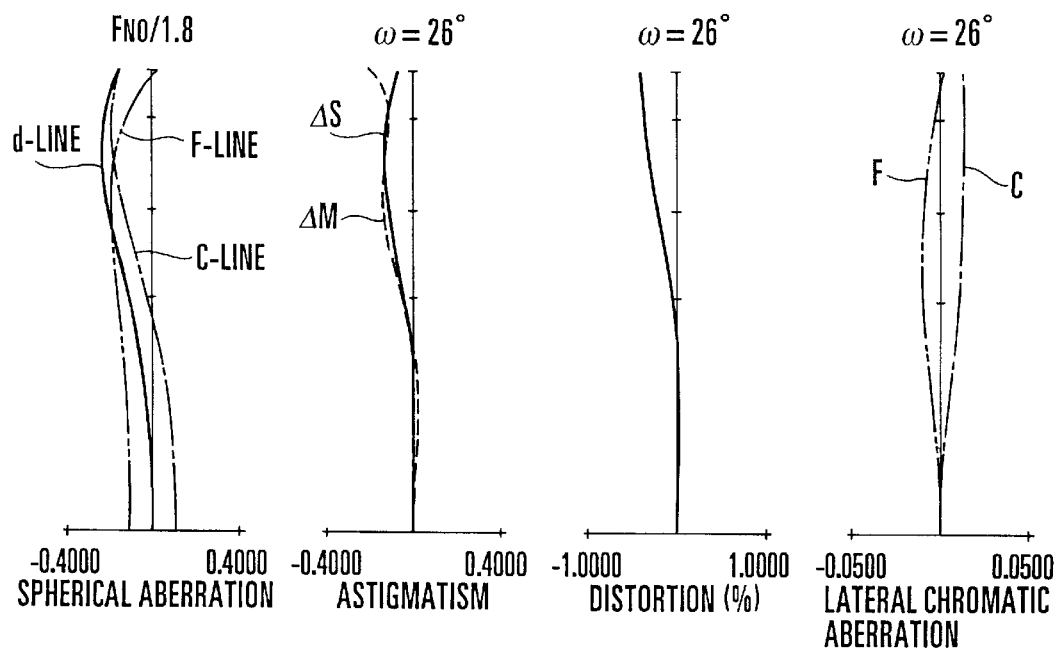

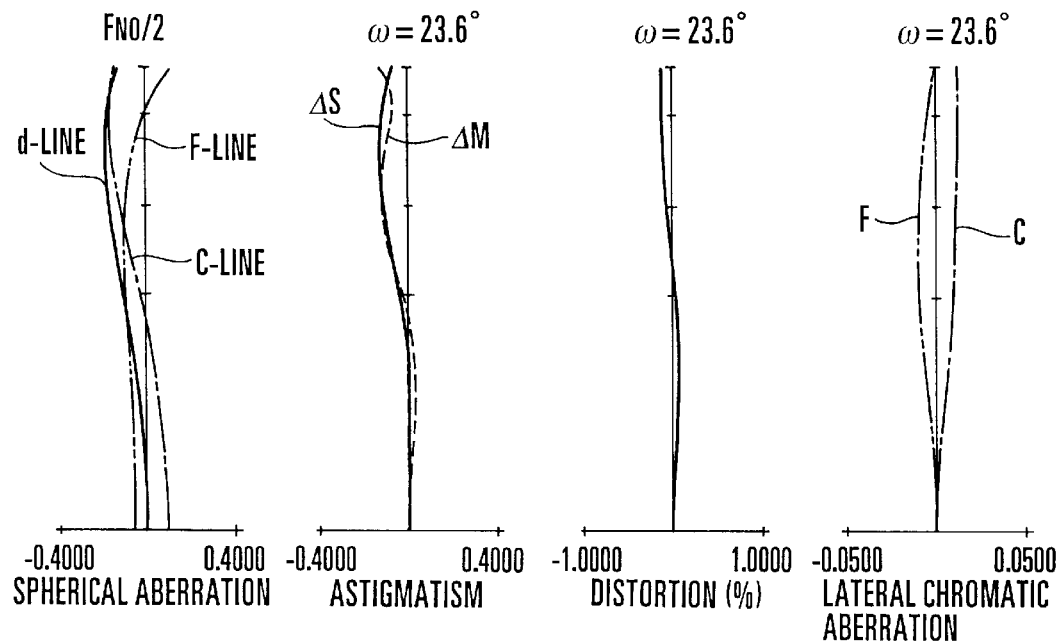
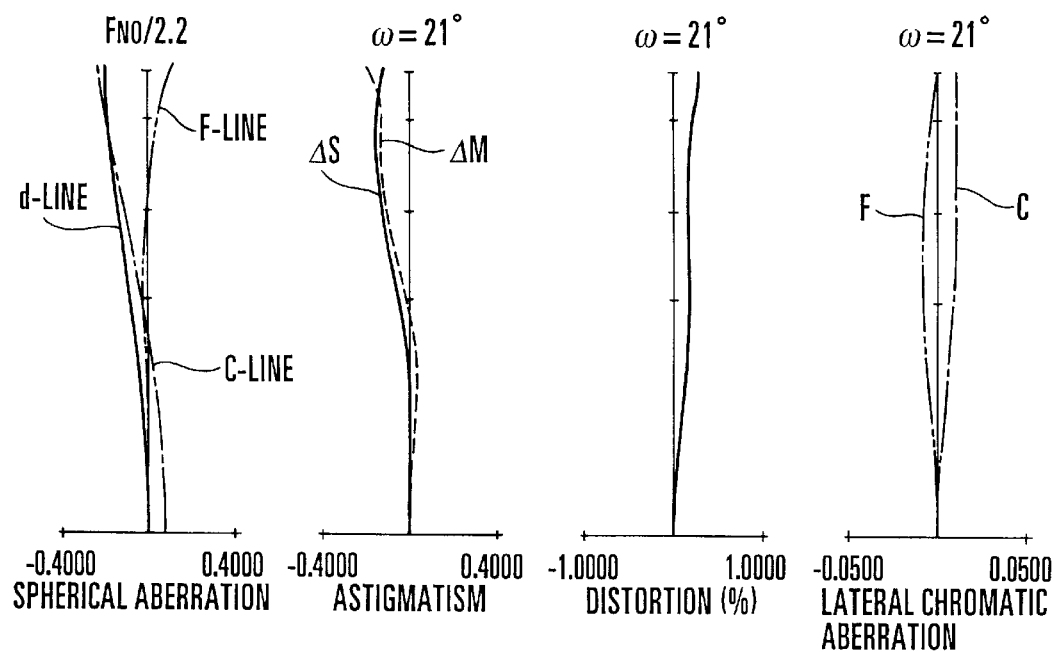

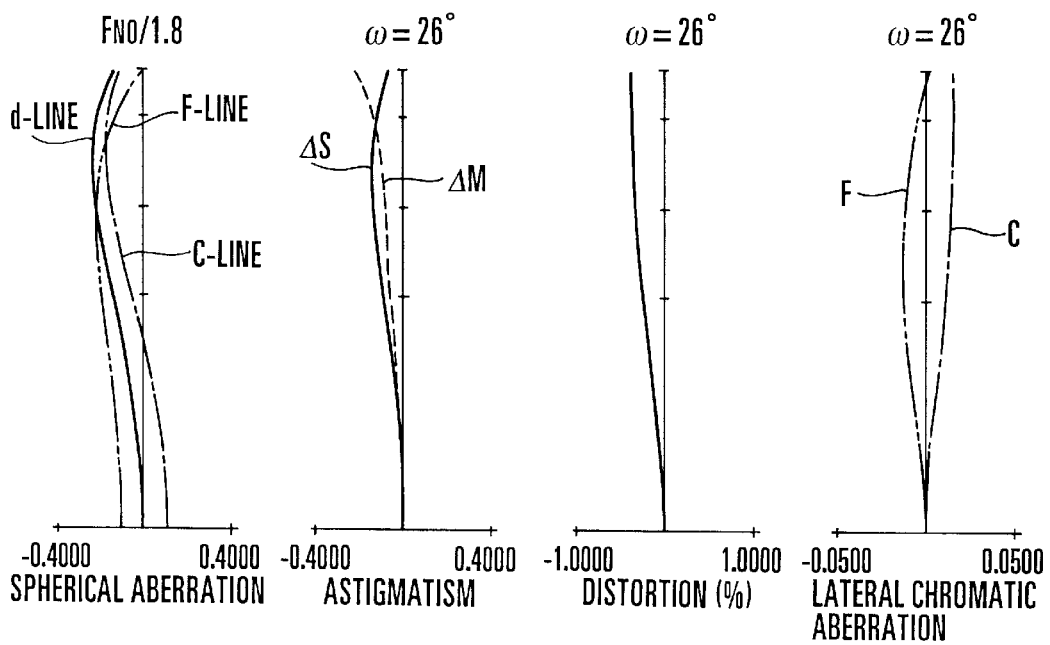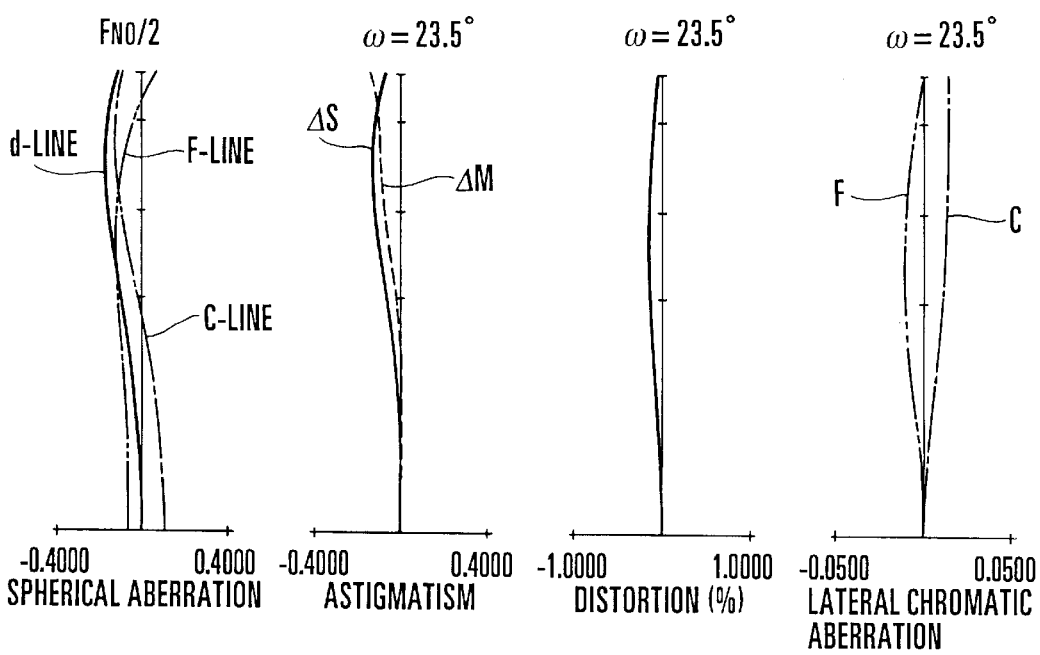

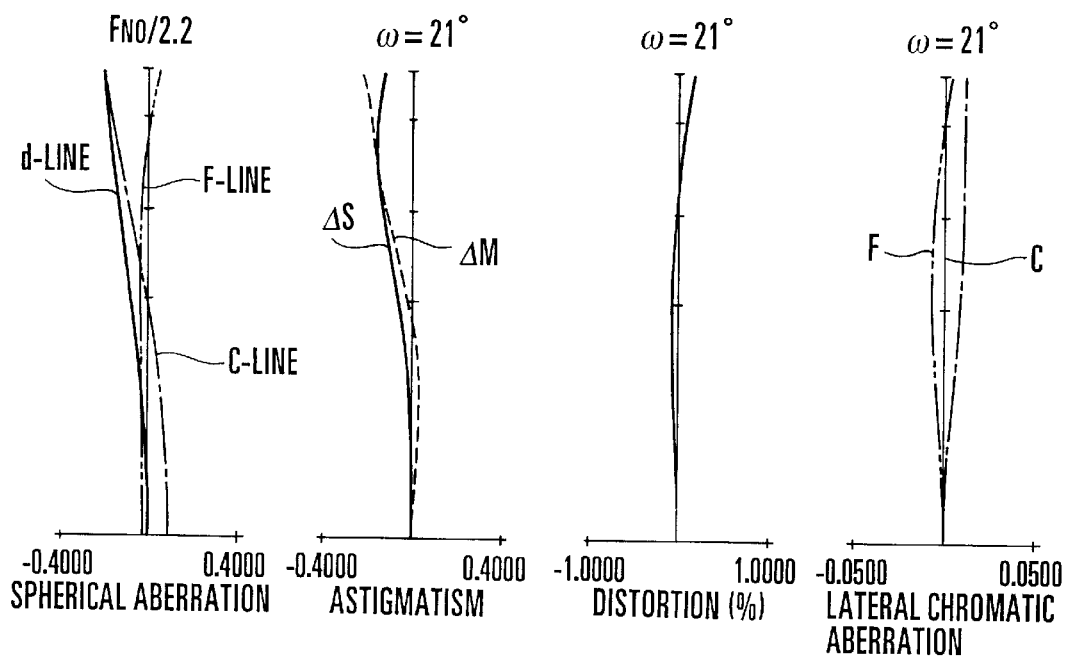

ZOOM LENS AND DISPLAY APPARATUS HAVING THE SAME

CROSS-REFERENCE TO RELATED APPLICATIONS

This application is a continuation-in-part of application Ser. No. 09/217,939 filed Dec. 22, 1998 abandoned.

BACKGROUND OF THE INVENTION

1. Field of the Invention

The present invention relates to zoom lenses suited to be used in display apparatuses, for example, projection apparatuses for displaying an original image onto a screen in an enlarged scale and, more particularly, to a zoom lens of simple design in a compact form suited to be used in a projection apparatus of the type in which three images of original colors on individual liquid crystal display panels or like displays are combined to form the original image in high definition and are then projected by only one projection lens.

2. Description of Related Art

The zoom lens whose front lens unit is negative in refractive power, that is, of the negative-lead type, has the advantages that the maximum field angle is relatively easy to increase and the image quality is kept stable in close-up photography. On the other hand, the zoom lens of the negative-lead type the such disadvantages that the zooming movement becomes longer and the zooming range is difficult to increase.

With these disadvantages in mind, zoom lenses of an increased range, while still permitting the bulk and size of the entire system to be reduced to a compact form, are disclosed in, for example, Japanese Patent Publication No. Sho 49-23912 and Japanese Laid-Open Patent Applications No. Sho 53-34539, No. Sho 57-163213, No. Sho 58-4113, No. Sho 63-241511 and No. Hei 2-201310.

In these publications, the zoom lens comprises four lens units of minus-plus-minus-plus refractive power arrangement in this order from the object side. Of the four lens units, predetermined ones are made to axially move in proper relation to effect zooming.

It is known to provide an apparatus for displaying an image on a screen in an enlarged scale by projection, in particular, an apparatus of a type in which a plurality of images of original colors on the respective individual liquid crystal display panels are combined to form an image in the gamut of colors, which is then projected by the projection lens. To adapt the negative-lead type zoom lenses mentioned above for application to such a projection lens, it becomes necessary to satisfy the following various conditions.

(i) The liquid crystal display panel has radiation characteristics and the assembly of dichroic mirrors suffers angle dependence in combining the plurality of images of original colors. In order to remove the influence of either of these factors, the optical system to be used should have the pupil as viewed from the display panel (the pupil as viewed from a shorter conjugate point side) put at a remote distance, or should be a so-called telecentric one.

(ii) The back focal distance should be long enough to secure the space the color combining elements occupy between the display panel assembly and the projection lens.

(iii) The image-bearing light beam is usually skewed upward as is projected onto the screen. So, the display panel assembly is arranged with its center shifted out of the optical axis. As a result, in a region near the front lens members, the effective area to use is not symmetrical with respect to the optical axis, but deviates upward. To allow this, the diameter of the front lens members necessarily becomes large. This must be obviated to reduce the bulk and size of the front lens members as far as possible.

Regardless of such requirements, in the prior art as previously mentioned, the pupil as viewed from a shorter conjugate point side lies at a finite distance and the back focal distance, too, cannot be said to be long enough.

BRIEF SUMMARY OF THE INVENTION

It is an object of the invention to eliminate the above-described problems and to provide a zoom lens suited to the projection lens in the display apparatus.

To attain the above object, in accordance with an aspect of the invention, there is provided a zoom lens for projecting an original image onto screen in an enlarged scale, which comprises, in order from the screen side, a first lens unit of negative refractive power, a second lens unit of positive refractive power, a third lens unit of negative refractive power, a fourth lens unit of positive refractive power and a fifth lens unit of positive refractive power, wherein, during zooming from a wide-angle end to a telephoto end, the second lens unit and the fourth lens unit move toward the screen side.

The above and further objects and features of the invention will become apparent from the following detailed description of preferred embodiments thereof taken in conjunction with the accompanying drawings.

BRIEF DESCRIPTION OF THE SEVERAL VIEWS OF THE DRAWING

FIGS. 6A to 6D are graphic representations of the aberrations of a numerical example 1 of the zoom lens at the wide-angle end.

FIGS. 7A to 7D are graphic representations of the aberrations of the numerical example 1 of the zoom lens at the telephoto end.

FIGS. 8A to 8D are graphic representations of the aberrations of a numerical example 2 of the zoom lens at the wide-angle end.

FIGS. 9A to 9D are graphic representations of the aberrations of the numerical example 2 of the zoom lens at the telephoto end.

FIGS. 10A to 10D are graphic representations of the aberrations of a numerical example 3 of the zoom lens at the wide-angle end.

FIGS. 11A to 11D are graphic representations of the aberrations of the numerical example 3 of the zoom lens at the telephoto end.

FIGS. 12A to 12D are graphic representations of the aberrations of a numerical example 4 of the zoom lens at the wide-angle end.

FIGS. 13A to 13D are graphic representations of the aberrations of the numerical example 4 of the zoom lens at the telephoto end.

FIGS. 14A to 14D are graphic representations of the aberrations of a numerical example 5 of the zoom lens at the wide-angle end.

FIGS. 15A to 15D are graphic representations of the aberrations of the numerical example 5 of the zoom lens at the telephoto end.

FIGS. 17A to 17D are graphic representations of the aberrations of the zoom lens of a numerical example 6 in the wide-angle end.

FIGS. 18A to 18D are graphic representations of the aberrations of the zoom lens of the numerical example 6 in an intermediate focal length position.

FIGS. 19A to 19D are graphic representations of the aberrations of the zoom lens of the numerical example 6 in the telephoto end.

FIGS. 21A to 21D are graphic representations of the aberrations of the zoom lens of a numerical example 7 in the wide-angle end.

FIGS. 22A to 22D are graphic representations of the aberrations of the zoom lens of the numerical example 7 in an intermediate focal length position.

FIGS. 25A to 25D are graphic representations of the aberrations of the zoom lens of a numerical example 8 at the wide-angle end.

FIGS. 26A to 26D are graphic representations of the aberrations of the zoom lens of the numerical example 8 in an intermediate focal length position.

FIGS. 29A to 29D are graphic representations of the aberrations of the zoom lens of a numerical example 9 at the wide-angle end.

FIGS. 30A to 30D are graphic representations of the aberrations of the zoom lens of the numerical example 9 in an intermediate focal length position.

FIGS. 31A to 31D are graphic representations of the aberrations of the zoom lens of the numerical example 9 at the telephoto end.

FIG. 32 is a longitudinal section view of a tenth embodiment of the zoom lens according to the invention.

FIGS. 37A to 37D are graphic representations of the various aberrations of the zoom lens of a numerical example 10 at the wide-angle end.

FIGS. 38A to 38D are graphic representations of the various aberrations of the zoom lens of the numerical example 10 in an intermediate focal length position.

FIGS. 41A to 41D are graphic representations of the various aberrations of the zoom lens of the numerical example 11 in an intermediate focal length position.

FIGS. 42A to 42D are graphic representations of the aberrations of the zoom lens of the numerical example 11 at the telephoto end.

FIGS. 43A to 43D are graphic representations of the various aberrations of the zoom lens of a numerical example 12 at the wide-angle end.

FIGS. 44A to 44D are graphic representations of the various aberrations of the zoom lens of the numerical example 12 in an intermediate focal length position.

FIGS. 45A to 45D are graphic representations of the aberrations of the zoom lens of the numerical example 12 at the telephoto end.

FIGS. 46A to 46D are graphic representations of the various aberrations of the zoom lens of a numerical example 13 at the wide-angle end.

FIGS. 47A to 47D are graphic representations of the various aberrations of the zoom lens of the numerical example 13 in an intermediate focal length position.

FIGS. 48A to 48D are graphic representations of the aberrations of the zoom lens of the numerical example 13 at the telephoto end.

FIGS. 49A to 49D are graphic representations of the various aberrations of the zoom lens of a numerical example 14 in the wide-angle end.

FIGS. 50A to 50D are graphic representations of the various aberrations of the zoom lens of the numerical example 14 in an intermediate focal length position.

FIGS. 51A to 51D are graphic representations of the aberrations of the zoom lens of the numerical example 14 at the telephoto end.

DETAILED DESCRIPTION OF THE INVENTION

Hereinafter, preferred embodiments of the invention will be described in detail with reference to the drawings.

Figure 1:
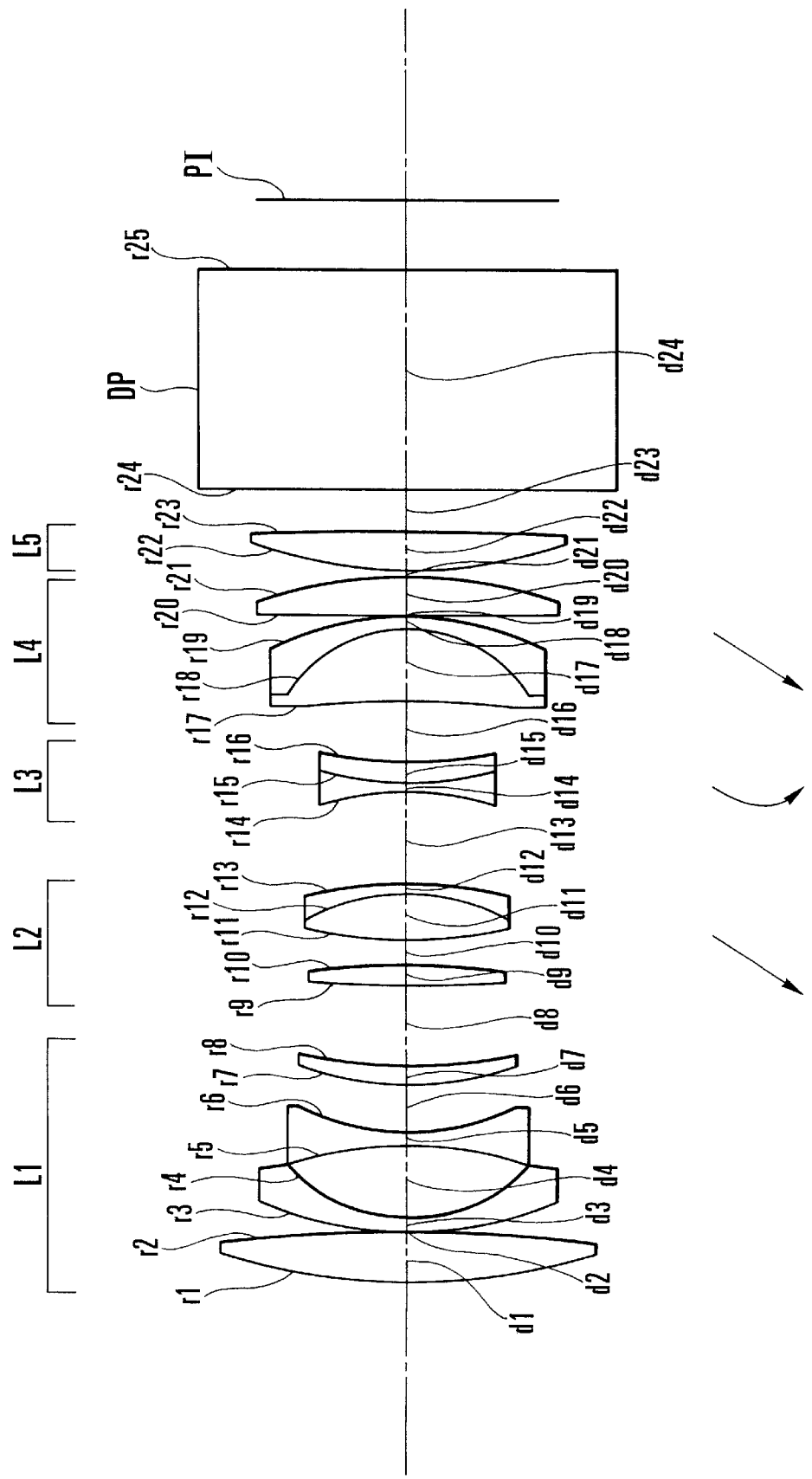
FIG. 1 is a longitudinal section view of a first embodiment of the zoom lens according to the invention.

FIG. 1 is a longitudinal section view of a first embodiment of the zoom lens according to the invention, which is used to project image information of a display element PI (original image) in an enlarged scale onto a screen (not shown) that is assumed to be present on the left side at a far distance. In the first embodiment, the zoom lens comprises, in order from the screen side (the left side as viewed in FIG. 1), a first lens unit L1 of negative refractive power, a second lens unit L2 of positive refractive power, a third lens unit L3 of negative refractive power, a fourth lens unit L4 of positive refractive power and a fifth lens unit L5 of positive refractive power, followed by a color-combining element DP such as a dichroic prism. Further, in the first embodiment, to simplify the structural arrangement of the zoom lens, the first lens unit L1 and the fifth lens unit L5 are made stationary during zooming. Of the remaining lens units, the second lens unit L2 and the fourth lens unit L4 axially move toward the screen side to effect zooming from the wide-angle end to the telephoto end, while the third lens unit L3 simultaneously moves in a locus convex toward the screen side to compensate for the shift of an image plane with the movements of the second lens unit L2 and the fourth lens unit L4. Accordingly, during zooming from the wide-angle end to the telephoto end, the separation between the first lens unit L1 and the second lens unit L2 decreases, the separation between the second lens unit L2 and the third lens unit L3 increases, the separation between the third lens unit L3 and the fourth lens unit L4 decreases, and the separation between the fourth lens unit L4 and the fifth lens unit L5 increases. Although, in FIG. 1, only one display element PI is illustrated, in actual practice that there are a plurality of display elements corresponding to the original colors such as red, green and blue. The light beams from the plurality of display elements are combined in passing through the color combining element DP to form an image, which is then projected by the zoom lens onto the screen.

In the present embodiment, the fifth lens unit L5, which is closest to the display element PI, is given a relatively strong positive refractive power to realize formation of a telecentric system toward the display element PI. Still another feature of the first embodiment is that the fifth lens unit L5 is made up from one positive lens having a lens surface facing the screen side, which is stronger in convex curvature than a lens surface thereof facing the display element PI, thereby achieving simultaneous fulfillment of the correction of off-axial curvature of field and of the simplification of the structural arrangement. Further, it is preferred that the fifth lens unit L5 has at least one bi-convex lens, as in the present embodiment.

By making the zooming provision in the second lens unit L2, the third lens unit L3 and the fourth lens unit L4, the total movement of each of the second lens unit L2 and the fourth lens unit L4 is invaluably reduced, while still maintaining a great increase of the zooming range to be achieved, thus assuring that the total length of the entire lens system is to be shortened and, at the same time, that, as the position of the entrance pupil determines the diameter of the front lens members which admit of the off-axial oblique light beam, its distance from the front vertex, too, is shortened.

The first lens unit L1 is made negative in refractive power to secure a long back focal distance for the space the color combining element DP occupies. In particular, to increase the back focal distance, the first lens unit L1 is better made to include a negative meniscus lens convex toward the screen side. Further, all the lens units have their refractive powers in an appropriate arrangement and the first lens unit L1 is made stationary during zooming, thereby making it possible to realize a lens system that varies the position of the off-axial oblique light beam to a lesser extent and is simple to design and still whose total length is kept constant during zooming. Also, to reduce distortion at the wide-angle end, a convex lens is put at the position closest to the screen side in the first lens unit L1 to admit of the most off-axial light beam in correcting distortion.

Focusing onto finite distances is preferably carried out by the first lens unit L1. However, the third lens unit L3 or the fifth lens unit L5 may be used instead. Focusing may be otherwise carried out by moving two or more of the lens units in differential relation. Focusing can also be carried out by bodily moving the zoom lens or adjusting the position of the screen.

In the first embodiment shown in FIG. 1, during zooming from the wide-angle end to the telephoto end, the first lens unit L1 and the fifth lens unit L5 remain stationary, the second lens unit L2 and the fourth lens unit L4 axially move toward the screen side, while the third lens unit L3 axially moves in a locus convex toward the screen side with the inflection occurring at a nearer point to the telephoto end. The first embodiment provides an arrangement for the largest relative aperture among all the embodiments.

Figure 2:
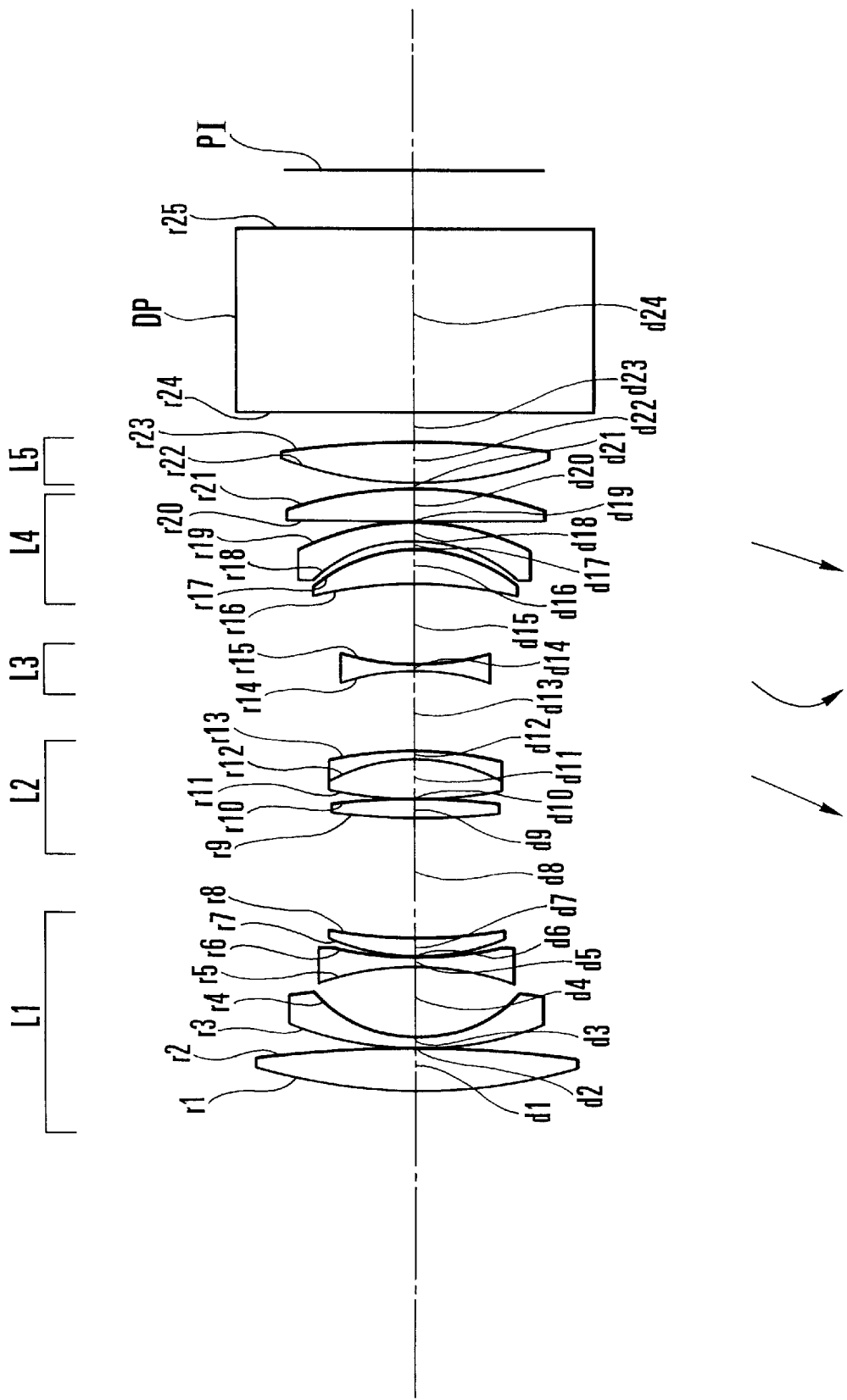
FIG. 2 is a longitudinal section view of a second embodiment of the zoom lens according to the invention.

FIG. 2 shows a second embodiment of the zoom lens, where, similarly to the first embodiment, during zooming from the wide-angle end to the telephoto end, the first lens unit L1 and the fifth lens unit L5 remain stationary and the second lens unit L2 and the fourth lens unit L4 axially move toward the screen side, while the third lens unit L3 axially moves in a locus convex toward the screen side with the inflection occurring at a nearer point to the telephoto end. This zoom lens has a higher zoom ratio.

Figure 3:
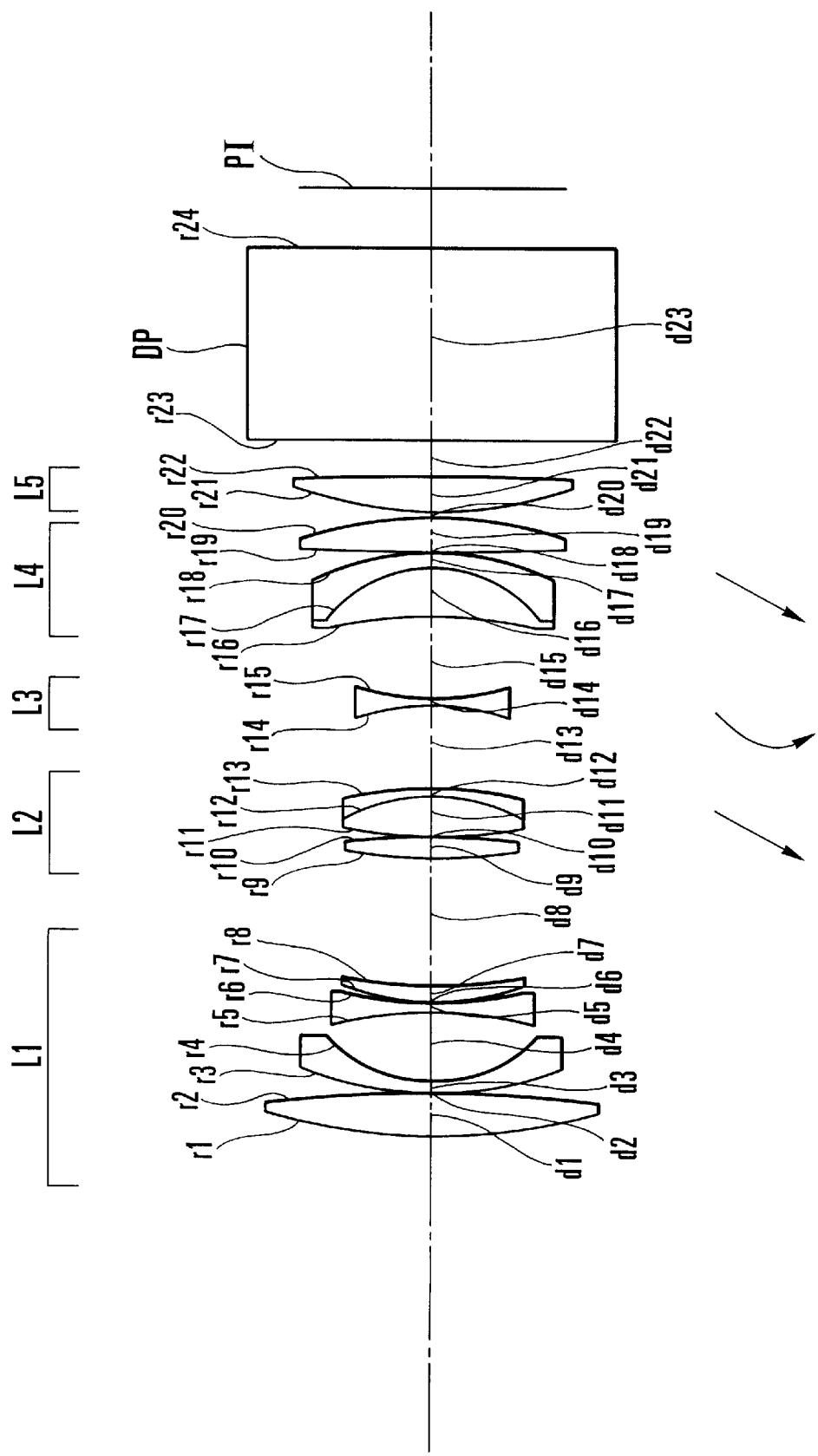
FIG. 3 is a longitudinal section view of a third embodiment of the zoom lens according to the invention.

FIG. 3 shows a third embodiment of the zoom lens, which is different in structure from the second embodiment. In the third embodiment, during zooming from the wide-angle end to the telephoto end, the first lens unit L1 and the fifth lens unit L5 remain stationary and the second lens unit L2 and the fourth lens unit L4 axially move toward the screen side, while the third lens unit L3 axially moves in a locus convex toward the screen side with the inflection occurring at a nearer point to the telephoto end.

Figure 4:
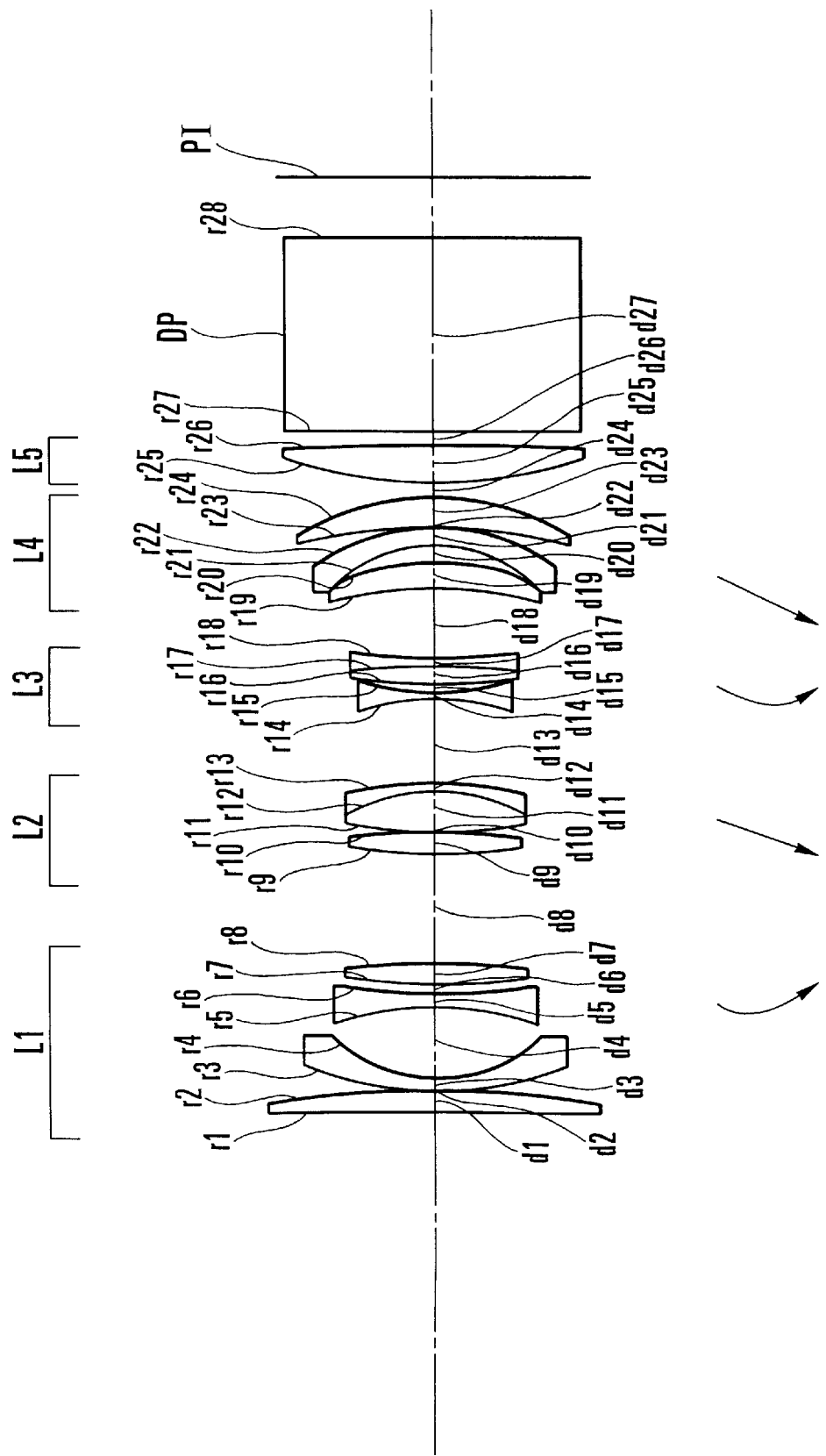
FIG. 4 is a longitudinal section view of a fourth embodiment of the zoom lens according to the invention.

FIG. 4 shows a fourth embodiment of the zoom lens. In the fourth embodiment, during zooming from the wide-angle end to the telephoto end, the first lens unit L1 axially moves in a locus convex toward the screen side, taking a nearer position to the display element PI side in the telephoto end than at the wide-angle end. The fifth lens unit L5 remains stationary during zooming. Also, during zooming from the wide-angle end to the telephoto end, the second lens unit L2 and the fourth lens unit L4 axially move toward the screen side, while the third lens unit L3 axially moves in a locus convex toward the screen side with the inflection occurring at a nearer point to the telephoto end.

Figure 5:
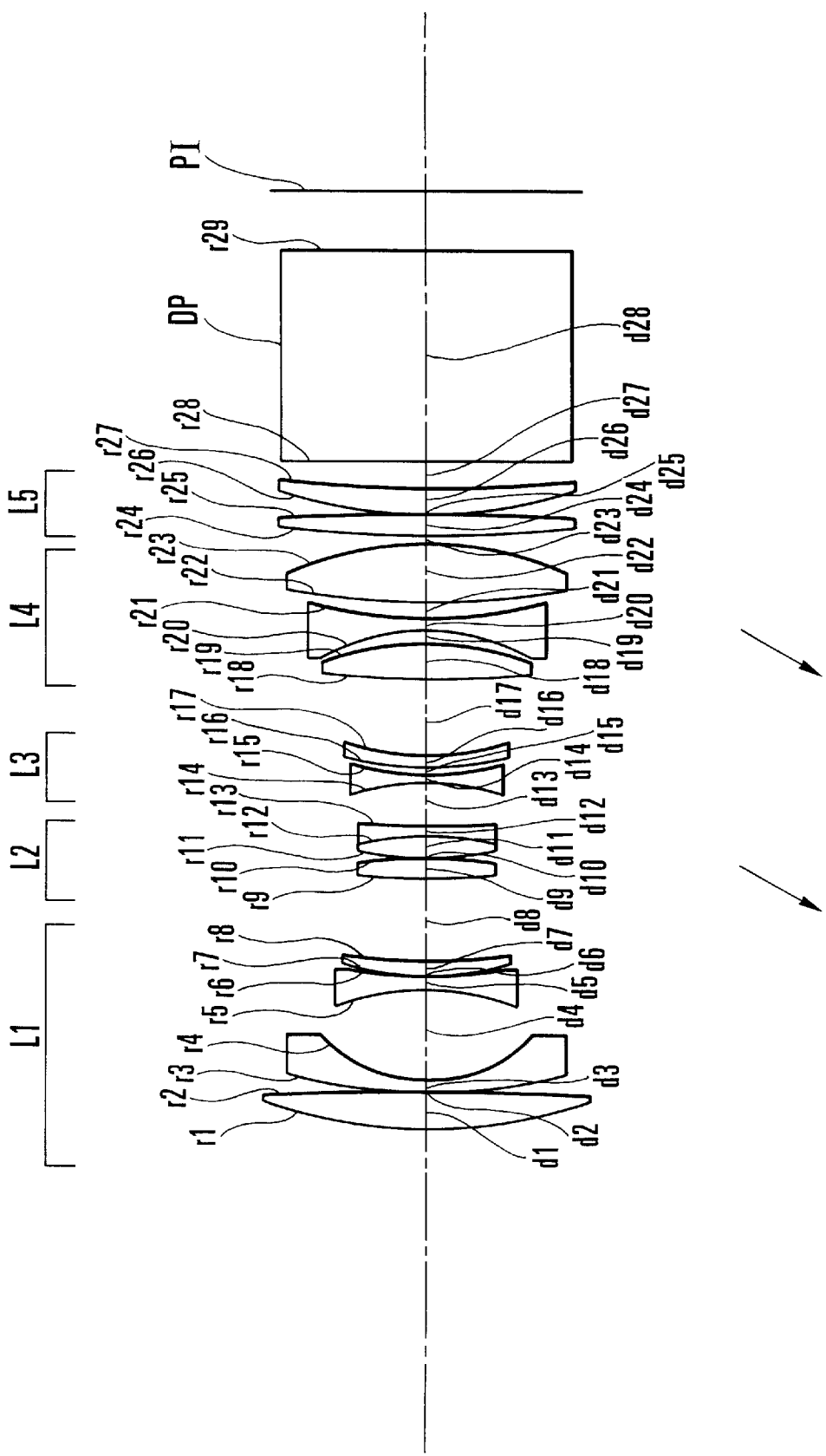
FIG. 5 is a longitudinal section view of a fifth embodiment of the zoom lens according to the invention.

FIG. 5 shows a fifth embodiment of the zoom lens, where, during zooming from the wide-angle end to the telephoto end, the first lens unit L1 and the fifth lens unit L5 remain stationary and the second lens unit L2 and the fourth lens unit L4 axially move toward the screen side. The third lens unit L3, too, remains stationary during zooming.

In the above-described embodiments, for more desired results, it is preferred that the focal lengths f1 and f2 of the first lens unit L1 and the second lens unit L2, respectively, satisfy the following conditions:

$$1.1 < |f1|/f2 < 2.3 \qquad (1)$$

$$0.6 < f2/\sqrt{fw \cdot ft} < 1.2 \qquad (2)$$

where fw and ft are the focal lengths at the wide-angle end and the telephoto end of the entire lens system, respectively.

The inequalities of condition (1) give a proper range for the correlation of the second lens unit L2 as the main variator with the first lens unit L1. When the lower limit of the condition (1) is exceeded, the diameter of the front members, which is determined depending on the focal length f1, becomes large and the distortion increases at the wide-angle end. So, these are objectionable. When the upper limit is exceeded, the total movement of the second lens unit L2 has to increase. Otherwise, the desired zoom ratio could not be obtained. Therefore, the size of the entire lens system is caused to increase objectionably.

The inequalities of condition (2) give a proper range for the refractive power of the main variator. When the lower limit is exceeded, over-correction of filed curvature results. When the upper limit is exceeded, the total movement of the second lens unit L2 increases to obtain the desired zoom ratio and a large increase of the size of the entire lens system results. So, these are objectionable.

In particular, to correct distortion well, it is preferred to satisfy the following condition:

$$1<|f1|/fw<2 \tag{3}$$

When the upper limit of the condition (3) is exceeded, the distortion in the wide-angle end can no longer be corrected well. When the lower limit is exceeded, the distortion in the telephoto end can no longer be corrected well.

It is to be noted that the term "nearly telecentric" or "just telecentric" system used in the present specification means that, since, as described before, the liquid crystal display has a radiation characteristics and the combination of colors depends on the angles of inclination of the dichroic mirrors, the system in question has its exit pupil made to lie at a remote distance (ideally at infinity), thus removing the influence of either of them. In actual practice, for that angle dependency to be taken into account, it is preferred that, of the absolute values of the distance from the display panel (contracted side) to the exit pupil over the entire zooming range, the minimum distance |tk| lies in the following range:

$$|tk|/fw>4.0 \tag{4}$$

For more desired results, it is preferred to alter the condition (4) as follows:

$$|tk|/fw>9.0 \tag{4'}$$

For the main variator or second lens unit L2, letting the ratio of the magnification β2t at the telephoto end of the second lens unit L2 to the magnification β2w at the wide-angle end of the second lens unit L2 be denoted by Z2, the ratio of the focal length ft at the telephoto end of the entire lens system to the focal length fw at the wide-angle end of the entire lens system be denoted by Z, and the absolute values of total zooming movement of the second lens unit L2 and the fourth lens unit L4 be denoted by M2 and M4, respectively, it is preferred to satisfy the following conditions:

$$0.8 < Z2/Z < 1.1 \tag{5}$$

$$0.9 < M2/M4 < 1.6 \tag{6}$$

$$0.4 < M2/(ft-fw) < 1.0 \tag{7}$$

The inequalities of condition (5) give a proper range for the ratio of the variable magnifications of the second lens unit L2 and the fourth lens unit L4, which serve as variators. Because the third lens unit L3 contributes to a decrease of the variable magnification, it is preferred to retain the above range. The inequalities of conditions (6) and (7) have an aim to make a good compromise between the total length of the entire lens system and the zooming movement of each of the variators. In particular, of the second lens unit L2 and the fourth lens unit L4, the fourth lens unit L4 is rather apt to have a weak refractive power. To assure the contribution of the fourth lens unit L4 to an appropriate variation of the focal length, it is preferred to retain the above range. In particular, it is more preferred that the total zooming movement of the second lens unit L2 exceeds the total zooming movement of the fourth lens unit L4.

On consideration of the fact that, as described above, the fourth lens unit L4 is more apt to become weak in refractive power than the second lens unit L2 is, it is preferred to satisfy particularly the following condition:

$$0.4<f2/f4<0.8 \tag{8}$$

where f4 is the focal length of the fourth lens unit L4.

The inequalities of conditions (8) and (6) are necessary ones for making an appropriate power arrangement and variation of the main variator to determine a proper value of the Petzval sum.

To put the exit pupil of the entire lens system at a proper distance and make acceptable distortion, letting the distance from the fifth lens unit L5 to the display element PI, as reduced to air by removing the dichroic prism DP, be denoted by bf, and the focal length of the fifth lens unit L5 be denoted by f5, it is preferred to satisfy the following conditions:

$$0.3 < bf/f5 < 0.5 \tag{9}$$

$$1.2 < |f1|/bf < 2.2 \tag{10}$$

The inequalities of condition (9) are necessary ones for making the entire lens system to a proper telecentric form. When the upper limit is exceeded, the entire lens system increases in size greatly. When the lower limit is exceeded, distortion is produced. The inequalities of condition (10) are also for elongating the exit pupil to insure formation of the telecentric system in such a manner that the distortion produced is acceptable.

In particular, with the telecentric system optimumly formed, in order to optimize the distance from the zoom lens to the display panel, it is preferred to satisfy the following condition:

$$2<f5/fw<3.5 \tag{11}$$

When the lower limit of the condition (11) is exceeded, the optimum telecentricity cannot be satisfied. When the upper limit is exceeded, the size increases objectionably.

To further improve the compact form, the refractive powers of all the lens units except the main variator must be appropriately arranged to make proper the movements of the zooming lens units. For this purpose, it is preferred to satisfy the following conditions:

$$1.0 < |f1|/\sqrt{fw \cdot ft} < 1.6 \tag{12}$$

$$0.6 < |f3|/\sqrt{fw \cdot ft} < 1.2 \tag{13}$$

$$1.1 < f4/\sqrt{fw \cdot ft} < 1.8 \tag{14}$$

$$1.5 < f5/\sqrt{fw \cdot ft} < 3.0 \tag{15}$$

where f3 is the focal length of the third lens unit L3.

Particularly for lateral chromatic aberration, not only to reduce it over the entire zooming range, but also to maintain it stable, it is preferred that the third lens unit L3 includes a lens element whose Abbe number ν3 lies within the following range:

$$\nu 3>55 \tag{16}$$

In particular, it is more preferred to narrow the range as follows:

$$\nu 3>60 \tag{16'}$$

Also, in order to decrease chromatic aberrations over the entire zooming range and reduce the range of variation of the chromatic aberrations due to zooming, the first lens unit L1 has to be constructed with inclusion of negative lens elements whose mean Abbe number v1n lies within the following range:

$$v1n > 60 \tag{17}$$

Next, five numerical examples 1 to 5 corresponding to the first to fifth embodiments, respectively, are shown. In the numerical data for the examples 1 to 5, ri is the radius of curvature of the i-th surface, when counted from the screen side, di is the i-th lens thickness or air separation, when counted from the screen side, and ni and vi are respectively the refractive index and Abbe number of the material of the i-th optical element, when counted from the screen side.

Numerical Example 1:

| f = 100.00000~129.3 | | Fno = 1:1.8~2.1 | | 2ω= 55°~43.6° | |
|---|---|---|---|---|---|
| r1 = | 257.877 | d1 = | 21.15 | n1 = 1.51633 | v1 = 64.1 |
| r2 = | −916.765 | d2 = | 0.60 | | |
| r3 = | 173.203 | d3 = | 6.63 | n2 = 1.51633 | v2 = 64.1 |
| r4 = | 76.580 | d4 = | 32.14 | | |
| r5 = | −146.753 | d5 = | 6.03 | n3 = 1.51633 | v3 = 64.1 |
| r6 = | 100.187 | d6 = | 22.59 | | |
| r7 = | 136.079 | d7 = | 9.05 | n4 = 1.80518 | v4 = 25.4 |
| r8 = | 226.085 | d8 = | Variable | | |
| r9 = | 458.458 | d9 = | 8.52 | n5 = 1.77250 | v5 = 49.6 |
| r10 = | −458.585 | d10 = | 11.97 | | |
| r11 = | 230.660 | d11 = | 20.02 | n6 = 1.69680 | v6 = 55.5 |
| r12 = | −92.414 | d12= | 4.22 | n7 = 1.80518 | v7 = 25.4 |
| r13 = | −204.747 | D13 = | Variable (Stop) | | |
| r14 = | −117.639 | d14 = | 3.92 | n8 = 1.51633 | v8 = 64.1 |
| r15 = | 117.639 | d15 = | 9.65 | n9 = 1.80518 | v9 = 25.4 |
| r16 = | 145.223 | d16 = | Variable | | |
| r17 = | −443.581 | d17 = | 31.26 | n10 = 1.69680 | v10 = 55.5 |
| r18 = | −64.074 | d18 = | 6.03 | n11 = 1.80518 | v11 = 25.4 |
| r19 = | −131.339 | d19 = | 0.60 | | |
| r20 = | 2090.520 | d20 = | 16.52 | n12 = 1.60311 | v12 = 60.6 |
| r21 = | −220.342 | d21 = | Variable | | |
| r22 = | 186.134 | d22 = | 18.37 | n13 = 1.60311 | v13 = 60.6 |
| r23 = | −4345.838 | d23 = | 20.25 | | |
| r24 = | ∞ | d24 = | 96.48 | n14 = 1.51633 | v14 = 64.2 |
| r25 = | ∞ | | | | |

| Variable Separation | 100.00 | Focal Length 113.61 | 129.30 |
|---|---|---|---|
| d8 | 34.64 | 20.45 | 9.16 |
| d13 | 42.21 | 50.54 | 61.65 |
| d16 | 27.65 | 22.84 | 14.98 |
| d21 | 3.02 | 13.68 | 21.73 |

Numerical Example 2:

| f = 100.00000~158.97 | | Fno = 1:2.3~3.0 | | 2ω= 50.5°32.3° | |
|---|---|---|---|---|---|
| r1 = | 249.961 | d1 = | 12.42 | n1 = 1.60311 | v1 = 60.6 |
| r2 = | −411.372 | d2 = | 0.55 | | |
| r3 = | 205.115 | d3 = | 4.42 | n2 = 1.51633 | v2 = 64.1 |
| r4 = | 58.412 | d4 = | 26.29 | | |
| r5 = | −76.525 | d5 = | 4.14 | n3 = 1.51633 | v3 = 64.1 |
| r6 = | 273.991 | d6 = | 1.38 | | |
| r7 = | 144.155 | d7 = | 7.18 | n4 = 1.80518 | v4 = 25.4 |
| r8 = | 477.185 | d8 = | Variable | | |
| r9 = | 238.906 | d9 = | 7.45 | n5 = 1.83400 | v5 = 37.2 |
| r10 = | −238.906 | d10 = | 0.41 | | |
| r11 = | 236.764 | d11 = | 16.01 | n6 = 1.72000 | v6 = 50.2 |
| r12 = | −56.537 | d12 = | 3.31 | n7 = 1.76182 | v7 = 26.5 |
| r13 = | −373.800 | D13 = | Variable (Stop) | | |
| r14 = | −112.532 | d14 = | 3.31 | n8 = 1.48749 | v8 = 70.2 |
| r15 = | 112.532 | d15 = | Variable | | |
| r16 = | −189.788 | d16 = | 17.94 | n9 = 1.69680 | v9 = 55.5 |
| r17 = | −59.517 | d17 = | 2.76 | | |
| r18 = | −58.018 | d18 = | 4.97 | n10 = 1.80518 | v10 = 25.4 |
| r19 = | −105.595 | d19 = | 1.38 | | |
| r20 = | −1913.013 | d20 = | 11.04 | n11 = 1.63854 | v11 = 55.4 |
| r21 = | −201.683 | d21 = | Variable | | |
| r22 = | 205.826 | d22 = | 15.46 | n12 = 1.63854 | v12 = 55.4 |
| r23 = | −385.215 | d23 = | 9.66 | | |
| r24 = | ∞ | d24 = | 82.82 | n13 = 1.51633 | v13 = 64.2 |
| r25 = | ∞ | | | | |

| Variable Separation | 100.00 | Focal Length 130.63 | 158.97 |
|---|---|---|---|
| d8 | 39.86 | 15.98 | 3.17 |
| d13 | 27.30 | 41.55 | 53.99 |
| d15 | 39.54 | 28.81 | 13.83 |
| d21 | 2.76 | 23.12 | 38.48 |

Numerical Example 3:

| f = 100.00000~158.06 | | Fno = 1:2.31~3.0 | | 2ω= 50.3°~32.3° | |
|---|---|---|---|---|---|
| r1 = | 196.239 | d1 = | 15.07 | n1 = 1.60311 | v1 = 60.6 |
| r2 = | −491.879 | d2 = | 0.55 | | |
| r3 = | 179.892 | d3 = | 4.41 | n2 = 1.51633 | v2 = 64.1 |
| r4 = | 55.314 | d4 = | 28.35 | | |
| r5 = | −74.931 | d5 = | 4.13 | n3 = 1.51633 | v3 = 64.1 |
| r6 = | 291.815 | d6 = | 0.10 | | |
| r7 = | 131.408 | d7 = | 7.17 | n4 = 1.80518 | v4 = 25.4 |
| r8 = | 352.793 | d8 = | Variable | | |
| r9 = | 231.211 | d9 = | 7.99 | n5 = 1.83400 | v5 = 37.2 |
| r10 = | −21.515 | d10 = | 0.48 | | |
| r11 = | 413.645 | d11 = | 15.16 | n6 = 1.72000 | v6 = 50.2 |
| r12 = | −55.333 | d12 = | 3.31 | n7 = 1.76182 | v7 = 26.5 |
| r13 = | −323.885 | d13 = | Variable (Stop) | | |
| r14 = | −98.340 | d14 = | 3.31 | n8 = 1.48749 | v8 = 70.2 |
| r15 = | 140.889 | d15 = | Variable | | |
| r16 = | −153.499 | d16 = | 19.30 | n9 = 1.69680 | v9 = 55.5 |
| r17 = | −54.452 | d17 = | 4.96 | n10 = 1.80518 | v10 = 25.4 |
| r18 = | −94.141 | d18 = | 0.83 | | |
| r19 = | 3043.936 | d19 = | 12.40 | n11 = 1.63854 | v11 = 55.4 |
| r20 = | −199.501 | d20 = | Variable | | |
| r21 = | 163.968 | d21 = | 17.37 | n12 = 1.63854 | v12 = 55.4 |
| r22 = | −21522.170 | d22 = | 25.52 | | |
| r23 = | ∞ | d23 = | 82.70 | n13 = 1.51633 | v13 = 64.2 |
| r24 = | ∞ | | | | |

| Variable Separation | 100.00 | Focal Length 124.72 | 158.06 |
|---|---|---|---|
| d8 | 38.59 | 20.45 | 3.01 |
| d13 | 27.71 | 41.43 | 60.14 |
| d15 | 36.45 | 29.19 | 13.35 |
| d20 | 2.76 | 16.57 | 28.99 |

Numerical Example 4:

| f = 100.00000~154.3 | | Fno = 1:2.5~3.0 | | 2ω= 55.8°~36.5° | |
|---|---|---|---|---|---|
| r1 = | −1988.193 | d1 = | 9.69 | n1 = 1.77250 | v1 = 49.6 |
| r2 = | −296.881 | d2 = | 0.29 | | |
| r3 = | 186.766 | d3 = | 4.84 | n2 = 1.48749 | v2 = 70.2 |
| r4 = | 71.563 | d4 = | 29.18 | | |
| r5 = | −86.237 | d5 = | 4.54 | n3 = 1.48749 | v3 = 70.2 |
| r6 = | 431.800 | d6 = | 3.03 | | |
| r7 = | 370.629 | d7 = | 7.57 | n4 = 1.84666 | v4 = 23.8 |
| r8 = | −1187.571 | d8 = | Variable (Stop) | | |
| r9 = | 129.582 | d9 = | 9.69 | n5 = 1.60311 | v5 = 60.6 |
| r10 = | −263.492 | d10 = | 0.45 | | |
| r11 = | 152.292 | d11 = | 13.02 | n6 = 1.69680 | v6 = 55.5 |
| r12 = | −90.645 | d12 = | 3.63 | n7 = 1.75520 | v7 = 27.5 |
| r13 = | −887.546 | D13 = | Variable | | |
| r14 = | −134.654 | d14 = | 3.63 | n8 = 1.63854 | v8 = 55.4 |

-continued

| | | | | | | | |
|---|---|---|---|---|---|---|---|
| r15 = | 87.770 | d15 = | 2.97 | | | | |
| r16 = | 166.658 | d16 = | 6.66 | n9 = 1.69680 | v9 = | 55.5 |
| r17 = | −963.346 | d17 = | 3.63 | n10 = 1.80518 | v10 = | 25.4 |
| r18 = | 273.134 | d18 = | Variable | | | |
| r19 = | −240.499 | d19 = | 13.63 | n11 = 1.69680 | v11 = | 55.5 |
| r20 = | −96.487 | d20 = | 6.96 | | | |
| r21 = | −62.030 | d21 = | 7.57 | n12 = 1.74077 | v12 = | 27.8 |
| r22 = | −85.500 | d22 = | 1.57 | | | |
| r23 = | −236.107 | d23 = | 12.11 | n13 = 1.69680 | v13 = | 55.5 |
| r24 = | −106.664 | d24 = | Variable | | | |
| r25 = | 174.522 | d25 = | 16.65 | n14 = 1.69680 | v14 = | 55.5 |
| r26 = | −946.850 | d26 = | 4.54 | | | |
| r27 = | ∞ | d27 = | 90.84 | n15 = 1.51633 | v15 = | 64.2 |
| r28 = | ∞ | | | | | |

| Variable Separation | Focal Length | | |
|---|---|---|---|
| | 100.00 | 118.18 | 154.34 |
| d8 | 61.13 | 36.56 | 3.14 |
| d13 | 29.66 | 33.09 | 44.81 |
| d18 | 21.88 | 18.45 | 6.73 |
| d24 | 3.38 | 19.22 | 31.16 |

Numerical Example 5:

| f = 100.00000~150.15 | Fno = 1:2.4~3.0 | 2ω = 53.1°~35.5° | | |
|---|---|---|---|---|
| r1 = | 172.840 | d1 = | 17.04 | n1 = 1.74320 v1 = 49.3 |
| r2 = | −3756.301 | d2 = | 0.28 | |
| r3 = | 238.065 | d3 = | 4.70 | n2 = 1.48749 v2 = 70.2 |
| r4 = | 62.862 | d4 = | 37.62 | |
| r5 = | −100.083 | d5 = | 4.41 | n3 = 1.57099 v3 = 50.8 |
| r6 = | 172.304 | d6 = | 1.25 | |
| r7 = | 125.526 | d7 = | 5.88 | n4 = 1.84666 v4 = 23.8 |
| r8 = | 234.088 | d8 = | Variable | |
| r9 = | 379.046 | d9 = | 7.35 | n5 = 1.80400 v5 = 46.6 |
| r10 = | −169.885 | d10 = | 0.44 | |
| r11 = | 135.550 | d11 = | 9.70 | n6 = 1.74320 v6 = 49.3 |
| r12 = | −91.631 | d12 = | 3.53 | n7 = 1.75520 v7 = 27.5 |
| r13 = | 403.913 | D13 = | Variable (Stop) | |
| r14 = | −142.892 | d14 = | 3.53 | n8 = 1.48749 v8 = 70.2 |
| r15 = | 107.820 | d15 = | 2.49 | |
| r16 = | 119.454 | d16 = | 5.29 | n9 = 1.84666 v9 = 23.8 |
| r17 = | 143.772 | d17 = | Variable | |
| r18 = | 546.045 | d18 = | 15.20 | n10 = 1.83481 v10 = 42.7 |
| r19 = | −103.896 | d19 = | 5.31 | |
| r20 = | −88.135 | d20 = | 5.29 | n11 = 1.76182 v11 = 26.5 |
| r21 = | 192.346 | d21 = | 6.57 | |
| r22 = | 251.818 | d22 = | 24.10 | n12 = 1.74320 v12 = 49.3 |
| r23 = | −137.445 | d23 = | Variable | |
| r24 = | 472.968 | d24 = | 9.40 | n13 = 1.74320 v13 = 49.3 |
| r25 = | −1071.045 | d25 = | 0.44 | |
| r26 = | 191.838 | d26 = | 9.40 | n14 = 1.74320 v14 = 49.3 |
| r27 = | 472.256 | d27 = | 10.29 | |
| r28 = | ∞ | d28 = | 88.16 | n15 = 1.51633 v15 = 64.2 |
| r29 = | ∞ | | | |

| Variable Separation | Focal Length | | |
|---|---|---|---|
| | 100.00 | 136.30 | 150.15 |
| d8 | 33.97 | 8.76 | 2.81 |
| d13 | 17.54 | 42.76 | 48.71 |
| d17 | 32.31 | 17.92 | 8.33 |
| d23 | 2.93 | 17.32 | 26.91 |

The values of the design parameters and the factors of the conditions (1) to (15) for the numerical examples 1 to 5 are given in the tables below.

| | Numerical Example | | | | |
|---|---|---|---|---|---|
| Parameter | 1 | 2 | 3 | 4 | 5 |
| β2w | −0.9887 | −0.8267 | −0.9129 | −0.4975 | −1.0119 |
| β2t | −1.2624 | −1.2431 | −1.3801 | −0.7438 | −1.5083 |
| β4w | −0.3192 | −0.1594 | −0.2908 | 0.099 | −0.1118 |
| β4t | −0.4336 | −0.3426 | −0.4506 | −0.0467 | −0.2451 |
| Z (= ft/fw) | 1.293215 | 1.589747 | 1.580577 | 1.543439 | 1.501484 |
| Z2 (= β2t/2w) | 1.276828 | 1.503689 | 1.511776 | 1.495075 | 1.490562 |
| Z4 (=β4t/β4w) | 1.358396 | 2.14931 | 1.549519 | −0.47172 | 2.192308 |
| Condition No. & Factor | | | | | |
| (12) $\|f1\|/\sqrt{fw \cdot ft}$ | | | | | |
| | 1.31352 | 1.1461 | 1.2043 | 1.41822 | 1.25413 |
| (2) $f2/\sqrt{fw \cdot ft}$ | | | | | |
| | 1.021893 | 0.718257 | 0.763224 | 0.701503 | 0.78199 |
| (13) $\|f3\|/\sqrt{fw \cdot ft}$ | | | | | |
| | 1.16191 | 0.91104 | 0.9407 | 0.72778 | 1.20923 |
| (14) $f4/\sqrt{fw \cdot ft}$ | | | | | |
| | 1.439296 | 1.546381 | 1.30547 | 1.534361 | 1.469586 |
| (15) $f5/\sqrt{fw \cdot ft}$ | | | | | |
| | 2.606882 | 1.683398 | 2.027713 | 1.712783 | 1.77807 |
| (8) f2/f4 | | | | | |
| | 0.709995 | 0.464476 | 0.584635 | 0.457196 | 0.532116 |
| (3) \|f1\|/fw | | | | | |
| | 1.49373 | 1.44506 | 1.51406 | 1.76192 | 1.53675 |
| (1) \|f1\|/f2 | | | | | |
| | 1.28538 | 1.59567 | 1.57791 | 2.02168 | 1.60377 |
| (5) Z2/Z | | | | | |
| | 0.987329 | 0.945867 | 0.956471 | 0.968665 | 0.992726 |
| (6) M2/M4 | | | | | |
| | 1.361473 | 1.027484 | 1.356137 | 1 | 1.2995 |
| (9) bf/f5 | | | | | |
| | 0.380981 | 0.48291 | 0.418234 | 0.409213 | 0.416409 |
| (10) \|f1\|/bf | | | | | |
| | 1.32255 | 1.40984 | 1.42007 | 2.02344 | 1.69384 |
| (7) M2/(ft − fw) | | | | | |
| | 0.869 | 0.62229 | 0.61283 | 0.51118 | 0.62143 |
| (11) f5/fw | | | | | |
| | 2.964536 | 2.122515 | 2.549261 | 2.127881 | 2.178759 |
| (4) \|tk\|/fw | | | | | |
| | 14.6866 | 9.25914 | 8.50135 | 13.7775 | 9.60034 |

FIGS. 6A to 6D through FIGS. 15A to 15D graphically show the various aberrations of the numerical examples 1 to 5 at the wide-angle end and the telephoto end, respectively.

It will be appreciated from the foregoing that the zoom lens of the invention is simple in design, fast in speed, compact in the bulk and size, high in the zoom ratio, small in distortion and smaller in the variation of lateral chromatic aberration. Therefore, the image of high definition can be projected with high accuracy and reliability.

Next, zoom lenses according to sixth to ninth embodiments of the invention will be described.

FIGS. 16, 20, 24 and 28 are schematic block diagrams of the main parts of projection apparatuses (liquid crystal video projectors) using numerical examples 6 to 9 of zoom lenses whose data will be given later in correspondence to the sixth to ninth embodiments of the invention, respectively. The aberrations of the zoom lenses of numerical examples 6 to 9 at the wide-angle end, an intermediate focal length and the telephoto end are shown in FIGS. 17A to 17D through FIGS. 19A to 19D, FIGS. 21A to 21D through FIGS. 23A to 23D, FIGS. 25A to 25D through FIGS. 27A to 27D and FIGS. 29A to 29D through FIGS. 31A to 31D.

In all the lens block diagrams, a zoom lens PL comprises a first lens unit L1 of negative refractive power, a second lens unit L2 of positive refractive power, a third lens unit L3 of negative refractive power, a fourth lens unit L4 of positive refractive power and a fifth lens unit L5 of positive refractive power.

A screen S (projection plane) and a liquid crystal display LCD (an original image to be projected) are positioned in conjugate relation. Usually, the screen S takes its place at a long conjugate point (first conjugate point) and the display LCD at a short conjugate point (second conjugate point). A glass block GB includes a color combining prism, a polarizing filter, a color filter and others.

The zoom lens PL is mounted in a projector body PB through a coupling member (not shown). The glass block GB and the display element LCD are contained in the projector body PB.

In the sixth to ninth embodiments, during zooming from the wide-angle end to the telephoto end, as indicated by the arrows, the second and fourth lens units L2 and L4 axially move toward the first conjugate point (toward the screen S), while simultaneously moving the third lens unit L3 either in a locus convex toward the first conjugate point, or monotonously toward the first conjugate point. The first lens unit L1 axially moves to effect focusing. Incidentally, focusing may otherwise be performed by moving the third or fifth lens unit, or the whole of the zoom lens.

In the projection apparatus of each of the sixth to ninth embodiments, the zoom lens PL is used to project the original image formed on the display LCD onto the surface of the screen S.

The features of the zoom lenses of the sixth to ninth embodiments are described below.

The zoom lens PL comprises, in order from the screen side (large conjugate side), the first lens unit of negative refractive power containing at least one aspheric surface, the second lens unit of positive refractive power, the third lens unit of negative refractive power, the fourth lens unit of positive refractive power and the fifth lens unit of positive refractive power, wherein, during zooming from the wide-angle end to the telephoto end, the separation between the first and second lens units decreases, the separation between the second and third lens units increases, the separation between the third and fourth lens units decreases and the separation between the fourth and fifth lens units increases. Preferably, for the purpose of simplifying the structure of construction, the first and fifth lens units are made fixed. Of the remaining lens units, the second and fourth lens units are made to move toward the screen side to effect zooming. The third lens unit moves to compensate for the shift of an image plane with the zooming of the second and fourth lens units.

As the fifth lens unit is closest to the image on the display, the fifth lens unit is given a relatively strong positive refractive power, thereby realizing a telecentric system. Further, all of what constitutes the fifth lens unit is one positive lens having a strong convex surface facing the screen side, thus achieving compatibility of correcting field curvature and distortion with simplification of the structure of construction.

Since the zooming provision is made in the second, third and fourth lens units, reduction of the sums of the total zooming movements of all these lenses can be achieved. So, the total length of the zoom is shortened. In addition, the distance from the entrance pupil to the front vertex is made shorter. So, it becomes possible to reduce the diameter of the front lens members that is determined by the off-axial oblique light beam. The first lens unit, because of its having the negative refractive power, allows the entire lens system to take the retrofocus form. For the purpose of creating a space the color combining element occupies, a long back focal distance is thus secured.

Further, a proper refractive power arrangement is made over all the lens units and the first lens unit is made stationary during zooming, thereby reducing the variation of the position of the aforesaid off-axial oblique light beam. So, along with the simplification of the structure of construction, a lens system of constant total length can be achieved. Also, for the purpose of reducing the distortion at the wide-angle end, the first lens unit is preferably provided with, on the side closest to the screen side, a negative lens of meniscus form convex toward the screen side, having at least one aspheric surface.

Further, to attain a good optical performance, an additional feature or condition is set forth as follows:

$$4 < |tkw/fw| \tag{18}$$

where tkw is a distance from a pupil position on the small conjugate side at the wide-angle end to a small conjugate plane when a conjugate length on the large conjugate side is infinite, and fw is the focal length at the wide-angle end of the entire lens system.

The inequality of condition (18) gives a range for the ratio of the distance between the pupil on the display-image side and the display image to the focal length at the wide-angle end of the entire lens system. In a range beyond the condition (18), as this means that the pupil is too close to the display image, the principal ray of the off-axial beam has to emerge from the display image at a larger angle with respect to the optical axis. Then, the principal ray enters the color combining element, such as crossed dichroic prisms, in between the display image and the projection lens. Because the angle of incidence changes greatly as the rays is displaced toward the margin of the display image, color differences are produced on the screen.

In the sixth to ninth embodiments, as described above, the proper rules of design are set forth for each lens unit and the relation in which to move the zooming lens units are set forth. The variation with zooming of the various aberrations, mainly spherical aberration and coma, is thus corrected well.

In connection with the sixth to ninth embodiments, it should be noted that, in order to further improve the stability of the aberrations throughout the entire zooming range and the image quality over the entire area of the image frame, it is preferred to satisfy at least one of the following features or conditions.

(a1) During zooming from the wide-angle end to the telephoto end, the separation between the second and third lens units increases, while the separation between the third and fourth lens units decreases.

(a2) During zooming from the wide-angle end to the telephoto end, the separation between the first and second lens units decreases, the separation between the second and third lens units increases, the separation between the third and fourth lens units decreases and the separation between the fourth and fifth lens units increases.

By this arrangement, the required zooming movements for the equivalent zoom ratio of the lens units can be made comparatively short, while still keeping good optical performance throughout the entire zooming range.

(a3) The second lens unit has two positive lenses and one negative lens, and the third lens unit has one negative lens.

(a4) At least one of the following conditions is satisfied:

$$0.8 < |f1|/f2 < 2 \tag{19}$$

$$0.5 < |f2/\sqrt{fw \cdot ft}| < 1.5 \tag{20}$$

where f1 and f2 are the focal lengths of the first and second lens units, respectively, and fw and ft are the focal lengths at the wide-angle end and the telephoto end of the entire lens system, respectively.

The condition (19) is set forth for appropriately regulating the relationship between the second lens unit serving as the main variator and the first lens unit. When the lower limit of the condition (19) is exceeded, the diameter of the front lens members, which is determined by the first lens unit, becomes larger. Also, the distortion for the wide-angle end increases objectionably. When the upper limit is exceeded, the movement of the second lens unit necessarily increases to obtain the desired zoom ratio. So, the size of the entire lens system increases objectionably.

The inequalities of condition (20) give a proper range for the power of the main variator. When the lower limit of the condition (20) is exceeded, field curvature is unduly under-corrected. When the upper limit is exceeded, the required movement for the desired zoom ratio of the second lens unit necessarily increases to increase the size of the entire lens system objectionably.

(a5) During zooming from the wide-angle end to the telephoto end, the second and fourth lens units move toward the large conjugate side. The third lens unit takes a position nearer to the large conjugate side when at the telephoto end than when at the wide-angle end.

(a6) During zooming from the wide-angle end to the telephoto end, the second and fourth lens units move toward the large conjugate side, while simultaneously moving the third lens unit in a locus convex toward the large conjugate side.

(a7) The first lens unit is made stationary during zooming.

(a8) The first lens unit has, in order from the large conjugate side, a negative lens of meniscus form convex toward the large conjugate side, a bi-concave negative lens and a positive lens, wherein the negative lens of meniscus form contains at least one aspheric surface.

(a9) It is preferred that, for the purpose of correcting mainly curvature of field well, the focal length f1 of the first lens unit in term of the focal length fw at the wide-angle end of the entire lens system satisfies the following condition (21):

$$0.9 < |f1|/fw < 2 \tag{21}$$

The deviation from the lower limit of the condition (21), as this means that the power of the first lens unit is too strong, results in over-correction of field curvature. When the upper limit is exceeded, as this means that the power of the first lens unit is too weak, field curvature is under-corrected. So, these violations are objectionable.

(a10) As to the second lens unit serving as the main variator, it is preferred to satisfy the following $$0.9 < Z2/Z < 1.1 \tag{22}$$

$$0.9 < M2/M4 < 1.9 \tag{23}$$

$$0.5 < M2/(ft - fw) < 1.3 \tag{24}$$

where Z2 is the ratio of the magnification β2t at the telephoto end of the second lens unit to the magnification β2w at the wide-angle end of the second lens unit, Z is the ratio of the focal length ft at the telephoto end of the entire lens system to the focal length fw at the wide-angle end of the entire lens system, and M2 and M4 are the amounts of total zooming movement of the second lens unit L2 and the fourth lens unit L4, respectively.

The inequalities of condition (22) give a proper range for the ratio of the variations of magnification of both variators or the second and fourth lens units. Because the third lens unit contributes to a demagnification, the ratio is preferred to fall within this range. The conditions (23) and (24) make a good compromise between the physical length of the complete lens and the movement of each of the variators. In particular, since, of these lens units, the fourth lens unit is liable to become weaker in power, for appropriate distribution of the variations of magnification to assure, these ranges are preferred to be satisfied. Further, it is more preferred that the movement M2 of the second lens unit exceeds the movement M4 of the fourth lens unit to such extent as the following condition (23a):

$$1 < M2/M4 < 1.7 \tag{23a}$$

(a11) As described above, the power of the fourth lens unit tends to be weaker than that of the second lens unit. So, it is preferred to satisfy an additional condition (25) as follows:

$$0.2 < f2/f4 < 0.9 \tag{25}$$

The inequalities of condition (25) are a necessary rule for determination of an appropriate Petzval sum, while still maintaining the power arrangement of the main variators and the zoom ratio to be made proper.

(a12) In order for the exit pupil of the entire lens system to be made suitable and for its distortion to be appropriately determined, it is preferred to satisfy the following conditions:

$$0.3 < bf/f5 < 0.6 \tag{26}$$

$$0.9 < |f1|/bf < 2.2 \tag{27}$$

where bf is the distance from the fifth lens unit to the display CCD as measured by reduction to the air with the dichroic prism and others removed. The inequalities of condition (26) are a necessary rule for making the entire lens system telecentric adequately. When the upper limit is exceeded, the size of the entire lens system increases greatly. When the lower limit is exceeded, distortion is produced. The inequalities of condition (27), too, are required for telecentricity by elongating the exit pupil, while still permitting distortion to be taken appropriate.

(a13) To minimize the bulk and size of the entire lens system and to make the power arrangement of all the lens units appropriate to obtain the proper movement of each of the lens units, letting the focal length of the i-th lens unit be denoted by fi, it is preferred to satisfy the following conditions:

$$1.0 < |f1|/\sqrt{fw \cdot ft} < 1.6 \tag{28}$$

$$0.6 < |f3|/\sqrt{fw \cdot ft} < 2.6 \tag{29}$$

$$1.1 < f4/\sqrt{fw \cdot ft} < 3.5 \tag{30}$$

$$1.5 < f5/\sqrt{fw \cdot ft} < 3.0 \tag{31}$$

(a14) Not only to reduce lateral chromatic aberration but also to suppress its variation with zooming, it is desired that the third lens unit has a negative lens whose Abbe number ν3 lies within the following range:

$$\nu 3 > 55 \quad (32)$$

For more desired results, $$\nu 3 > 60 \quad (32a)$$

(a15) In order to reduce lateral chromatic aberrations of higher orders, it is desired that the mean value ν1n of the Abbe numbers of the negative lenses in the first lens unit lies within the following range:

$$\nu 1n > 55 \quad (33)$$

(a16) In order to correct distortion well, it is desired that the fifth lens unit is constructed with one positive lens which satisfies the following condition:

$$|R5f| < |R5r| \quad (34)$$

where R5f and R5r are the radii of curvature of the surfaces of the positive lens facing the screen side and the display image side, respectively.

(a17) To facilitate good correction of distortion, it is preferred to satisfy the following condition:

$$0.3 < SF5 < 1.5 \quad (35)$$

where SF5=(R5r+R5f)/(R5r−R5f), and R5f and R5r are the radii of curvature of the surfaces of the positive lens facing the screen side and the display image side, respectively.

Next, the features of the zoom lenses which are characteristic of the sixth to ninth embodiments are described with reference to FIGS. 16, 20, 24 and 28, respectively.

Figure 16:
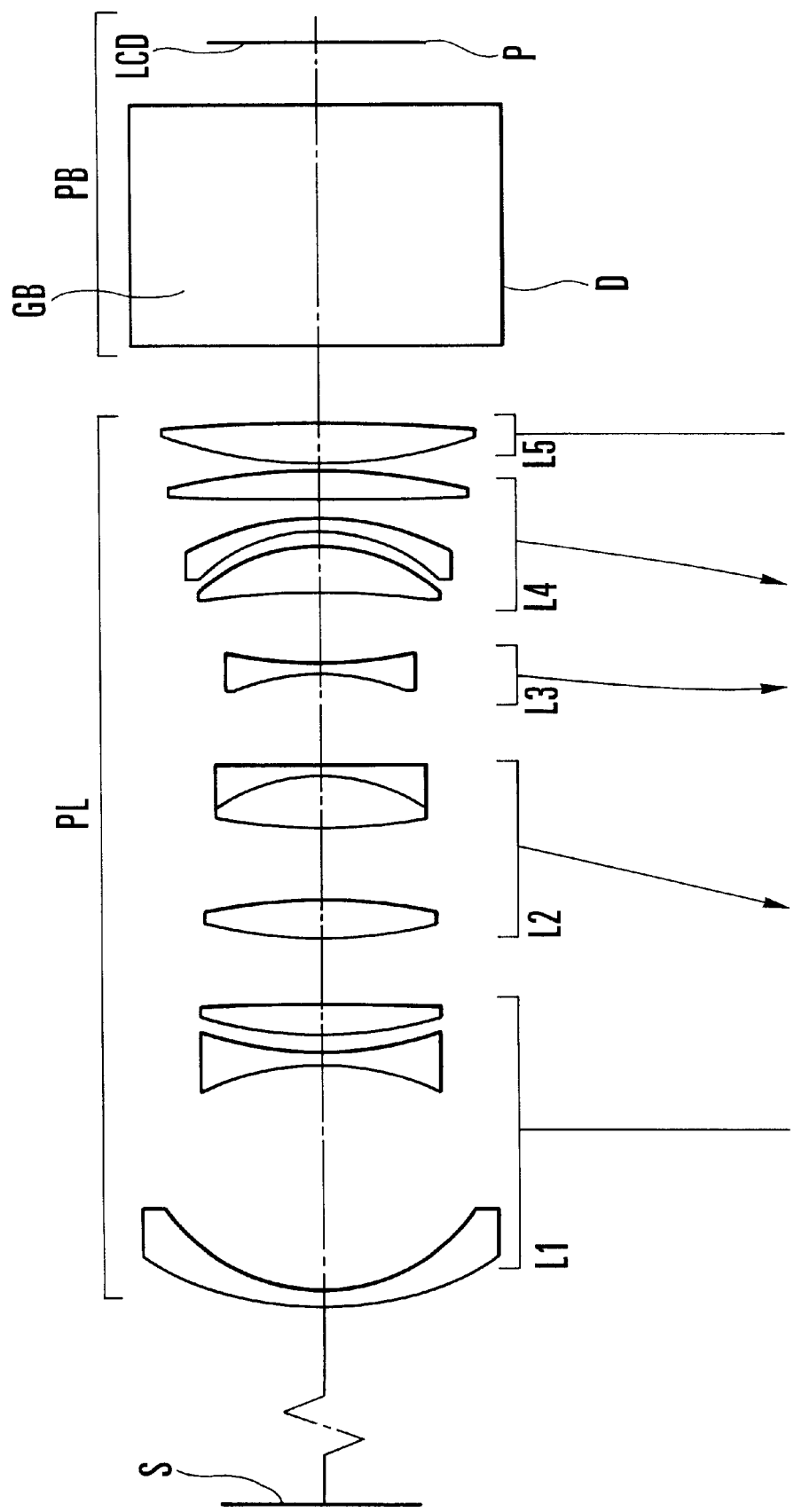
FIG. 16 is a schematic diagram showing the main parts of a projection apparatus having a zoom lens according to a sixth embodiment of the invention.

FIG. 16 in block diagram shows the zoom lens of the sixth embodiment, wherein the first and fifth lens units L1 and L5 remain stationary during zooming. During zooming from the wide-angle end to the telephoto end, the second and fourth lens units L2 and L4 axially move toward the screen side, while simultaneously moving the third lens unit L3 in a locus convex toward the screen side with the point of inflection near the telephoto end. The glass block GB is equivalent to the crossed dichroic prism or the like.

The first lens unit L1 comprises, in order from the screen side, a negative lens of meniscus form convex toward the screen side, a negative lens of bi-concave form and a positive lens. The negative lens of meniscus form has an aspheric surface facing the screen side.

The reason why the negative meniscus lens is put in the closest position to the screen side in the first lens unit L1 is that the off-axial rays are allowed to disperse almost uniformly over all the surfaces, thus suppressing production of coma to a minimum. The reason why the aspheric surface is used in the first lens unit L1 is that it is intended to suppress production of distortion to a minimum. Further, since correction of chromatic aberrations is performed at the position which is closest to the display image side in the first lens unit L1, where the off-axial rays enters at a low height, the produced amount of chromatic aberrations of higher orders is suppressed to a minimum.

The second lens unit L2 is used for correcting spherical aberration and longitudinal chromatic aberration well, and is constructed with, in order from the screen side, a bi-convex lens and a cemented lens composed of a bi-convex lens and a negative lens The third lens unit L3 is constructed with only one lens of bi-concave form having a large Abbe number. The variation of chromatic aberrations with moving of the third lens unit L3 is thus minimized.

The fourth lens unit L4 is used for correcting mainly off-axial coma and lateral chromatic aberration, and is constructed with, in order from the screen side, a positive lens having a surface of strong power facing the display image side, a negative lens of meniscus form convex toward the display image side and a positive lens having a surface of strong power facing the display image side.

The fifth lens unit L5 is used for putting the entrance pupil farther away and for correcting field curvature and distortion, and is constructed with one positive lens having a surface of strong power facing the screen side.

Figure 20:
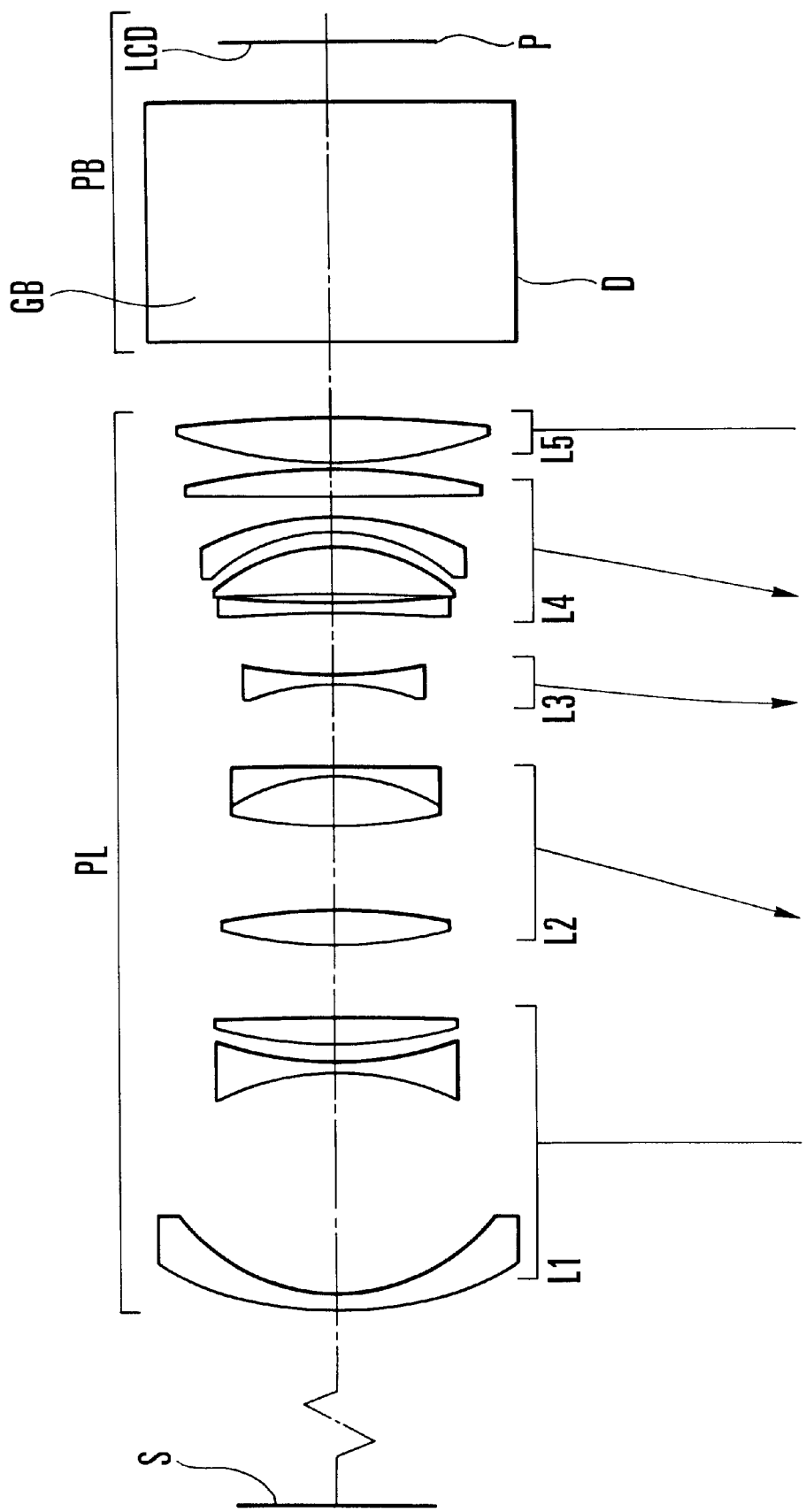
FIG. 20 is a schematic diagram showing the main parts of a projection apparatus having a zoom lens according to a seventh embodiment of the invention.
Figures 23A, 23B, 23C, 23D:
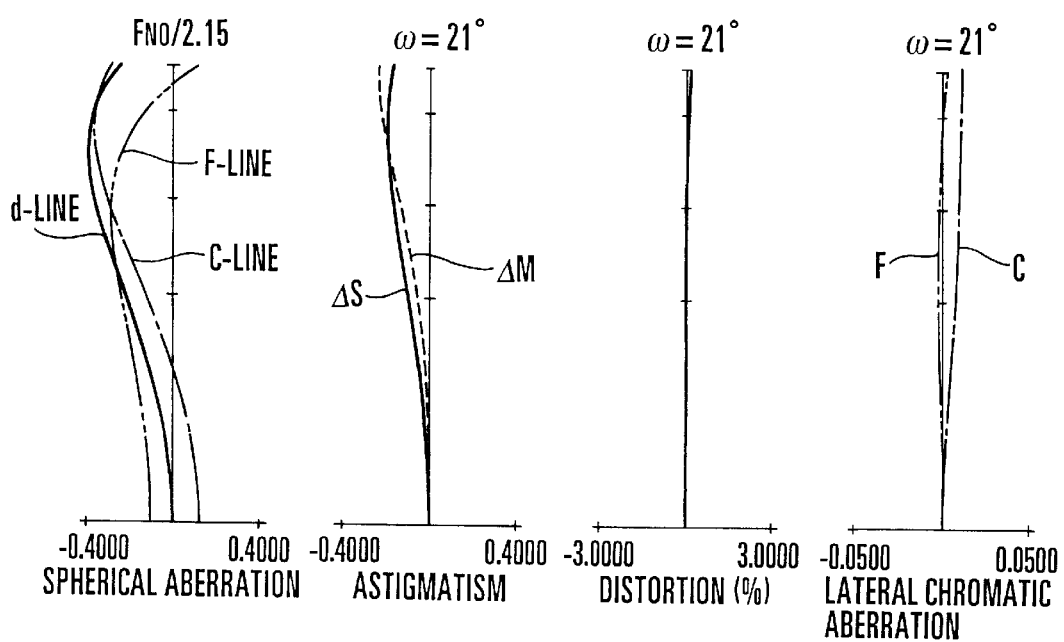
FIGS. 23A to 23D are graphic representations of the aberrations of the zoom lens of the numerical example 7 in the telephoto end.

FIG. 20 in block diagram shows the zoom lens of the seventh embodiment. Similarly to the sixth embodiment, the first and fifth lens units L1 and L5 remain stationary during zooming and, during zooming from the wide-angle end to the telephoto end, the second and fourth lens units L2 and L4 axially move toward the screen side, while the third lens unit L3 axially moves also toward the screen side monotonously.

Although the form and the construction and arrangement of the constituent lenses are almost similar to those of the zoom lens of the sixth embodiment, there is difference in a point that the fourth lens unit L4 is constructed with, in order from the screen side, a negative lens of bi-concave form, a positive lens having a surface of strong power facing the display image side, a negative lens of meniscus form convex toward the display image side and a positive lens having a surface of strong power facing the display image side. The use of the negative lens at the closest position to the screen side in the fourth lens unit L4 allows correction of chromatic aberrations of the fourth lens unit to be carried out in a place where the height of incidence of the off-axial rays is low. Therefore, lateral chromatic aberrations of higher orders can be minimized. Also, the negative power component of the fourth lens unit can be distributed on two lenses, thereby giving another advantage of suppressing the produced amount of field curvatures of higher orders to a minimum.

Figure 24:
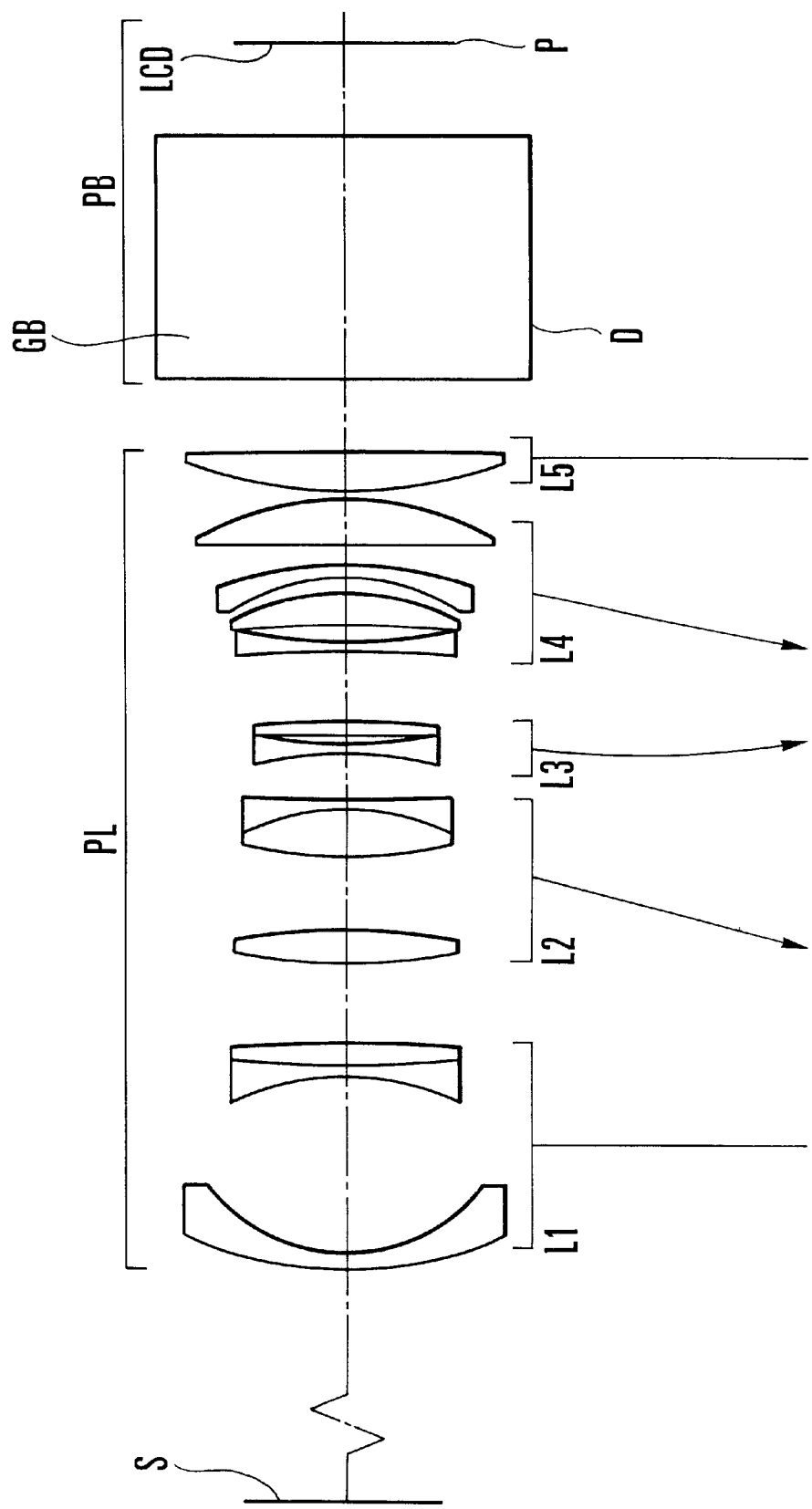
FIG. 24 is a schematic diagram showing the main parts of a projection apparatus having a zoom lens according to an eighth embodiment of the invention.
Figures 27A, 27B, 27C, 27D:
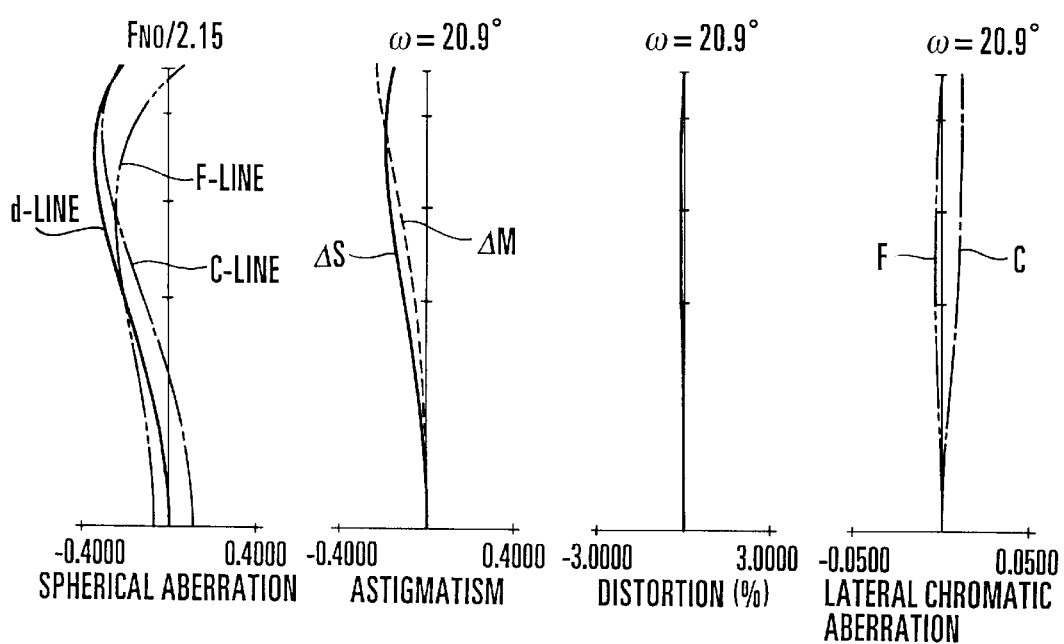
FIGS. 27A to 27D are graphic representations of the aberrations of the zoom lens of the numerical example 8 at the telephoto end.

FIG. 24 in block diagram shows the zoom lens of the eighth embodiment. The eighth embodiment differs from the seventh embodiment in the construction and arrangement of the third lens unit. The first and fifth lens units L1 and L5 remain stationary during zooming. During zooming from the wide-angle end to the telephoto end, the second and fourth lens units L2 and L4 axially move toward the screen side, while simultaneously moving the third lens unit L3 in a locus convex toward the screen side with the point of inflection lying near the middle focal length position. The third lens unit L3 is constructed with, in order from the screen side, a negative lens of bi-concave form and a positive lens, being corrected for chromatic aberrations in itself. So, the variation of chromatic aberrations with moving of the third lens unit L3 can be minimized.

Figure 28:
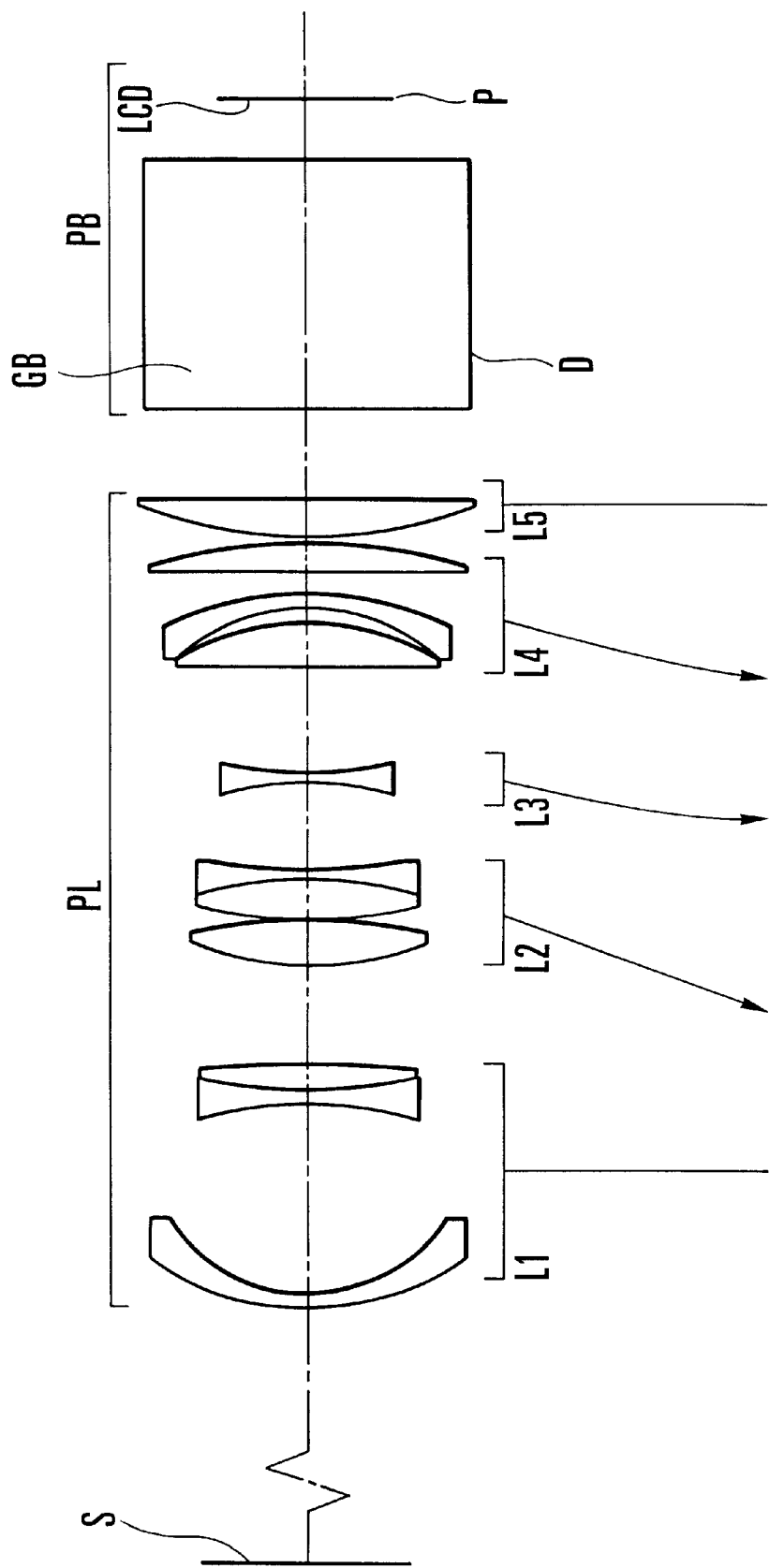
FIG. 28 is a schematic diagram showing the main parts of a projection apparatus having a zoom lens according to a ninth embodiment of the invention.

FIG. 28 in block diagram shows the zoom lens of the ninth embodiment. The ninth embodiment is almost similar to the sixth embodiment except for the second lens unit. The first and fifth lens units L1 and L5 remain stationary during zooming. During zooming from the wide-angle end to the telephoto end, the second and fourth lens units L2 and L4 axially move toward the screen side, while simultaneously moving the third lens unit L3 in a locus convex toward the screen side with the point of inflection lying near the telephoto end. In the second lens unit, the separation between the bi-convex lens and the cemented lens is made shorter than that in the sixth embodiment, thereby assuring a shortening of the total length of the complete lens.

Next, four numerical examples 6 to 9 corresponding to the sixth to ninth embodiments are shown. In the numerical data for each of the examples 6 to 9, ri is the radius of curvature of the i-th surface, when counted from the screen side, di is the i-th material thickness or air separation, when counted from the screen side, and ni and vi are respectively the refractive index and Abbe number of the i-th member, when counted from the screen side. In the numerical examples 6 to 9, the last two surfaces define a glass block such as a color separation prism, a polarizing filter and a color filter.

The shape of an aspheric surface is expressed in the coordinates with an X axis in the axial direction and an H axis in the direction perpendicular to an optical axis, the direction in which light advances being taken as positive, by the following equation:

$$X = \frac{(1/R)H^2}{1 + \sqrt{1 - (1+K)(H/R)^2}} + BH^4 + CH^6 + DH^8 + EH^{10}$$

where R is the radius of the osculating sphere, and K, B, C, D and E are the aspheric coefficients.

Also, it is to be noted that the values of the aspheric coefficients contain the notation: "D-OX" meaning "$10^{-X}$". In addition, the values of the factors in the above-described conditions (18) to (33) and (35) for the numerical examples 6 to 9 are listed in a table.

Numerical Example 6:
f = 48.5~61.98   Fno = 1:1.8~2.15   2ω = 52.2°~42°

| r1 = 81.929 | d1 = 3.00 | n1 = 1.49171 | v1 = 57.4 |
| r2 = 38.341 | d2 = 42.39 | | |
| r3 = −56.184 | d3 = 2.17 | n2 = 1.51633 | v2 = 64.1 |
| r4 = 71.853 | d4 = 3.19 | | |
| r5 = 91.614 | d5 = 5.65 | n3 = 1.80518 | v3 = 25.4 |
| r6 = −663.987 | d6 = Variable | | |
| r7 = 100.455 | d7 = 7.45 | n4 = 1.69680 | v4 = 55.5 |
| r8 = −114.417 | d8 = 13.84 | | |
| r9 = 125.432 | d9 = 9.80 | n5 = 1.78590 | v5 = 44.2 |
| r10 = −38.383 | d10 = 1.73 | n6 = 1.84666 | v6 = 23.8 |
| r11 = 4321.736(s) | d11 = Variable | | |
| r12 = −45.896 | d12 = 1.73 | n7 = 1.48749 | v7 = 70.2 |
| r13 = 85.746 | d13 = Variable | | |
| r14 = −173.697 | d14 = 8.69 | n8 = 1.69680 | v8 = 55.5 |
| r15 = −36.426 | d15 = 2.73 | | |
| r16 = −35.647 | d16 = 2.60 | n9 = 1.84666 | v9 = 23.8 |
| r17 = −56.491 | d17 = 3.64 | | |
| r18 = 1434.323 | d18 = 5.47 | n10 = 1.65844 | v10 = 50.9 |
| r19 = −130.021 | d19 = Variable | | |
| r20 = 97.619 | d20 = 7.73 | n11 = 1.63854 | v11 = 55.4 |
| r21 = −458.620 | d21 = 14.00 | | |
| r22 = ∞ | d22 = 45.00 | n12 = 1.51633 | v12 = 64.2 |
| r23 = ∞ | | | | s) Stop

| Variable | Focal Length | | |
|---|---|---|---|
| Separation | 48.50 | 54.09 | 61.98 |
| d6 | 13.04 | 6.99 | 0.94 |
| d11 | 17.21 | 21.36 | 27.09 |
| d13 | 13.52 | 11.64 | 7.66 |
| d19 | 1.19 | 4.96 | 9.26 |

Aspheric Coefficients for the surface r1:

R = 8.19292D+01   K = −2.68125D−05   B = 8.14595D−07
C = 1.79175D−10   D = −4.18370D−14   E = 4.65227D−17

Numerical Example 7:
f = 48.49~62.09   Fno = 1:1.8~2.15   2ω = 52.2°~42°

| r1 = 91.048 | d1 = 3.00 | n1 = 1.49171 | v1 = 57.4 |
| r2 = 40.963 | d2 = 41.57 | | |
| r3 = −58.491 | d3 = 2.17 | n2 = 1.51633 | v2 = 64.1 |
| r4 = 73.353 | d4 = 3.07 | | |
| r5 = 94.672 | d5 = 5.11 | n3 = 1.80518 | v3 = 25.4 |
| r6 = −1340.300 | d6 = Variable | | |
| r7 = 100.727 | d7 = 6.47 | n4 = 1.69680 | v4 = 55.5 |
| r8 = −124.590 | d8 = 15.70 | | |
| r9 = 110.110 | d9 = 9.17 | n5 = 1.78590 | v5 = 44.2 |
| r10 = −39.981 | d10 = 1.73 | n6 = 1.84666 | v6 = 23.8 |
| r11 = −915.595(s) | d11 = Variable | | |
| r12 = −49.791 | d12 = 1.73 | n7 = 1.51633 | v7 = 64.1 |
| r13 = 83.476 | d13 = Variable | | |
| r14 = −358.775 | d14 = 2.00 | n8 = 1.60342 | v8 = 38.0 |
| r15 = 301.027 | d15 = 1.36 | | |
| r16 = −587.212 | d16 = 9.49 | n9 = 1.69680 | v9 = 55.5 |
| r17 = −37.299 | d17 = 2.73 | | |
| r18 = −37.211 | d18 = 2.60 | n10 = 1.80518 | v10 = 25.4 |
| r19 = −62.204 | d19 = 3.64 | | |
| r20 = 1732.580 | d20 = 5.26 | n11 = 1.65844 | v11 = 50.9 |
| r21 = −135.635 | d21 = Variable | | |
| r22 = 97.871 | d22 = 8.27 | n12 = 1.63854 | v12 = 55.4 |
| r23 = −303.902 | d23 = 14.00 | | |
| r24 = ∞ | d24 = 45.00 | n13 = 1.51633 | v13 = 64.2 |
| r25 = ∞ | | | |

| Variable | Focal Length | | |
|---|---|---|---|
| Separation | 48.49 | 54.27 | 62.09 |
| d6 | 13.86 | 7.47 | 1.07 |
| d11 | 16.02 | 19.89 | 25.11 |
| d13 | 11.57 | 9.89 | 6.37 |
| d21 | 1.17 | 5.37 | 10.06 |

Aspheric Coefficients for the surface r1:

R = 9.10481D+01   K = −3.37098D−05   B = 7.42675D−07
C = 1.24597D−10   D = −3.82186D−14   E = 3.45419D−17

Numerical Example 8:
f = 48.12~62.27   Fno = 1:1.8~2.15   2ω = 52.6°~41.8°

| r1 = 102.361 | d1 = 3.00 | n1 = 1.49171 | v1 = 57.4 |
| r2 = 35.435 | d2 = 32.96 | | |
| r3 = −55.529 | d3 = 2.17 | n2 = 1.51633 | v2 = 64.1 |
| r4 = 255.488 | d4 = 0.00 | | |
| r5 = 255.488 | d5 = 4.21 | n3 = 1.84666 | v3 = 23.8 |
| r6 = −323.930 | d6 = Variable | | |
| r7 = 123.873 | d7 = 6.60 | n4 = 1.80610 | v4 = 40.9 |
| r8 = −121.519 | d8 = 13.13 | | |
| r9 = 90.422 | d9 = 9.10 | n5 = 1.78590 | v5 = 44.2 |
| r10 = −49.068 | d10 = 1.73 | n6 = 1.84666 | v6 = 23.8 |
| r11 = 598.244(s) | d11 = Variable | | |
| r12 = −72.033 | d12 = 1.73 | n7 = 1.51633 | v7 = 64.1 |
| r13 = 95.190 | d13 = 1.69 | | |
| r14 = −2351.110 | d14 = 2.70 | n8 = 1.69895 | v8 = 30.1 |
| r15 = −200.332 | d15 = Variable | | |
| r16 = −348.649 | d16 = 2.00 | n9 = 1.80518 | v9 = 25.4 |
| r17 = 111.501 | d17 = 2.89 | | |
| r18 = −254.358 | d18 = 6.07 | n10 = 1.69680 | v10 = 55.5 |
| r19 = −49.217 | d19 = 2.73 | | |
| r20 = −43.515 | d20 = 2.60 | n11 = 1.74077 | v11 = 27.8 |
| r21 = −76.412 | d21 = 3.64 | | |
| r22 = −3515.090 | d22 = 8.74 | n12 = 1.63854 | v12 = 55.4 |
| r23 = −61.955 | d23 = Variable | | |
| r24 = 87.543 | d24 = 7.61 | n13 = 1.63854 | v13 = 55.4 |
| r25 = −2406.365 | d25 = 14.00 | | |
| r26 = ∞ | d26 = 45.00 | n14 = 1.51633 | v14 = 64.2 |
| r27 = ∞ | | | |

-continued

| Variable Separation | Focal Length | | |
|---|---|---|---|
| | 48.12 | 54.23 | 62.27 |
| d6 | 14.63 | 8.26 | 1.89 |
| d11 | 8.78 | 14.19 | 22.50 |
| d15 | 12.87 | 8.49 | 1.97 |
| d23 | 1.18 | 6.52 | 11.09 |

Aspheric Coefficients for the surface r1:

R = 1.02361D+02   K = 2.06975D−04   B = 1.20729D−06
C = 718866D−11   D = 5.23050D−15   E = 4.08934D−17

Numerical Example 9:
f = 70.10~98.10   Fno = 1:2~2.4   2ω = 50.4°~37.2°

| r1 = 79.761 | d1 = 3.20 | n1 = 1.49171 | ν1 = 57.4 |
| r2 = 40.786 | d2 = 45.08 | | |
| r3 = −96.749 | d3 = 3.00 | n2 = 1.60311 | ν2 = 60.6 |
| r4 = 118.572 | d4 = 0.91 | | |
| r5 = 167.569 | d5 = 5.57 | n3 = 1.84666 | ν3 = 23.8 |
| r6 = −317.929 | d6 = Variable | | |
| r7 = 82.176 | d7 = 10.49 | n4 = 1.77250 | ν4 = 49.6 |
| r8 = −169.256 | d8 = 0.30 | | |
| r9 = 123.010 | d9 = 9.80 | n5 = 1.71300 | ν5 = 53.9 |
| r10 = −96.305 | d10 = 2.40 | n6 = 1.84666 | ν6 = 23.8 |
| r11 = 168.347(s) | d11 = Variable | | |
| r12 = −77.066 | d12 = 2.40 | n7 = 1.51633 | ν7 = 64.2 |
| r13 = 94.391 | d13 = Variable | | |
| r14 = 1508.559 | d14 = 10.74 | n8 = 1.69680 | ν8 = 55.5 |
| r15 = −64.190 | d15 = 3.78 | | |
| r16 = −49.005 | d16 = 3.60 | n9 = 1.84666 | ν9 = 23.8 |
| r17 = −80.340 | d17 = 5.04 | | |
| r18 = −6685.012 | d18 = 7.07 | n10 = 1.60311 | ν10 = 60.6 |
| r19 = −146.005 | d19 = Variable | | |
| r20 = 122.415 | d20 = 8.93 | n11 = 1.60311 | ν11 = 60.6 |
| r21 = −5136.739 | d21 = 21.00 | | |
| r22 = ∞ | d22 = 60.00 | n12 = 1.51633 | ν12 = 64.2 |
| r23 = ∞ | | | |

| Variable Separation | Focal Length | | |
|---|---|---|---|
| | 70.10 | 81.39 | 98.10 |
| d6 | 25.47 | 13.54 | 1.62 |
| d11 | 21.04 | 26.12 | 36.06 |
| d13 | 25.17 | 23.36 | 18.70 |
| d19 | 1.29 | 9.95 | 16.59 |

Aspheric Coefficients for the surface r1:

R = 7.97609D+01   K = 5.21225D−04   B = 5.81857D−07
C = 5.79549D−11   D = 3.81200D−14   E = 8.94808D−18

| Condition No. | Numerical Example | | | |
|---|---|---|---|---|
| | 6 | 7 | 8 | 9 |
| (18) | 6.128 | 6.151 | 5.994 | 5.259 |
| (19) | 1.205 | 1.236 | 1.160 | 1.408 |
| (20) | 1.101 | 1.041 | 1.007 | 0.865 |
| (21) | 1.499 | 1.457 | 1.329 | 1.440 |
| (22) | 0.969 | 0.974 | 1.020 | 0.986 |
| (23) | 1.498 | 1.438 | 1.285 | 1.559 |
| (24) | 0.897 | 0.940 | 0.900 | 0.852 |
| (25) | 0.742 | 0.627 | 0.371 | 0.621 |
| (26) | 0.432 | 0.462 | 0.458 | 0.371 |
| (27) | 1.329 | 1.310 | 1.054 | 1.372 |
| (28) | 1.326 | 1.287 | 1.168 | 1.217 |
| (29) | 1.113 | 1.096 | 1.969 | 0.986 |
| (30) | 1.484 | 1.661 | 2.718 | 1.391 |
| (31) | 2.312 | 2.130 | 2.420 | 2.392 |
| (32) | 70.2 | 64.1 | 64.1 | 64.2 |
| (33) | 60.75 | 60.75 | 60.75 | 59 |
| (35) | 0.649 | 0.513 | 0.930 | 0.953 |

It will be appreciated from the foregoing that the total number of lens units is taken at 5 and the negative lead type is employed as the lens type. Within this framework, the rules of design for all these lens units are made appropriate to assure improvements of the compact form of the entire lens system, while still maintaining the telecentric condition to be held good throughout the entire zooming range and having a good optical performance over the entire area of the image frame. It is thus made possible to achieve a zoom lens suited to liquid crystal projectors and a projection apparatus using the same.

Figure 52A:
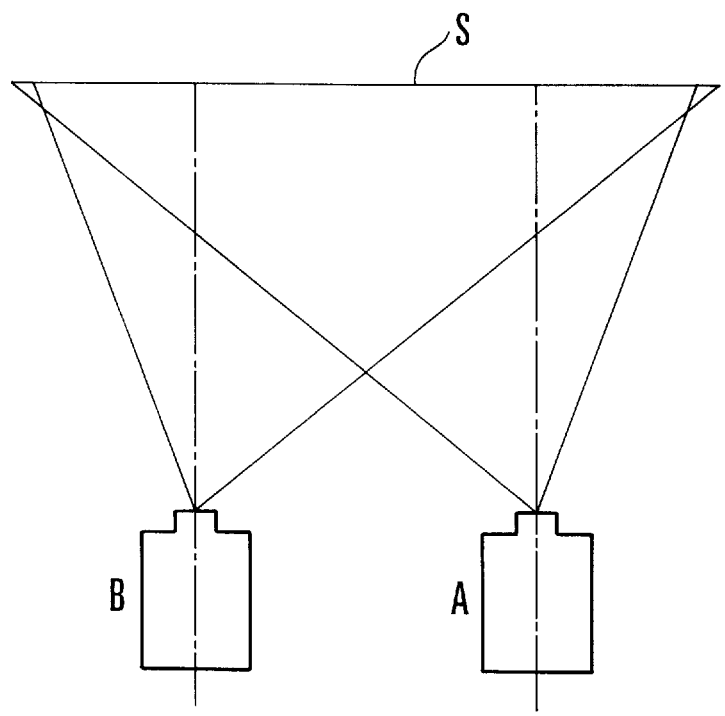
FIGS. 52A and 52B are plan views for explaining the picture element offset at the time of stack projection.
Figure 52B:
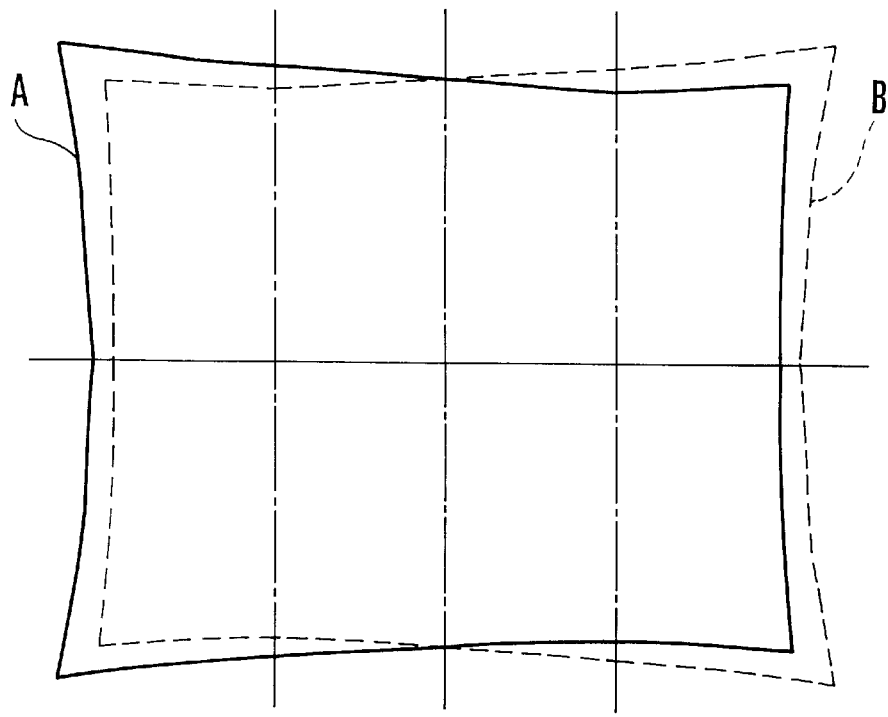

By the way, suppose, as shown in FIG. 52A, two items A and B of the liquid crystal projector are placed side by side when two images are projected in superposition onto the screen S (at the time of stack projection), then the use of the conventional zoom lens as the projection lens, because of its distortion being relatively large at the wide-angle end, produces an important problem. In more detail, the right hand projector A skews the projecting light beam to the left. As the image A on the screen S is distorted to a pincushion, it becomes progressively larger toward the left side as shown by the solid line curves in FIG. 52B. Likewise, the image B on the screen S gets progressively larger distortion of the pincushion type, but in this case, toward the right side as shown by dot line curves in FIG. 52B. However finely the position and size of the projected image may be adjusted in each of the projectors, therefore, the two images projected in superposition have their pixels left largely deviated from each other. Although the brightness of the screen is improved, what is available in the marginal zone of the image frame is nothing but diffused images the viewer finds unpleasant to see. Such a problem has remained unsolved. Zoom lenses according to tenth to fourteenth embodiments of the invention will next be described that have reduced the produced amount of distortion throughout the entire zooming range to such a low level that even if stack projection is done, projected images of good quality can be obtained.

In the following, there are described zoom lenses according to the tenth to fourteenth embodiments (numerical examples 10 to 14).

FIG. 32 in block diagram shows a zoom lens of the tenth embodiment whose data will be given later in the numerical example 10. The zoom lens comprises, in order from a screen (not shown) side, that is, the long conjugate point (or from the left side in FIG. 32), a first lens unit L1 of negative refractive power, a second lens unit L2 of positive refractive power, a third lens unit L3 of negative refractive power, a fourth lens unit L4 of positive refractive power and a fifth lens unit L5 of positive refractive power. During zooming from the wide-angle end to the telephoto end, the first and fifth lens units L1 and L5 remain stationary, the second and fourth lens units L2 and L4 axially move toward the screen side, and the third lens unit L3, too, axially moves toward the screen side monotonously. In FIG. 32, D is a glass block equivalent to the crossed dichroic prism or the like. P stands for the liquid crystal panel in which an image is displayed (as arranged at the short conjugate plane).

In the tenth embodiment, the first lens unit L1 is constructed with, in order from the screen side, a positive lens having a stronger power on the screen side than on the liquid crystal panel side P, a negative lens of meniscus form convex toward the screen side, a negative lens of bi-concave form and a positive lens. The negative meniscus lens is an aspherical lens having an aspheric surface facing the screen side.

The reason why the positive lens is arranged at the closest position to the screen side in the first lens unit L1 is to correct distortion. In particular, that positive lens has the one of its surfaces which is closer to the screen side getting a strong power, so that the produced amount of distortion of higher orders is suppressed to a minimum. The reason why the negative meniscus lens is put in the second place, when counted from the screen side, in the first lens unit L1 is that the off-axial rays are allowed to disperse almost uniformly over all the surfaces, thus suppressing production of coma to a minimum. The reason why the aspheric surface is used in the first lens unit L1 is that it is intended to suppress production of distortion to a minimum. Further, since correction of chromatic aberrations is performed at the position which is closest to the liquid crystal panel side P in the first lens unit L1, where the off-axial rays enter at a low height, the produced amount of chromatic aberrations of higher orders is suppressed to a minimum.

The second lens unit L2 is used for correcting spherical aberration and longitudinal chromatic aberration well, is constructed with, in order from the screen side, a bi-convex lens and a cemented lens composed of a bi-convex lens and a negative lens. The third lens unit L3 has to contribute to minimization of the variation of chromatic aberrations with zooming. For this purpose, the third lens unit L3 is constructed with only one bi-concave lens having a large Abbe number. The fourth lens unit L4 is used for correcting mainly off-axial coma and lateral chromatic aberration, and is constructed with, in order from the screen side, a negative lens having a surface of strong power facing the liquid crystal panel side P, a positive lens having a surface of strong power facing the liquid crystal panel side P, a negative lens of meniscus form convex toward the liquid crystal panel side P and a positive lens having a surface of strong power facing the liquid crystal panel side P. The fifth lens unit L5 is used for putting that pupil which is viewed from the liquid crystal panel side P (or the entrance pupil) farther away and for correcting field curvature and distortion, and is constructed with one positive lens having a surface of strong power facing the screen side.

With the form and the construction and arrangement of the constituent lenses as described above, a good optical performance is obtained, while still permitting the entire lens system to take a telecentric form to the short conjugate side. A zoom lens of long back focal distance, while still having a compact form, is thus realized. Particularly, in the tenth embodiment, the first lens unit is provided with a positive lens as arranged at the closest position to the screen, and the negative meniscus lens in the second place, when counted from the screen side, is provided with an aspherical surface, thus maintaining good stability of distortion at an extremely low level throughout the entire zooming range.

Figure 33:
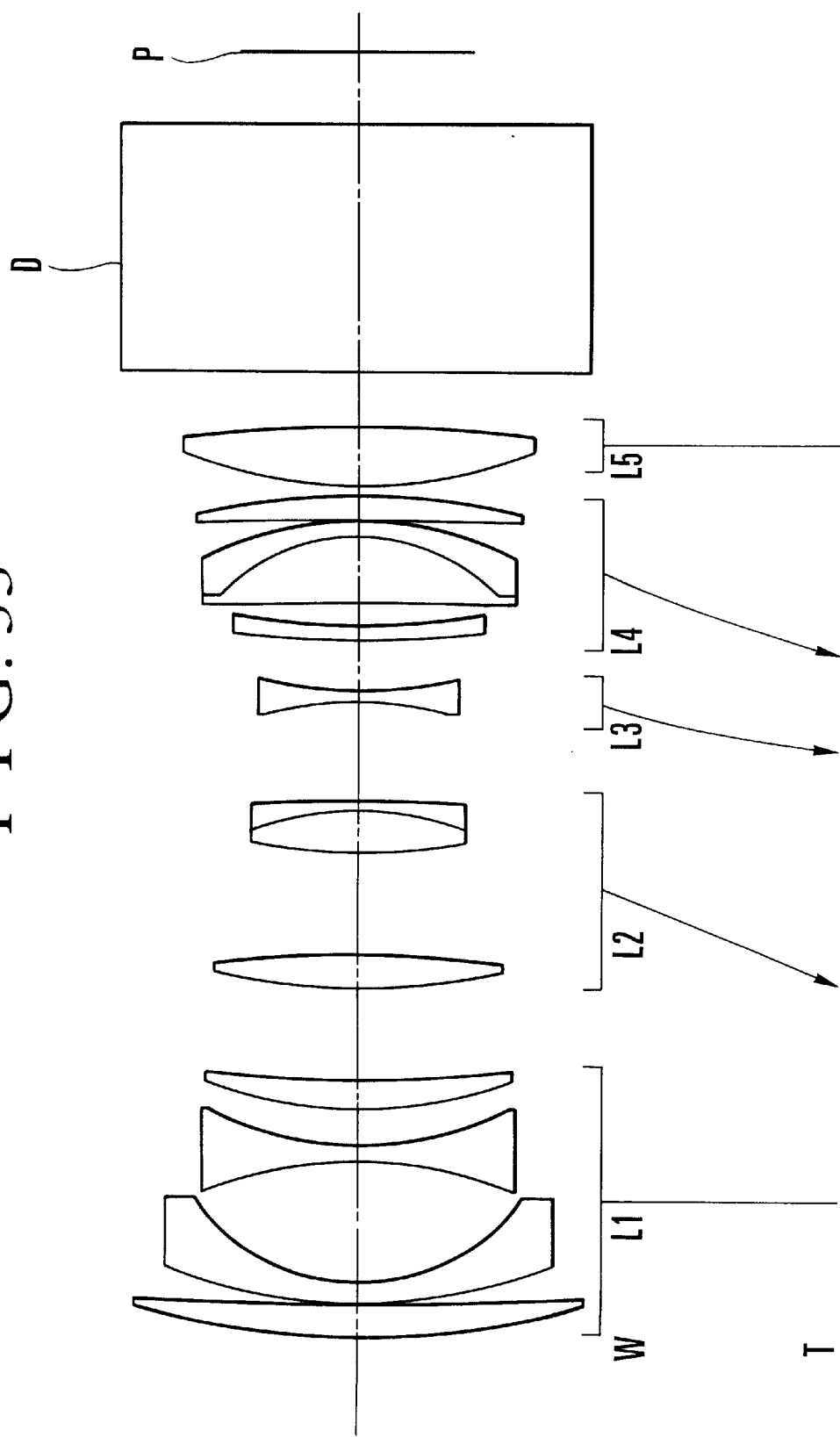
FIG. 33 is a longitudinal section view of an eleventh embodiment of the zoom lens according to the invention.

FIG. 33 in block diagram shows a zoom lens of the eleventh embodiment whose data will be given later in the numerical example 11. The zoom lens of the eleventh embodiment is similar to that of the tenth embodiment, except that the focal length at the wide-angle end of the entire lens system is made even shorter, thus realizing a shortening of the projecting distance (distance to the screen).

Figure 34:
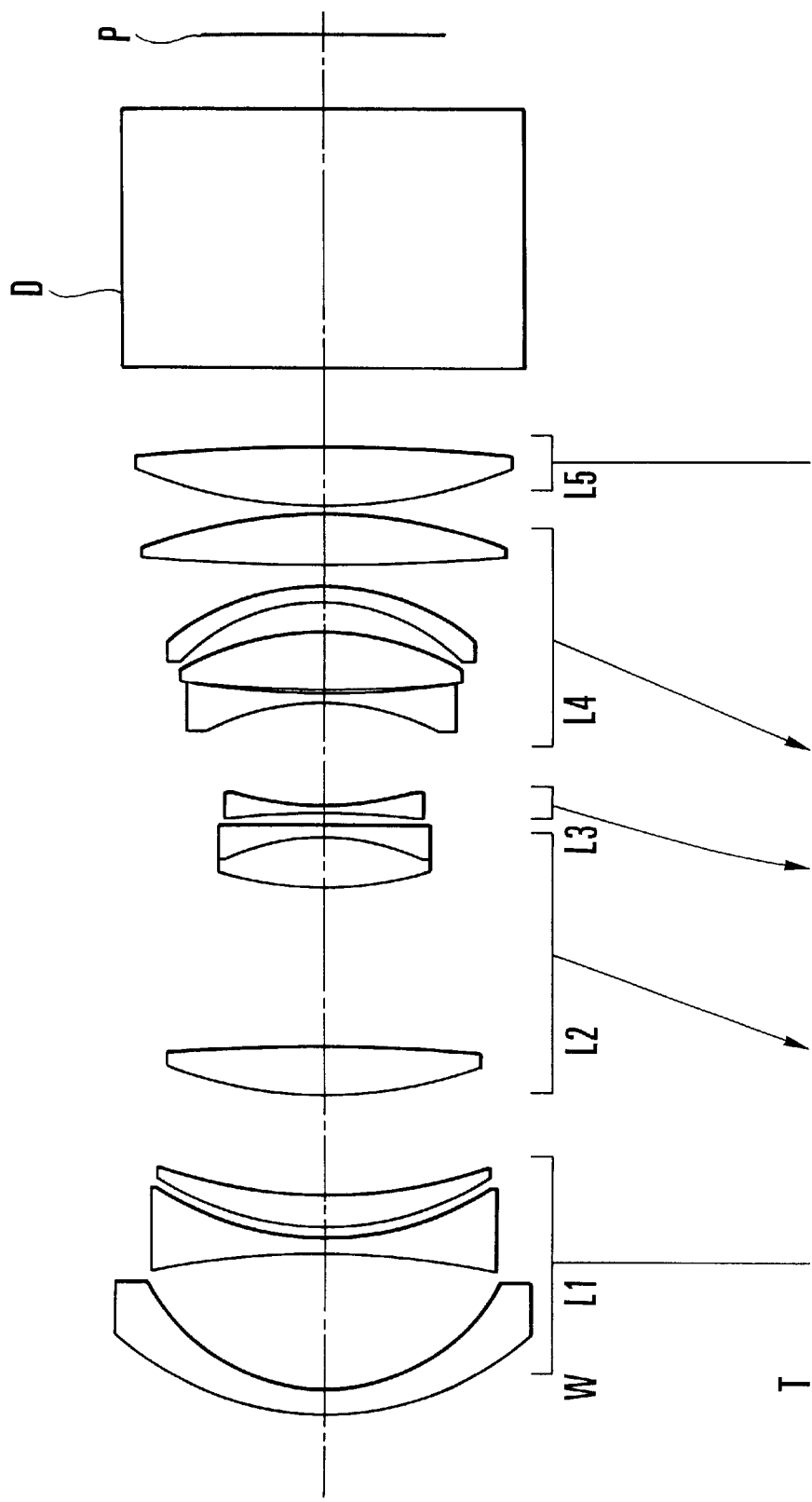
FIG. 34 is a longitudinal section view of a twelfth embodiment of the zoom lens according to the invention.

FIG. 34 in block diagram shows a zoom lens of the twelfth embodiment whose data will be given later in the numerical example 12. The twelfth embodiment differs from the eleventh embodiment in the construction of the first, fourth and fifth lens units.

In the twelfth embodiment, the first lens unit L1 is constructed with, in order from the screen side, a negative lens of meniscus form convex toward the screen side, a negative lens of bi-concave form and a positive lens of meniscus form convex toward the screen side. The negative lens of meniscus form in the first lens unit L1 is an aspherical lens having an aspheric surface facing the screen side. The fourth lens unit L4 is constructed with, in order from the screen side, a negative lens having a surface of stronger power facing the screen side than that of the other surface facing the liquid crystal panel side P, a positive lens having a surface of stronger power facing the liquid crystal panel side P than that of the other surface facing the screen side, a negative lens of meniscus form convex toward the liquid crystal panel side P and a positive lens having a surface of stronger power facing the liquid crystal panel side P than that of the other surface facing the screen side. The fifth lens unit L5 is constructed with a positive lens having an aspheric surface facing the liquid crystal panel side P.

With the use of the aspheric surfaces in the places where the off-axial rays are high from the optical axis, i.e., in the first and fifth lens units, very small distortion is realized.

Figure 35:
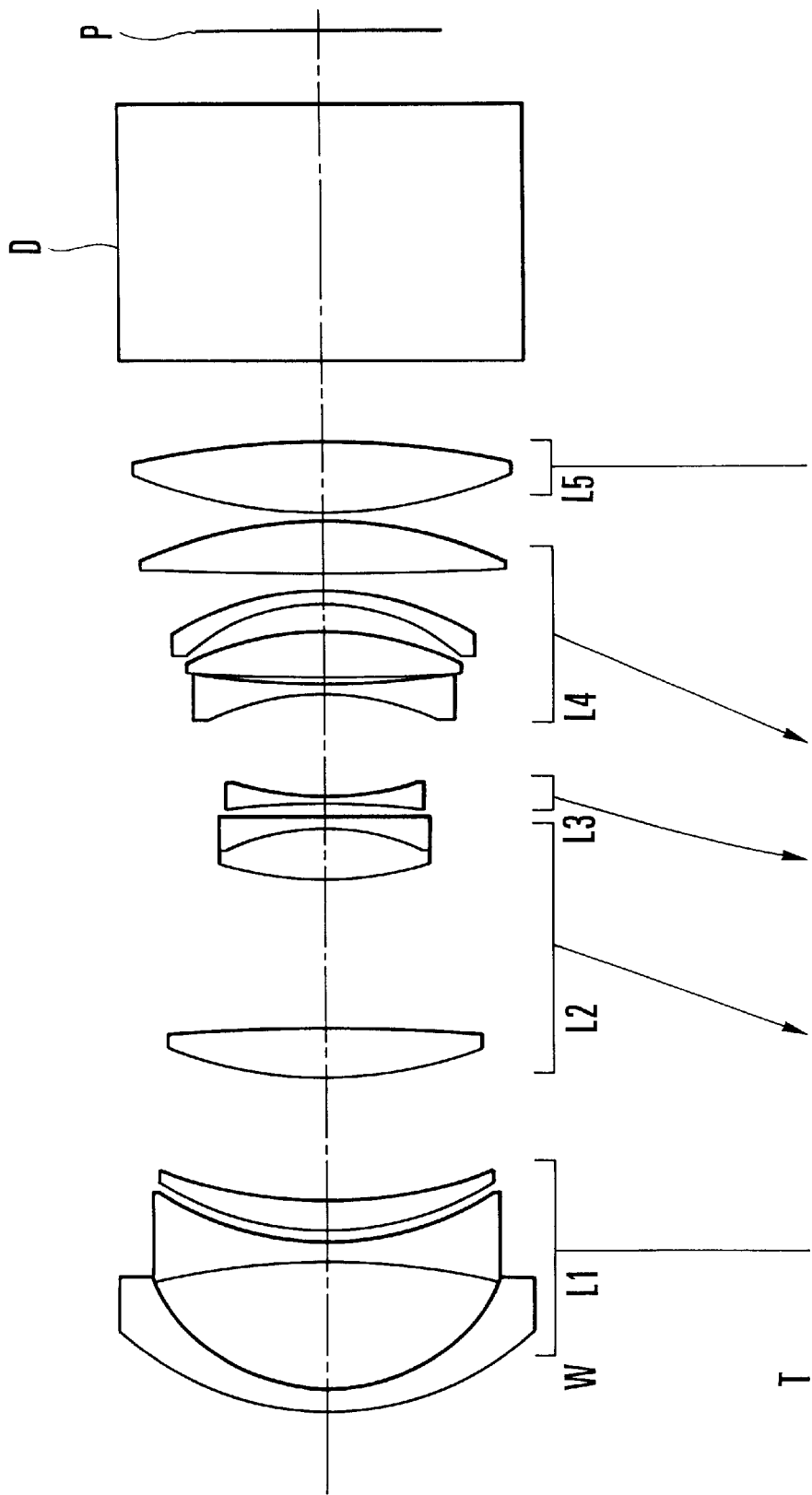
FIG. 35 is a longitudinal section view of a thirteenth embodiment of the zoom lens according to the invention.

FIG. 35 in block diagram shows a zoom lens of the thirteenth embodiment whose data will be given later in the numerical example 13. The thirteenth embodiment is similar in the rules of design to the twelfth embodiment but differs in numerical data.

Figure 36:
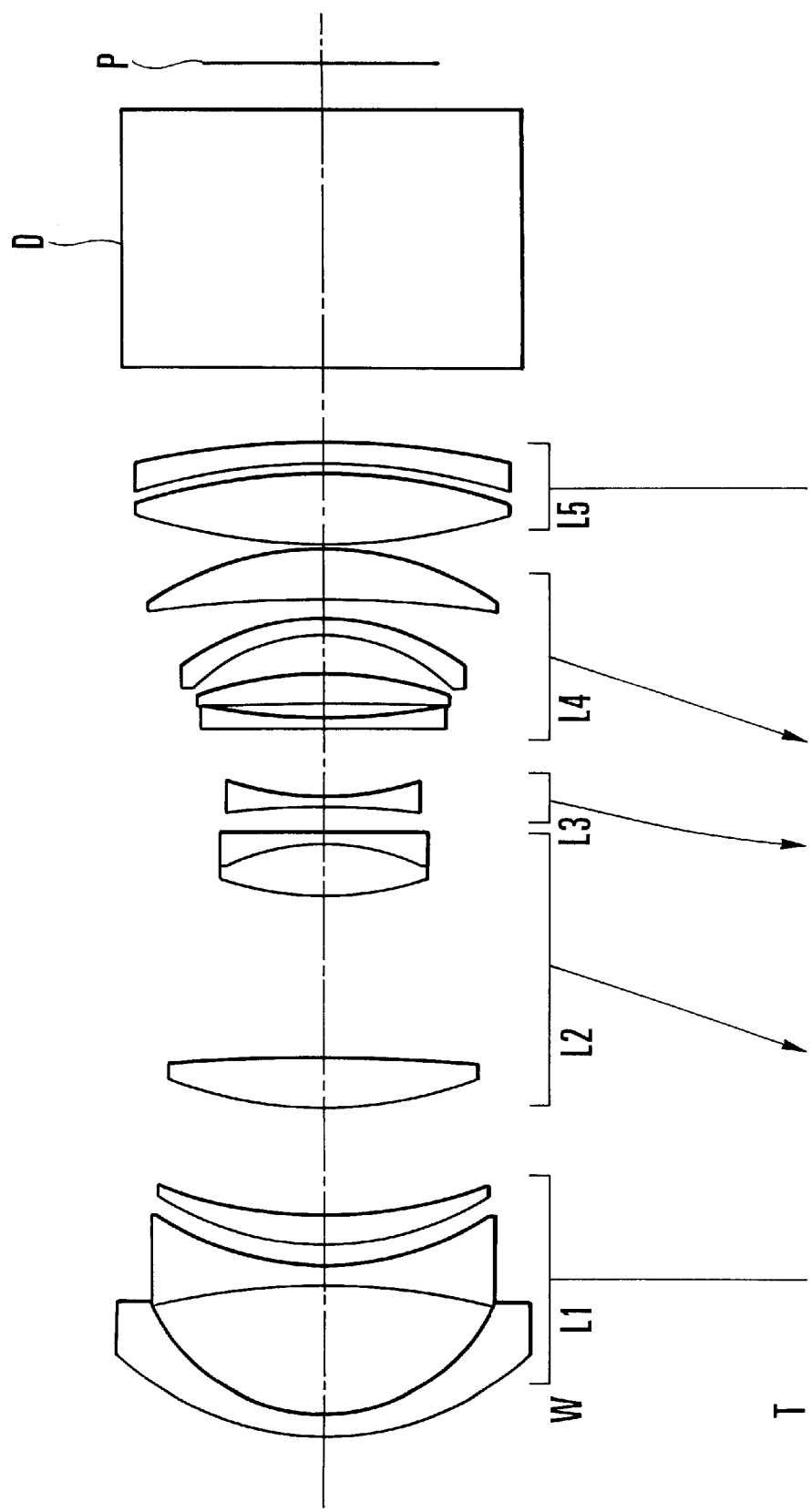
FIG. 36 is a longitudinal section view of a fourteenth embodiment of the zoom lens according to the invention.
Figures 39A, 39B, 39C, 39D:
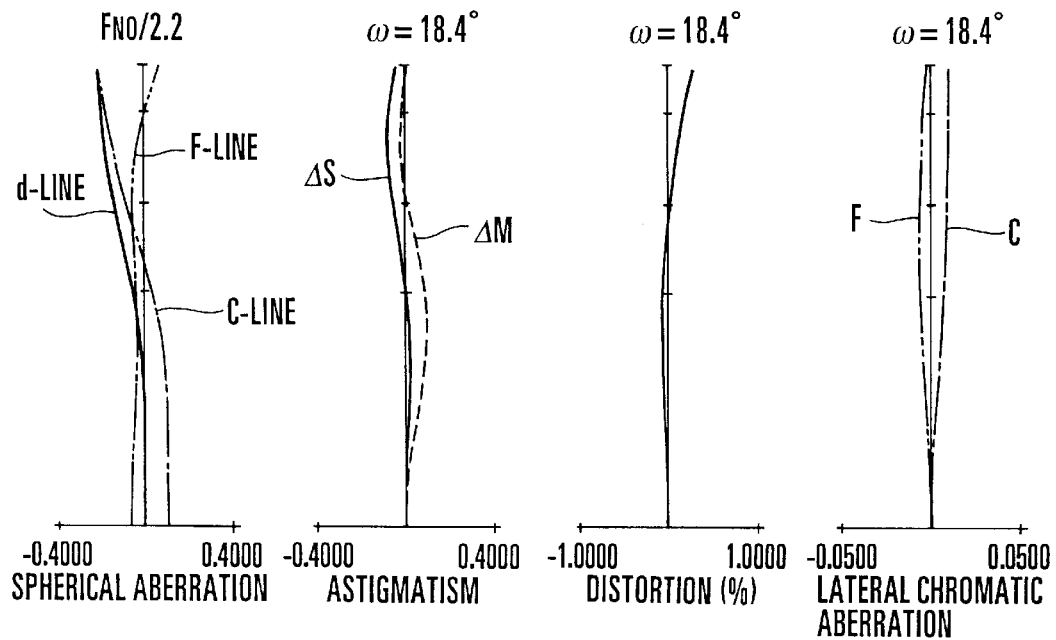
FIGS. 39A to 39D are graphic representations of the aberrations of the zoom lens of the numerical example 10 at the telephoto end.
Figures 40A, 40B, 40C, 40D:
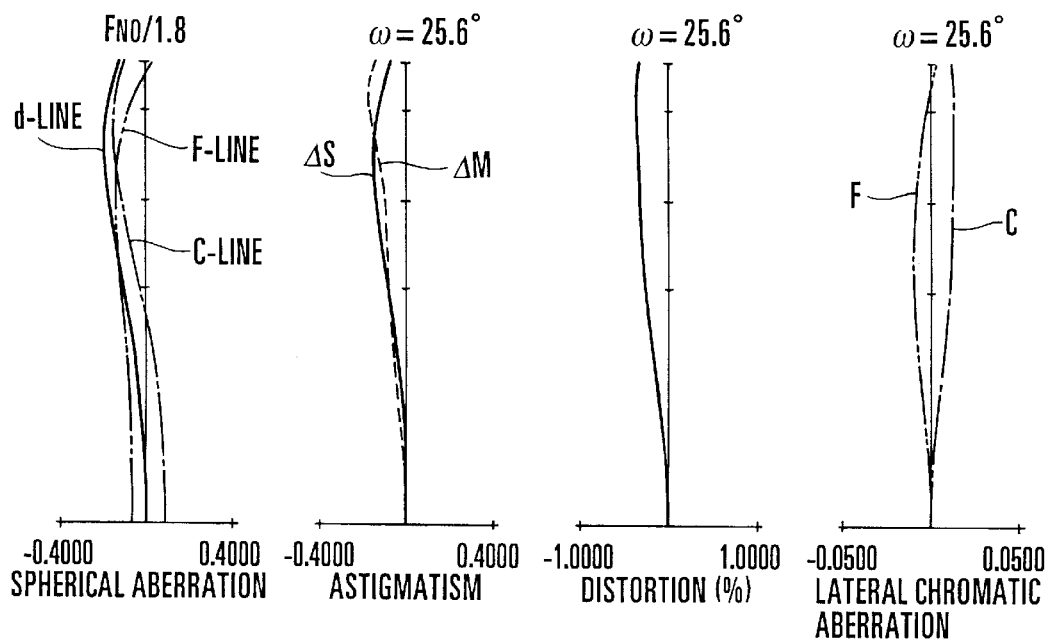
FIGS. 40A to 40D are graphic representations of the various aberrations of the zoom lens of a numerical example 11 at the wide-angle end.

FIG. 36 in block diagram shows a zoom lens of the fourteenth embodiment whose data will be given later in the numerical example 14. The fourteenth embodiment is obtained as derived from the thirteenth embodiment by replacing the fifth lens unit with one positive lens and one negative lens. As the fifth lens unit takes the form of two lenses, similar results to those of the thirteenth embodiment are realized without having to use the aspheric surface in the fifth lens unit.

Next, the characteristic features of each of the tenth to fourteenth embodiments are described.

(b1) As the fifth lens unit L5 is closest to the liquid crystal panel P (display image), the fifth lens unit L5 is given a relatively strong positive refractive power, thereby realizing a telecentric system. Particularly, in the tenth to thirteenth embodiments, the fifth lens unit L5 is constructed with only one lens or a positive lens having a strong convex surface facing the screen side, thus achieving compatibility of correcting field curvature and distortion with simplification of the structure of construction.

(b2) The zooming provision is made in the second, third and fourth lens units, thereby lessening the total zooming movements of all these lenses. A shortening of the total length of the entire lens system is thus assured. In addition, the distance from that pupil which is viewed from the screen side to the front vertex is shortened, thereby making it possible to reduce the diameter of the front lens members that is determined by the off-axial oblique light beam.

(b3) The first lens unit L1, because of its having the negative refractive power, allows the entire lens system to take the retrofocus form. For the purpose of creating a space the color combining element such as a crossed dichroic prism occupies, a long back focal distance is thus secured.

(b4) The arrangement of the refractive powers of all the lens units are made suitable and the first lens unit L1 is made stationary during zooming, so as to reduce the variation with zooming of the incident position of the off-axial oblique light beam on the first lens unit L1. Along with the simplification of the structure of construction, a lens system of constant total length is achieved.

(b4) In the tenth and eleventh embodiments, the first lens unit L1 is provided with a positive lens at the closest position to the screen side having a surface of stronger power facing the screen side than that of the other surface facing the liquid crystal panel side and a negative meniscus lens convex toward the screen side at the second place, when counted from the screen side, having at least one aspheric surface, thus assuring reduction of the distortion in the wide-angle end.

In the twelfth and thirteenth embodiments, a negative meniscus lens convex toward the screen side and having an aspheric surface facing the screen side is arranged at the closest position to the screen side in the first lens unit L1 and at least one aspheric surface is arranged in the fifth lens unit L5, thus assuring reduction of the distortion in the wide-angle end.

In the fourteenth embodiment, a negative meniscus lens convex toward the screen side and having an aspheric surface facing the screen side is arranged at the closest position to the screen side in the first lens unit L1 and at least one positive lens and at least one negative lens are arranged in the fifth lens unit L5, thus assuring reduction of the distortion in the wide-angle end.

(b6) Letting the focal lengths at the wide-angle end and the telephoto end of the entire lens system be denoted by fw and ft, respectively, the focal length of the first lens unit L1 be denoted by f1, the focal length of the second lens unit L2 be denoted by f2, the focal length of the third lens unit L3 be denoted by f3, the focal length of the fourth lens unit L4 be denoted by f4, the focal length of the fifth lens unit L5 be denoted by f5, and the distance at the wide-angle end from the pupil as viewed from the liquid crystal panel side P (short conjugate side) to the liquid crystal panel P when the conjugate length on the screen side (long conjugate side) is infinite be denoted by tkw, the following conditions are satisfied:

$$4 < |tkw/fw| \tag{36}$$

$$0.8 < |f1|/f2 < 2 \tag{37}$$

$$0.5 < |f2/\sqrt{fw \cdot ft}| < 1.5 \tag{38}$$

The inequality of condition (36) gives a range for the ratio of the distance between the pupil as viewed from the liquid crystal panel side P and the liquid crystal panel P to the focal length at the wide-angle end of the entire lens system. In a range beyond the condition (36), as this means that the pupil is too close to the liquid crystal panel P, the principal ray of the off-axial beam has to emerge from the display image at a larger angle with respect to the optical axis. Then, the principal ray enters the color-combining element such as a crossed dichroic prism in between the liquid crystal panel P and the projection lens. Because the angle of incidence changes greatly as the principal ray is displaced toward the margin of the image frame, random color differences are produced on the screen. So, the violation is objectionable.

The condition (37) is set forth for appropriately regulating the relationship between the second lens unit L2 serving as the main variator and the first lens unit L1. When the lower limit of the condition (37) is exceeded, the diameter of the front lens members, which is determined by the first lens unit L1, becomes larger. Also, the distortion for the wide-angle end increases objectionably. Conversely, when the upper limit is exceeded, the movement of the second lens unit L2 necessarily increases to obtain the desired zoom ratio. Then, the size of the entire lens system increases objectionably.

The inequalities of condition (38) give a proper range for the power of the main variator. When the lower limit is exceeded, field curvature is unduly under-corrected. Conversely, when the upper limit is exceeded, the required movement for the desired zoom ratio of the second lens unit L2 necessarily increases to increase the size of the entire lens system objectionably.

Also, for the purpose of correcting curvature of field well, the following condition is satisfied:

$$0.9 < |f1|/fw < 2 \tag{39}$$

When the lower limit of the condition (39) is exceeded, as this means that the power of the first lens unit L1 is too strong, over-correction of field curvature results. When the upper limit is exceeded, as this means that the power of the first lens unit L1 is too weak, field curvature is under-corrected. So, these violations are objectionable.

Also, Letting the ratio of the magnifications β2t and β2w at the telephoto end and the wide-angle end, respectively, of the second lens unit L2 serving as the main variator be denoted by Z2, the ratio of the focal lengths ft and fw at the telephoto end and the wide-angle end, respectively, of the entire lens system be denoted by Z, and the zooming movements (or the differences between the positions in the wide-angle end and the telephoto end) of the second and fourth lens units L2 and L4 be denoted by M2 and M4, respectively, the following conditions are satisfied:

$$0.9 < Z2/Z < 1.1 \tag{40}$$

$$0.5 < M2/M4 < 1.9 \tag{41}$$

$$0.5 < M2/(ft - fw) < 1.5 \tag{42}$$

The inequalities of condition (40) give a proper range for the ratio of the variations of magnification in the two variators or the second and fourth lens units. Because the third lens unit contributes to demagnification, the ratio is preferred to fall within this range.

The conditions (41) and (42) are provided for making a good compromise between the physical length of the complete lens and the movement of each of the variators. In particular, since, of the second lens unit L2 and the fourth lens unit L4, the fourth lens unit L4 is liable to get weaker in power, in order to assure appropriate distribution of the variations of magnification, the condition is preferred to fall within this range.

As described above, the power of the fourth lens unit L4 tends to be weaker than that of the second lens unit L2. Therefore, the following condition is satisfied:

$$0.15 < f2/f4 < 0.9 \tag{43}$$

The inequalities of condition (43) are a necessary rule for determination of an appropriate Petzval sum, while making the suitable power arrangement of the main variators and the adequate zoom ratio.

Also, letting the back focal distance be denoted by bf, the following conditions are set forth:

$$0.3 < bf/f5 < 0.6 \tag{44}$$

$$0.9 < |f1|/bf < 2.2 \tag{45}$$

When these conditions are satisfied, the position of the pupil of the entire lens system as viewed from the liquid crystal panel side P and the distortion are appropriately determined.

The term "back focal distance bf" means the distance from the fifth lens unit L5 to the liquid crystal panel P as measured by reduction to the air. The inequalities of condition (44) are a necessary rule for making the entire lens system telecentric adequately. When the upper limit of the condition (44) is exceeded, the size of the entire lens system increases greatly. When the lower limit is exceeded, distortion is produced. The inequalities of condition (45), too, are for making the telecentric form by elongating the distance to the pupil as viewed from the liquid crystal panel side P, while still permitting distortion to be taken appropriate.

Also, in order to minimize the bulk and size, the power arrangement of all the lens units has to be made appropriate to obtain the proper movement of each of the lens units, and, letting the focal length of the i-th lens unit be denoted by fi, the following conditions are $$1.0 < |f1|/\sqrt{fw \cdot ft} < 1.7 \quad (46)$$

$$0.6 < |f3|/\sqrt{fw \cdot ft} < 2.0 \quad (47)$$

$$1.1 < f4/\sqrt{fw \cdot ft} < 3.5 \quad (48)$$

$$1.5 < f5/\sqrt{fw \cdot ft} < 3.0 \quad (49)$$

Also, not only to reduce lateral chromatic aberration but also to suppress its variation with zooming, the third lens unit L3 is constructed with a negative lens whose Abbe number v3 lies within the following range:

$$v3 > 35 \quad (50)$$

For more desired results, it is preferred to alter the inequality (50) as follows:

$$v3 > 40 \quad (50a)$$

Also, in order to reduce lateral chromatic aberrations of higher orders, the mean value v1n of the Abbe numbers of the negative lenses in the first lens unit L1 satisfies the following condition:

$$v1n > 55 \quad (51)$$

In order to correct distortion well, the fifth lens unit L5 is constructed with one positive lens which satisfies the following condition:

$$1 < |R5r/R5f| \quad (52)$$

where R5f and R5r are the radii of curvature of the surfaces of the positive lens facing the screen side and the display image side, respectively.

Also, to facilitate good correction of distortion, the following condition is satisfied:

$$0.15 < SF5 < 1.5 \quad (53)$$

where SF5=(R5r+R5f)/(R5r−R5f).

The zoom lenses of the tenth to fourteenth embodiments satisfy all of the conditions (36) to (53) cited above. It is, however, to be understood that all the conditions are not always required to be satisfied at the same time. Any one of the effects of the conditions can be produced independently of the others. Therefore, the zoom lens can take any combination of the conditions (36) to (53), depending on its specification.

(b7) Focusing to finite distances is performed by the first lens unit L1. Although this is simplest on the design, focusing may be performed by moving the third lens unit L3, or the fifth lens unit L5 or two lens units in differential relation. Another method is to bodily move the zoom lens or to move the liquid crystal panel P.

Based on the rules of design as revealed in the tenth to fourteenth embodiments, a compact telecentric zoom lens can be realized which, although in simple form, is as bright as 1.8 in F-number and whose distortion and longitudinal chromatic aberration are suppressed to a minimum. The use of such a zoom lens as the projection lens makes it possible for the projection apparatus to display a high-definition picture on the screen in an enlarged scale. Another advantage arising from very small distortion over the entire zooming range is that, even if two or more items of the liquid crystal projector are used to perform stack projection, the possibility of the occurrence of picture-element offset can be made very small. Therefore, a brighter, higher-in-definition projected picture can be obtained.

Next, five numerical examples 10 to 14 corresponding to the tenth to fourteenth embodiments are shown. In the numerical data for the examples 10 to 14, ri is the radius of curvature of the i-th surface, when counted from the screen side, di is the axial separation ail between the i-th and (i+1)st surfaces, when counted from the screen side, ni is the refractive index for the spectral d-line of the i-th optical member, when counted from the screen side, and vi is the Abbe number of the i-th optical member, when counted from the screen side.

The shape of an aspheric surface is expressed by the following equation:

$$x = \frac{y^2/r}{1+\sqrt{1-(1+k)(y/r)^2}} + By^4 + Cy^6 + Dy^8 + Ey^{10}$$

where x is the axial deviation from the vertex, y is the distance from an optical axis, r is the radius of the osculating sphere, k is the conical constant, and B, C, D and E are the aspheric coefficients.

FIGS. 37A to 37D through FIGS. 39A to 39D graphically show the aberrations of the zoom lens of the numerical example 10 (the tenth embodiment) at the wide-angle end, a middle focal length position and the telephoto end, respectively. FIGS. 40A to 40D through FIGS. 42A to 42D graphically show the aberrations of the zoom lens of the numerical example 11 (the eleventh embodiment) at the wide-angle end, a middle focal length position and the telephoto end, respectively. FIGS. 43A to 43D through FIGS. 45A to 45D graphically show the aberrations of the zoom lens of the numerical example 12 (the twelfth embodiment) at the wide-angle end, a middle focal length position and the telephoto end, respectively. FIGS. 46A to 46D through FIGS. 48A to 48D graphically show the aberrations of the zoom lens of the numerical example 13 (the thirteenth embodiment) ay the wide-angle end, a middle focal length position and the telephoto end, respectively. FIGS. 49A to 49D through FIGS. 51A to 51D graphically show the aberrations of the zoom lens of the numerical example 14 (the fourteenth embodiment) at the wide-angle end, a middle focal length position and the telephoto end, respectively.

Also, the values of the factors in the above-described conditions (36) to (53) for the numerical examples 10 to 14 are listed in a table.

Numerical Example 10:
f = 53.73950~69.82    Fno = 1:1.8~2.2    2ω = 23.5°~18.4°

| | | | |
|---|---|---|---|
| r1 = 103.418 | d1 = 7.70 | n1 = 1.66672 | ν1 = 48.3 |
| r2 = 618.272 | d2 = 0.20 | | |
| *r3 = 127.652 | d3 = 3.30 | n2 = 1.49171 | ν2 = 57.4 |
| r4 = 34.874 | d4 = 20.85 | | |
| r5 = −60.242 | d5 = 2.60 | n3 = 1.51633 | ν3 = 64.1 |
| r6 = 60.241 | d6 = 2.65 | | |
| r7 = 67.226 | d7 = 5.65 | n4 = 1.83400 | ν4 = 37.2 |
| r8 = 317.496 | d8 = Variable | | |
| r0 = 119.270 | d9 = 5.40 | n5 = 1.78590 | ν5 = 44.2 |
| r10 = −182.799 | d10 = 9.05 | | |
| r11 = 111.009 | d11 = 8.45 | n6 = 1.78590 | ν6 = 44.2 |
| r12 = −44.894 | d12 = 1.80 | n7 = 1.84666 | ν7 = 23.8 |
| r13 = (Stop) | d13 = Variable | | |
| r14 = −63.074 | d14 = 1.70 | n8 = 1.51633 | ν8 = 64.1 |
| r15 = 80.273 | d15 = Variable | | |
| r16 = 6902.827 | d16 = 2.30 | n9 = 1.51742 | ν9 = 52.4 |
| r17 = 145.483 | d17 = 4.40 | | |
| r18 = −522.549 | d18 = 14.50 | n10 = 1.72000 | ν10 = 50.2 |
| r19 = −31.435 | d19 = 2.60 | n11 = 1.80518 | ν11 = 25.4 |
| r20 = −59.588 | d20 = 0.20 | | |
| r21 = −2252.485 | d21 = 3.30 | n12 = 1.71300 | ν12 = 53.9 |
| r22 = −232.559 | d22 = Variable | | |
| r23 = 92.284 | d23 = 9.25 | n13 = 1.71300 | ν13 = 53.9 |
| r24 = −513.828 | d24 = 9.90 | | |
| r25 = ∞ | d25 = 45.00 | n14 = 1.51633 | ν14 = 64.1 |
| r26 = ∞ | | | |

*)Aspheric surface

| Variable Separation | Focal Length | | |
|---|---|---|---|
| | 53.74 | 62.62 | 69.82 |
| d8 | 15.94 | 6.71 | 1.10 |
| d13 | 15.53 | 18.50 | 21.87 |
| d15 | 11.17 | 7.81 | 4.96 |
| d22 | 4.04 | 13.66 | 18.76 |

Aspheric Coefficients for the surface r3:

r = 1.27652D+02    k = 1.95682D+00    B = 5.50527D−07
C = 1.98030D−09    D = −3.81162D−13    E = −1.30831D−16

Numerical Example 11:

Numerical Example 11:
f = 48.33096~62.80    Fno = 1:1.8~2.2    2ω = 25.6°~20.3°

| | | | |
|---|---|---|---|
| r1 = 169.545 | d1 = 6.12 | n1 = 1.65844 | ν1 = 50.9 |
| r2 = 983.297 | d2 = 0.20 | | |
| *r3 = 109.090 | d3 = 3.50 | n2 = 1.49171 | ν2 = 57.4 |
| r4 = 38.214 | d4 = 22.10 | | |
| r5 = −70.615 | d5 = 2.28 | n3 = 1.51633 | ν3 = 64.1 |
| r6 = 62.765 | d6 = 6.60 | | |
| r7 = 84.403 | d7 = 5.35 | n4 = 1.83400 | ν4 = 37.2 |
| r8 = 326.297 | d8 = Variable | | |
| r9 = 117.649 | d9 = 6.12 | n5 = 1.80610 | ν5 = 40.9 |
| r10 = −274.264 | d10 = 19.27 | | |
| r11 = 98.735 | d11 = 7.36 | n6 = 1.77250 | ν6 = 49.6 |
| r12 = −55.314 | d12 = 1.80 | n7 = 1.84666 | ν7 = 23.8 |
| r13 = (Stop) | d13 = Variable | | |
| r14 = −60.028 | d14 = 1.70 | n8 = 1.51742 | ν8 = 52.4 |
| r15 = 77.807 | d15 = Variable | | |
| r16 = 333.489 | d16 = 2.30 | n9 = 1.64769 | ν9 = 33.8 |
| r17 = 130.991 | d17 = 5.05 | | |
| r18 = −373.610 | d18 = 11.60 | n10 = 1.72000 | ν10 = 50.2 |
| r19 = −35.135 | d19 = 2.60 | n11 = 1.80518 | ν11 = 25.4 |
| r20 = −68.550 | d20 = 0.20 | | |
| r21 = −3923.400 | d21 = 4.99 | n12 = 1.71300 | ν12 = 53.9 |
| r22 = −143.857 | d22 = Variable | | |
| r23 = 93.531 | d23 = 9.71 | n13 = 1.65844 | ν13 = 50.9 |
| r24 = −295.472 | d24 = 9.90 | | |
| r25 = ∞ | d25 = 45.00 | n14 = 1.51633 | ν14 = 64.1 |
| r26 = ∞ | | | |

*)Aspheric surface

| Variable Separation | Focal Length | | |
|---|---|---|---|
| | 48.33 | 56.32 | 62.80 |
| d8 | 16.36 | 6.75 | 0.90 |
| d13 | 16.92 | 20.34 | 24.34 |
| d15 | 10.12 | 4.47 | 4.47 |
| d22 | 1.98 | 15.67 | 15.67 |

Aspheric Coefficients for the surface r3:

r = 1.09090D+02    k = −358888D−01    B = 4.92328D−07
C = −1.48369D−09    D = −1.05396D−12    E = −5.12720D−16

Numerical Example 12:

Numerical Example 12:
f = 48.50796~62.24    Fno = 1:1.8~2.2    2ω = 26.1°~20.9°

| | | | |
|---|---|---|---|
| *r1 = 63.479 | d1 = 4.00 | n1 = 1.49171 | ν1 = 57.4 |
| r2 = 35.542 | d2 = 23.71 | | |
| r3 = −151.084 | d3 = 3.00 | n2 = 1.51633 | ν2 = 64.1 |
| r4 = 56.459 | d4 = 1.77 | | |
| r5 = 55.368 | d5 = 5.45 | n3 = 1.80518 | ν3 = 25.4 |
| r6 = 83.102 | d6 = Variable | | |
| r7 = 81.106 | d7 = 8.31 | n4 = 1.78590 | ν4 = 44.2 |
| r8 = −453.504 | d8 = 27.49 | | |
| r9 = 62.681 | d9 = 9.26 | n5 = 1.83400 | ν5 = 37.2 |
| r10 = −42.913 | d10 = 1.80 | n6 = 1.84665 | ν6 = 23.8 |
| r11 = (Stop) | d11 = Variable | | |
| r12 = −145.867 | d12 = 1.70 | n7 = 1.58144 | ν7 = 40.8 |
| r13 = 57.174 | d13 = Variable | | |
| r14 = −44.352 | d14 = 2.00 | n8 = 1.67270 | ν8 = 32.1 |
| r15 = 199.293 | d15 = 0.42 | | |
| r16 = 270.110 | d16 = 9.84 | n9 = 1.77250 | ν9 = 49.6 |
| r17 = −51.072 | d17 = 5.18 | | |
| r18 = −36.882 | d18 = 2.60 | n10 = 1.68893 | ν10 = 31.1 |
| r19 = −45.325 | d19 = 3.64 | | |
| r20 = 433.887 | d20 = 9.16 | n11 = 1.69680 | ν11 = 55.5 |
| r21 = −91.944 | d21 = Variable | | |
| r22 = 90.765 | d22 = 10.49 | n12 = 1.49171 | ν12 = 57.4 |
| *r23 = −232.974 | d23 = 14.00 | | |
| r24 = ∞ | d24 = 45.00 | n13 = 1.51633 | ν13 = 64.2 |
| r25 = ∞ | | | |

*)Aspheric surface

| Variable Separation | Focal Length | | |
|---|---|---|---|
| | 48.33 | 56.32 | 62.80 |
| d6 | 17.86 | 10.00 | 2.15 |
| d11 | 2.23 | 3.80 | 6.56 |
| d13 | 17.76 | 14.48 | 9.51 |
| d21 | 1.21 | 10.77 | 20.84 |

Aspheric Coefficients for the surface r1:

r = 6.34789D+01    k = 6.50264D−05    B = 6.06193D−07
C = 7.46606D−11    D = 7.71536D−14    E = −1.12405D−17

Aspheric Coefficients for the surface r23:

r = −2.32974D+02    k = −1.28036D−02    B = 5.09749D−07
C = 5.33821D−10    D = −6.16053D−13    E = 4.24068D−16

Numerical Example 13:

| Numerical Example 13: | | | |
|---|---|---|---|
| f = 48.78185~62.06 | Fno = 1:1.8~2.2 | 2ω = 26°~21° | |
| *r1 = 61.252 | d1 = 4.00 | n1 = 1.49171 | ν1 = 57.4 |
| r2 = 34.575 | d2 = 22.87 | | |
| r3 = −127.910 | d3 = 3.00 | n2 = 1.48749 | ν2 = 70.2 |
| r4 = 53.342 | d4 = 1.65 | | |
| r5 = 52.537 | d5 = 6.04 | n3 = 1.83400 | ν3 = 37.2 |
| r6 = 81.758 | d6 = Variable | | |
| r7 = 86.283 | d7 = 7.54 | n4 = 1.83400 | ν4 = 37.2 |
| r8 = −404.187 | d8 = 26.17 | | |
| r9 = 60.941 | d9 = 9.46 | n5 = 1.80610 | ν5 = 40.9 |
| r10 = −43.166 | d10 = 1.80 | n6 = 1.84665 | ν6 = 23.8 |
| r11 = (Stop) | d11 = Variable | | |
| r12 = −172.102 | d12 = 1.70 | n7 = 1.54814 | ν7 = 45.8 |
| r13 = 52.712 | d13 = Variable | | |
| r14 = −52.506 | d14 = 2.00 | n8 = 1.68893 | ν8 = 31.1 |
| r15 = 168.703 | d15 = 0.91 | | |
| r16 = 526.957 | d16 = 8.05 | n9 = 1.77250 | ν9 = 49.6 |
| r17 = −51.881 | d17 = 4.66 | | |
| r18 = −37.857 | d18 = 2.60 | n10 = 1.83400 | ν10 = 37.2 |
| r19 = −50.152 | d19 = 3.64 | | |
| r20 = 4099.926 | d20 = 9.15 | n11 = 1.71300 | ν11 = 53.9 |
| r21 = −75.640 | d21 = Variable | | |
| r22 = 91.320 | d22 = 11.82 | n12 = 1.49171 | ν12 = 57.4 |
| *r23 = −143.898 | d23 = 14.00 | | |
| r24 = ∞ | d24 = 45.00 | n13 = 1.51633 | ν13 = 64.2 |
| r25 = ∞ | | | |

*)Aspheric surface

| Variable Separation | Focal Length | | |
|---|---|---|---|
| | 48.78 | 54.61 | 62.06 |
| d6 | 21.99 | 14.37 | 6.75 |
| d11 | 2.12 | 4.23 | 7.38 |
| d13 | 17.35 | 13.94 | 9.03 |
| d21 | 1.17 | 10.09 | 19.48 |

Aspheric Coefficients for the surface r1:

r = 6.12524D+01    k = 3.40009D−03    B = −1.10565D−07
C = −1.19816D−09   D = 6.56438D−13    E = −2.53493D−16

Aspheric Coefficients for the surface r23:

r = −1.43898D+02   k = 7.00591D−01    B = 1.16770D−06
C = 3.86787D−09    D = −2.88980D−12   E = 1.67835D−15

Numerical Example 14:

| Numerical Example 14: | | | |
|---|---|---|---|
| f = 48.89578~62.08 | Fno = 1:1.8~2.2 | 2ω = 26°~21° | |
| *r1 = 62.550 | d1 = 4.00 | n1 = 1.49171 | ν1 = 57.4 |
| r2 = 35.217 | d2 = 22.73 | | |
| r3 = −122.794 | d3 = 3.00 | n2 = 1.48749 | ν2 = 70.2 |
| r4 = 54.290 | d4 = 3.60 | | |
| r5 = 56.965 | d5 = 5.96 | n3 = 1.83400 | ν3 = 37.2 |
| r6 = 93.368 | d6 = Variable | | |
| r7 = 95.419 | d7 = 8.33 | n4 = 1.83400 | ν4 = 37.2 |
| r8 = −307.193 | d8 = 27.84 | | |
| r9 = 61.278 | d9 = 9.31 | n5 = 1.78590 | ν5 = 44.2 |
| r10 = −45.703 | d10 = 1.80 | n6 = 1.84666 | ν6 = 23.8 |
| r11 = (Stop) | d11 = Variable | | |
| r12 = −114.402 | d12 = 1.70 | n7 = 1.54814 | ν7 = 45.8 |
| r13 = 62.658 | d13 = Variable | | |
| r14 = −3420.867 | d14 = 2.00 | n8 = 1.78472 | ν8 = 25.7 |
| r15 = 117.477 | d15 = 2.72 | | |
| r16 = −326.926 | d16 = 4.87 | n9 = 1.77250 | ν9 = 49.6 |
| r17 = −68.374 | d17 = 6.60 | | |
| r18 = −34.700 | d18 = 2.60 | n10 = 1.83400 | ν10 = 37.2 |
| r19 = −45.602 | d19 = 3.64 | | |
| r20 = −237.548 | d20 = 8.58 | n11 = 1.69680 | ν11 = 55.5 |
| r21 = −58.940 | d21 = Variable | | |
| r22 = 112.818 | d22 = 12.56 | n12 = 1.69680 | ν12 = 55.5 |
| r23 = −113.901 | d23 = 1.51 | | |
| r24 = −112.534 | d24 = 3.00 | n13 = 1.59551 | ν13 = 39.2 |
| r25 = −193.806 | d25 = 14.00 | | |
| r26 = ∞ | d26 = 45.00 | n14 = 1.51633 | ν14 = 64.2 |
| r27 = ∞ | | | |

*)Aspheric surface

| Variable Separation | Focal Length | | |
|---|---|---|---|
| | 48.896 | 54.707 | 62.080 |
| d6 | 19.25 | 12.08 | 4.90 |
| d11 | 5.07 | 7.87 | 11.64 |
| d13 | 11.89 | 9.39 | 5.47 |
| d21 | 1.17 | 8.04 | 15.36 |

Aspheric Coefficients for the surface r1:

r = 6.25503D+01    k = 3.42175D−03    B = 5.05186D−07
C = −6.17842D−10   D = 4.77369D−13    E = −1.94075D−16

| Condition | Numerical Example | | | | |
|---|---|---|---|---|---|
| No. | 10 | 11 | 12 | 13 | 14 |
| (36) | 7.576 | 7.699 | 6.139 | 6.104 | 6.092 |
| (37) | 1.595 | 1.359 | 1.356 | 1.391 | 1.365 |
| (38) | 0.902 | 1.057 | 0.932 | 0.938 | 0.979 |
| (39) | 1.640 | 1.638 | 1.431 | 1.471 | 1.506 |
| (40) | 0.983 | 0.980 | 1.007 | 0.995 | 0.977 |
| (41) | 1.008 | 1.129 | 0.800 | 0.833 | 1.011 |
| (42) | 0.923 | 1.068 | 1.144 | 1.147 | 1.088 |
| (43) | 0.529 | 0.577 | 0.425 | 0.338 | 0.379 |
| (44) | 0.468 | 0.473 | 0.409 | 0.475 | 0.502 |
| (45) | 1.707 | 1.535 | 1.264 | 1.308 | 1.452 |
| (46) | 1.439 | 1.437 | 1.263 | 1.305 | 1.337 |
| (47) | 1.112 | 1.183 | 1.282 | 1.334 | 1.174 |
| (48) | 1.705 | 1.833 | 2.193 | 2.774 | 2.585 |
| (49) | 1.803 | 1.978 | 2.444 | 2.100 | 1.834 |
| (50) | 64.14 | 52.43 | 40.75 | 45.79 | 45.79 |
| (51) | 60.77 | 60.77 | 60.77 | 63.82 | 63.82 |
| (52) | 5.568 | 3.159 | 2.567 | 1.576 | — |
| (53) | 0.695 | 0.519 | 0.439 | 0.224 | — |

What is claimed is:

1. A zoom lens comprising in order from a larger conjugate side, a first lens unit of negative refractive power, a second lens unit of positive refractive power which moves toward the larger conjugate side during zooming from a wide-angle end to a telephoto end, a third lens unit of negative refractive power, a fourth lens unit of positive refractive power which moves toward the larger conjugate side during zooming from the wide-angle end to the telephoto end, a fifth lens unit of positive refractive power, and a stop which moves during zooming from the wide-angle end to the telephoto end, wherein the lens satisfies the following condition:

$$|tk|/fw > 4.0$$

where fw is a focal length of a whole lens system at the wide angle end, and tk is a minimum value of a distance from a conjugate surface on a smaller conjugate side to a pupil on the smaller conjugate side during zooming from the wide-angle end to the telephoto end.

2. A zoom lens according to claim 1, wherein, during zooming from the wide-angle end to the telephoto end, a separation between said second lens unit and said third lens unit increases and a separation between said third lens unit and said fourth lens unit decreases.

3. A zoom lens according to claim 1, wherein, during zooming from the wide-angle end to the telephoto end, a separation between said first lens unit and said second lens unit decreases, a separation between said second lens unit and said third lens unit increases, a separation between said third lens unit and said fourth lens unit decreases and a separation between said fourth lens unit and said fifth lens unit increases.

4. A zoom lens according to claim 1, wherein said second lens unit includes at least two positive lenses and at least one negative lens, and said third lens unit includes at least one negative lens.

5. A zoom lens according to claim 1, satisfying the following conditions:

$$1.1 < |f1|/f2 < 2.3$$
$$0.6 < f2/\sqrt{fw \cdot ft} < 1.2$$

wherein f1 and f2 are focal lengths of said first lens unit and said second lens unit, respectively, and fw and ft are focal lengths in the wide-angle end and the telephoto end of said zoom lens, respectively.

6. A zoom lens according to claim 1, wherein said third lens unit takes a position nearer to the screen side in the telephoto end than in the wide-angle end.

7. A zoom lens according to claim 1, wherein, during zooming from the wide-angle end to the telephoto end, said third lens unit moves in a locus convex toward the screen side.

8. A zoom lens according to claim 1, wherein, during zooming from the wide-angle end to the telephoto end, said first lens unit remains stationary.

9. A zoom lens according to claim 1, wherein, during zooming from the wide-angle end to the telephoto end, said first lens unit moves.

10. A zoom lens according to claim 1, satisfying the following condition:

$$1 < |f1|/fw < 2$$

where f1 is a focal length of said first lens unit, and fw is a focal length in the wide-angle end of said zoom lens.

11. A zoom lens according to claim 1, satisfying the following condition:

$$|tk|/fw > 4.0$$

where tk is a minimum value of absolute values of distance from the original image to an exit pupil during zooming, and fw is a focal length in the wide-angle end of said zoom lens.

12. A zoom lens according to claim 1, satisfying the following conditions:

$$0.8 < Z2/Z < 1.1$$
$$0.9 < M2/M4 < 1.6$$
$$0.4 < M2/(ft - fw) < 1.0$$

where Z2 is a ratio of a magnification in the telephoto end of said second lens unit to a magnification in the wide-angle end of said second lens unit, Z is a ratio of a focal length in the telephoto end of said zoom lens to a focal length in the wide-angle end of said zoom lens, M2 and M4 are absolute values of zooming movement of said second lens unit and said fourth lens unit, respectively, and fw and ft are the focal lengths in the wide-angle end and the telephoto end of said zoom lens, respectively.

13. A zoom lens according to claim 1, satisfying the following condition:

$$0.4 < f2/f4 < 0.8$$

where f2 and f4 are focal lengths of said second lens unit and said fourth lens unit, respectively.

14. A zoom lens according to claim 1, satisfying the following conditions:

$$0.3 < bf/f5 < 0.5$$
$$1.2 < |f1|/bf < 2.2$$

where bf is a distance reduced to air from the original image to a lens surface closest to the original image of said fifth lens unit, and f1 and f5 are focal lengths of said first lens unit and said fifth lens unit, respectively.

15. A zoom lens according to claim 1, satisfying the following conditions:

$$1.0 < |f1|/\sqrt{fw \cdot ft} < 1.6$$
$$0.6 < |f3|/\sqrt{fw \cdot ft} < 1.2$$
$$1.1 < f4/\sqrt{fw \cdot ft} < 1.8$$
$$1.5 < f5/\sqrt{fw \cdot ft} < 3.0$$

where f1, f3, f4 and f5 are focal lengths of said first lens unit, said third lens unit, said fourth lens unit and said fifth lens unit, respectively, and fw and ft are focal lengths in the wide-angle end and the telephoto end of said zoom lens, respectively.

16. A zoom lens according to claim 1, satisfying the following condition:

$$\nu 3 > 55$$

where ν3 is an Abbe number of a lens included in said third lens unit.

17. A zoom lens, comprising in order from a larger conjugate side,
   a first lens unit of negative refractive power,
   a second lens unit of positive refractive power which moves toward a larger conjugate side during zooming from a wide-angle end to a telephoto end, and
   a third lens unit of negative refractive power,
   wherein the zoom lens satisfies the following conditions:

$$|tk|/fw > 4.0$$
$$\nu 1n > 60$$

wherein fw is a focal length of a whole lens system at the wide-angle end, and tk is a minimum value of a distance from a conjugate surface on a smaller conjugate side to a pupil on the smaller conjugate side during zooming from the wide-angle end to the telephoto end, and ν1n is a mean value of Abbe numbers of negative lenses of the first lens unit.

18. A display apparatus, comprising:
   display means for displaying an image, and
   a zoom lens for projecting the image onto a projection surface,
   wherein the zoom lens comprising in order from a larger conjugate side:

a first lens unit of negative refractive power, a second lens unit of positive refractive power which moves toward the larger conjugate side during zooming from a wide-angle end to a telephoto end, a third lens unit of negative refractive power, a fourth lens unit which moves toward the larger conjugate side during the zooming from the wide-angle end to the telephoto end, and a fifth lens unit of positive refractive power.

19. A zoom lens, comprising in order from a larger conjugate side, a first lens unit of negative refractive power, having at least one aspherical surface, a second lens unit of positive refractive power, which moves toward the larger conjugate side during zooming from a wide-angle end to a telephoto end, a third lens unit of negative refractive power, a fourth lens unit of positive refractive power, which moves toward the larger conjugate side during the zooming from the wide-angle end of the telephoto end, and a fifth lens unit of positive refractive power, wherein the zoom lens satisfies the following condition:

$$4 < |tkw/fw|$$

where tkw is a distance from a pupil on the larger conjugate side at the wide-angle end to a conjugate surface on a smaller conjugate side at the wide-angle end when the conjugate length on the larger conjugate side is infinite, and fw is a focal length of a whole zoom lens system at the wide-angle end.

20. A zoom lens according to claim 19, wherein, during zooming from the wide-angle end to the telephoto end, a separation between said second lens unit and said third lens unit increases and a separation between said third lens unit and said fourth lens unit decreases.

21. A zoom lens according to claim 19, wherein, during zooming from the wide-angle end to the telephoto end, a separation between said first lens unit and said second lens unit decreases, a separation between said second lens unit and said third lens unit increases, a separation between said third lens unit and said fourth lens unit decreases and a separation between said fourth lens unit and said fifth lens unit increases.

22. A zoom lens according to claim 19, wherein said second lens unit has a plurality of positive lenses and one negative lens, and said third lens unit has one negative lens.

23. A zoom lens according to claim 19, satisfying the following conditions:

$$0.8 < |f1|/f2 < 2$$

$$0.5 < |f2/\sqrt{fw \cdot ft}| < 1.5$$

where f1 and f2 are focal lengths of said first lens unit and said second lens unit, respectively, and fw and ft are focal lengths in the wide-angle end and the telephoto end of said zoom lens, respectively.

24. A zoom lens according to claim 19, wherein, during zooming from the wide-angle end to the telephoto end, said second lens unit and said fourth lens unit move toward the large conjugate side, and said third lens unit takes a position nearer to the large conjugate side when in the telephoto end than when in the wide-angle end.

25. A zoom lens according to claim 19, wherein, during zooming from the wide-angle end to the telephoto end, said second lens unit and said fourth lens unit move toward the large conjugate side and said third lens unit moves in a locus convex toward the large conjugate side.

26. A zoom lens according to claim 19 wherein said first lens unit is made stationary during zooming.

27. A zoom lens according to claim 19, wherein said first lens unit has, in order from the large conjugate side to the small conjugate side, a negative lens of meniscus form convex toward the large conjugate side, a bi-concave negative lens and a positive lens, said negative lens of meniscus form containing at least one aspheric surface.

28. A zoom lens according to claim 19, wherein said fifth lens unit consists of one positive lens and satisfies the following condition:

$$|R5f| < |R5r|$$

where R5f and R5r are radii of curvature of surfaces on the large conjugate side and the small conjugate side of said fifth lens unit respectively.

29. A display apparatus comprising:

display means for displaying an image, and a zoom lens according to claim 19, for projecting the image onto a projection surface.

30. A zoom lens comprising, in order from a larger conjugate side:

a first lens unit of negative refractive power, a second lens unit of positive refractive power, which moves toward the larger conjugate side during zooming from a wide-angle end to a telephoto end, a third lens unit of negative refractive power, a fourth lens unit of positive refractive power, which moves toward the larger conjugate side during the zooming from the wide-angle end of the telephoto end, a fifth lens unit of positive refractive power, and at least one aspherical surface, wherein the zoom lens satisfies the following condition:

$$4 < |tkw/fw|$$

where tkw is a distance from a pupil on the larger conjugate side at the wide-angle end to a conjugate surface on a smaller conjugate side at the wide-angle end when the conjugate length on the larger conjugate side is infinite and fw is a focal length of a whole zoom lens system at the wide-angle end.

31. A zoom lens according to claim 30, wherein said first lens unit has an aspheric surface.

32. A zoom lens according to claim 30, wherein said fifth lens unit has an aspheric surface.

33. A zoom lens according to claim 30, wherein said fifth lens unit has at least one positive lens and at least one negative lens.

34. A zoom lens according to claim 30, wherein, during zooming from the wide-angle end to the telephoto end, a separation between said second lens unit and said third lens unit increases and a separation between said third lens unit and said fourth lens unit decreases.

35. A zoom lens according to claim 34, wherein, during zooming from the wide-angle end to the telephoto end, a separation between said first lens unit and said second lens unit decreases and a separation between said fourth lens unit and said fifth lens unit increases.

36. A zoom lens according to claim 30, wherein said second lens unit has at least two positive lenses and at least one negative lens, and said third lens unit has at least one negative lens.

37. A zoom lens according to claim 30, satisfying the following conditions:

$$0.8 < |f1|/f2 < 2$$
$$0.5 < |f2/\sqrt{fw \cdot ft}| < 1.5$$

where f1 and f2 are focal lengths of said first lens unit and said second lens unit, respectively, and fw and ft are focal lengths in the wide-angle end and the telephoto end of said zoom lens, respectively.

38. A zoom lens according to claim 30, wherein said third lens unit takes a position nearer to the long conjugate side when in the telephoto end than when in the wide-angle end.

39. A zoom lens according to claim 30, wherein said first lens unit is made stationary during zooming.

40. A zoom lens according to claim 30, wherein said first lens unit has a positive lens at a position closest to the long conjugate side.

41. A zoom lens according to claim 40, wherein said first lens unit has, in order from the long conjugate side to the short conjugate side, a positive lens having a stronger power on the long conjugate side than on the short conjugate side, a negative lens of meniscus form convex toward the long conjugate side, a bi-concave negative lens and a positive lens.

42. A zoom lens according to claim 30, wherein said first lens unit has, in order from the long conjugate side to the short conjugate side, a negative lens of meniscus form convex toward the long conjugate side, a bi-concave negative lens and a positive lens, at least one of surfaces of said negative lens of meniscus form being an aspheric surface.

43. A zoom lens according to claim 30, wherein said fifth lens unit consists of one positive lens and satisfies the following condition:

$$1 < |R5r/R5f|$$

where R5f and R5r are radii of curvature of surfaces on the large conjugate side and the small conjugate side of said positive lens, respectively.

44. A display apparatus comprising:

display means for displaying the original image; and a zoom lens according to claim 30, for projecting the image onto a projection surface.

45. A zoom lens, comprising in order from a larger conjugate side, a first lens unit of negative refractive power, a second lens unit of positive refractive power, which moves toward the larger conjugate side during zooming from a wide-angle end to a telephoto end, a third lens unit of negative refractive power, a fourth lens unit of positive refractive power, which moves toward the larger conjugate side during the zooming from the wide-angle end to the telephoto end, and a fifth lens unit of positive refractive power, and a stop which moves together with the second lens unit during the zooming from the wide-angle end to the telephoto end.

46. A display apparatus comprising:

display means for displaying an image, and a zoom lens according to claim 45, for projecting the image onto a projection surface.

47. A display apparatus comprising:

display means for displaying an image, and a zoom lens according to claim 1, for projecting the image onto a projection surface.

* * * * *

UNITED STATES PATENT AND TRADEMARK OFFICE
CERTIFICATE OF CORRECTION

PATENT NO.    : 6,285,509 B1
DATED         : September 4, 2001
INVENTOR(S)   : Hiroki Nakayama et al.

It is certified that error appears in the above-identified patent and that said Letters Patent is hereby corrected as shown below:

Column 1,
Line 27, "the such" should read -- has the --.

Column 5,
Line 18, "that" should be deleted.

Column 7,
Line 3, "filed" should read -- field --.

Column 10,
Line 32, (Numerical Example 3): "r10 = -21.515" should read -- r10 = -221.515 --.

Column 19,
Line 4, "vi" should read -- υi --.

Column 27,
Line 16, "are" should read -- are satisfied: --.

Column 28,
Line 24, "ail" should be deleted.
Line 57, "ay" should read -- at --.

Column 29,
Line 11, (Numerical Example 10): "r0" should read -- r9 --.

Column 34,
Line 66, "comprising" should read -- comprises --.

Signed and Sealed this

Twenty-eighth Day of January, 2003

JAMES E. ROGAN
*Director of the United States Patent and Trademark Office*